(12) United States Patent
Omori et al.

(10) Patent No.: US 10,790,067 B2
(45) Date of Patent: Sep. 29, 2020

(54) X-RAY INSPECTION DEVICE

(71) Applicant: ANRITSU INFIVIS CO., LTD., Kanagawa-ken (JP)

(72) Inventors: Koji Omori, Kanagawa-ken (JP); Daiki Kataoka, Kanagawa-ken (JP)

(73) Assignee: ANRITSU INFIVIS CO., LTD., Kanagawa-Ken (JP)

( * ) Notice: Subject to any disclaimer, the term of this patent is extended or adjusted under 35 U.S.C. 154(b) by 322 days.

(21) Appl. No.: 15/800,456

(22) Filed: Nov. 1, 2017

(65) Prior Publication Data

US 2018/0122526 A1    May 3, 2018

(30) Foreign Application Priority Data

Nov. 2, 2016   (JP) ................... 2016-215452
Nov. 8, 2016   (JP) ................... 2016-218271
Jul. 19, 2017   (JP) ................... 2017-140174
Jul. 26, 2017   (JP) ................... 2017-144390

(51) Int. Cl.
  *G21F 3/00*   (2006.01)
  *G01N 23/083*   (2018.01)
  *G01N 23/18*   (2018.01)

(52) U.S. Cl.
  CPC ............. *G21F 3/00* (2013.01); *G01N 23/083* (2013.01); *G01N 23/18* (2013.01); *G01N 2223/645* (2013.01)

(58) Field of Classification Search
  CPC ........ G21F 3/00; G01N 23/083; G01N 23/10; G01N 23/2204; G01T 7/02; G01T 7/08
  See application file for complete search history.

(56) References Cited

U.S. PATENT DOCUMENTS 5,056,128 A * 10/1991 Thompson ........... A61N 5/1042
                                                                 378/145
2007/0215821 A1 * 9/2007 Stirling ..................... G21F 3/00
                                                                 250/515.1

FOREIGN PATENT DOCUMENTS

| JP | 2003-247960 | 9/2003 |
|----|-------------|--------|
| JP | 2008-281482 | 11/2008 |
| JP | 3190710 | 5/2014 |

OTHER PUBLICATIONS

Office Action issued in Japan Counterpart Patent Appl. No. 2017-144390, dated Oct. 23, 2018.

* cited by examiner

*Primary Examiner* — Edwin C Gunberg

(74) *Attorney, Agent, or Firm* — Greenblum & Bernstein, P.L.C.

(57) ABSTRACT

An X-ray inspection device performs inspection by irradiating an X-ray on an inspection object conveyed in an X-ray shielded space. The device has a shielding gate, having a passage part the shape of which is changeable in correspondence with the outer shape of the inspection object, so as to pass the inspection object. The shielding gate may be retractably provided in a shielding position inside the shielded space.

15 Claims, 38 Drawing Sheets

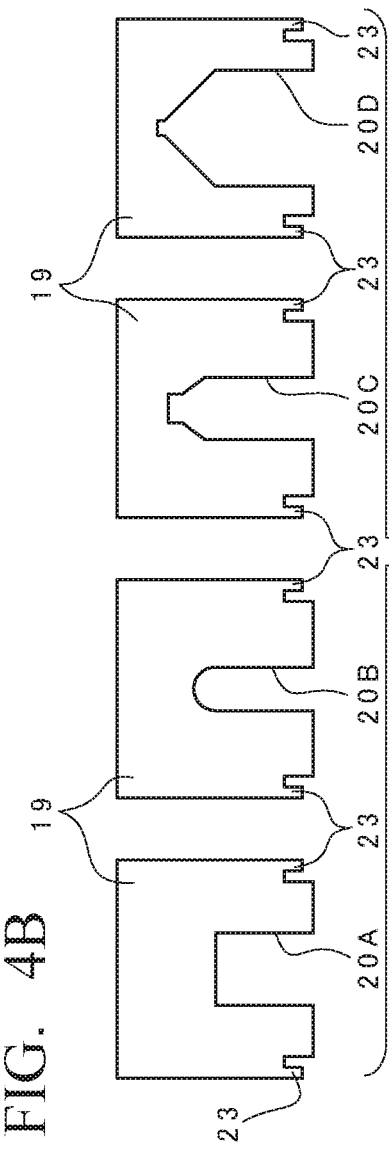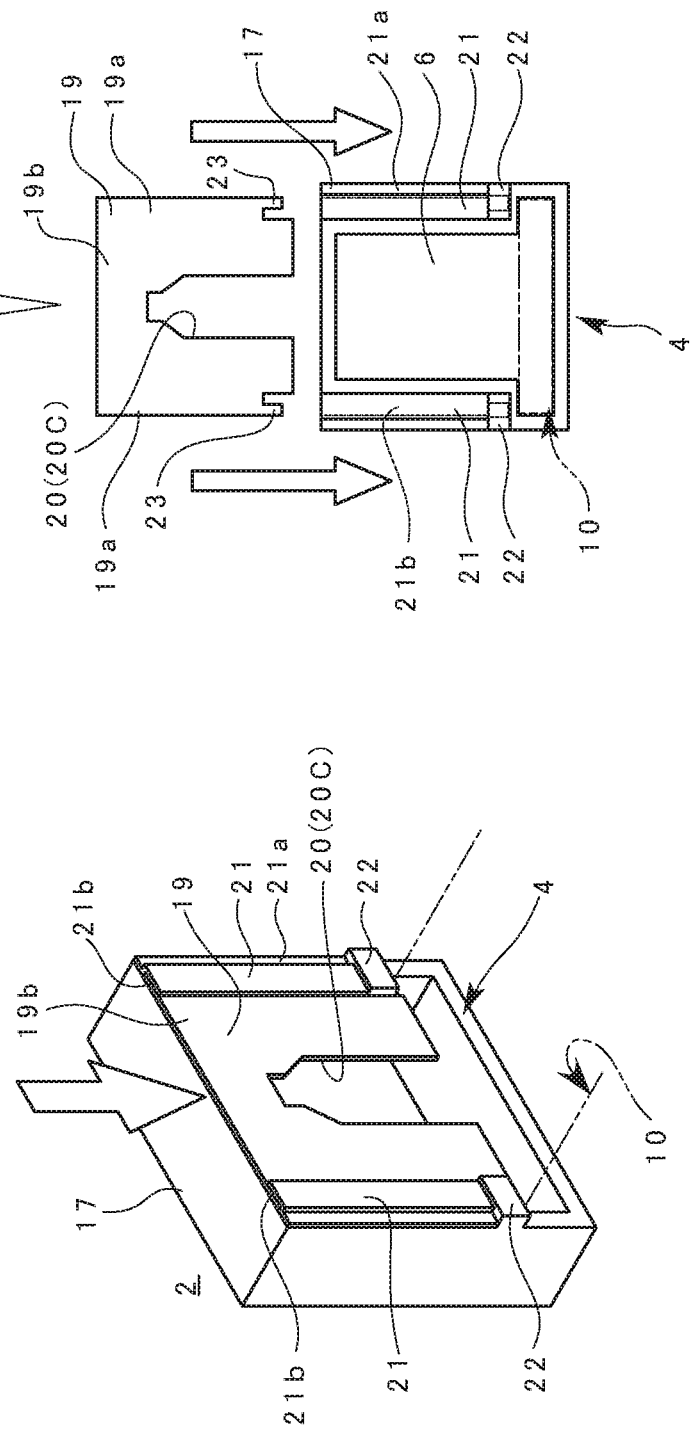
FIG. 4B
FIG. 4A

X-RAY INSPECTION DEVICE

TECHNICAL FIELD

The present invention relates to an X-ray inspection device.

BACKGROUND ART

An X-ray inspection device is provided with a conveyance unit to carry in and out an inspection object with respect to shielded space constructed to reduce X-ray leakage irradiated on the inspection object. It is necessary to suppress X-ray leakage from the position where the inspection object is carried in and out with respect to the shielded space, i.e., the conveyance unit. For this purpose, in an X-ray inspection device 300 shown in FIG. 43 as a related art, the X-ray leaked from the shielded space 303 is attenuated by providing a conveyance unit 301 with a tunnel-shaped extension cover 302. For more effective attenuation, a lead-containing curtain (not shown) may be provided at an entrance 304 of the extension cover 302. The lead-containing curtain is made of a flexible material obtained by mixing lead with resin. The curtain is formed to have plural thin strips. An inspection object 305, when it is conveyed, pushes the curtain back, and it passes through the curtain.

However, the lead-containing curtain has a problem when the inspection object 305 is a vertically-long bottle or the like having its center of gravity in a high position, and the inspection object falls down due to contact resistance of the curtain.

With regard to this inconvenience, as disclosed in Patent Literature 1, an X-ray inspection device having a double-swinging door curtain structure has been proposed.

The X-ray inspection device is preferably applicable to conveyance of vertically-long inspection object such as a bottle in upright state. However, since the double-swinging door hits the inspection object, the position of the inspection object may be shifted or the inspection object may be turned, due to the weight of the doors or closing restoring force of the doors.

The above inconveniences are caused by the contact between the inspection object and the leakage preventing member such as the curtain or the door. Accordingly, an X-ray inspection device to avoid the contact between the inspection object and the leakage preventing member (not shown) has been proposed. In this X-ray inspection device, a through hole having a shape corresponding to the shape of the inspection object is formed at the entrance for the inspection object. According to this X-ray inspection device, there is no contact between the inspection object and the leakage preventing member. Thus it is possible to prevent the inconvenience of the shift of the inspection object on the conveyance path or the rotation and fall of the inspection object, and improve inspection accuracy.

Patent Literature 1: Japanese Published Unexamined Patent Application No. 2008-281482

SUMMARY OF INVENTION

Technical Problem

However, in the X-ray inspection device 300 having the tunnel-shaped extension cover 302, a conveyance direction length L as a whole length of the inspection device is disadvantageously long. Further, in the conventional X-ray inspection device where a through hole corresponding to the shape of the inspection object is formed at the entrance, the entrance is a part of the side wall of the device itself. Since the device has this fixed structure, the shape of the inspection object is limited. That is, this X-ray inspection device is specialized for a particular inspection object and it lacks versatility. For example, when the specification, i.e., the shape of the inspection object is changed, a special operator prepares an entrance member in which a new through hole shape is formed. The special operator brings the entrance member to the site, and perform bolt fastening or the like again, to change or adjust the entrance member. Accordingly, when a variety of inspection objects having different shapes are handled, the inspection is complicated.

The present invention has been made in view of the above situation, and provides an X-ray inspection device in which the length of the inspection device in a conveyance direction is shortened, and upon inspection of plural types of inspection objects having different shapes, specification change is easily performed.

Solution to Problem

As a first aspect of the invention, there is provided an X-ray inspection device for performing inspection by irradiating an X-ray on an inspection object conveyed in an X-ray shielded space, including: a shielding gate having a passage part a shape of which is changeable in correspondence with an outer shape of the inspection object to be passed through.

As a second aspect of the invention, in the X-ray inspection device according to the first aspect, the shielding gate having the passage part corresponding to the shape of the inspection object is retractably provided in a shielding position inside the shielded space.

As a third aspect of the invention, in the X-ray inspection device according to the first aspect, the shielding gate is formed with a plurality of the shielding gates accommodated in an accommodation position outside the shielded space, and each of the plurality of the shielding gates has the passage parts in different shapes respectively corresponding to the inspection objects in plural types of shapes, the plurality of shielding gates are respectively movable from the accommodation position to the shielding position inside the shielded space.

As a fourth aspect of the invention, in the X-ray inspection device according to the second aspect, the shielding gate has an identification part to which identification information corresponding to the shape of the passage part is added; and the device further comprises an identification information acquisition unit that acquires the identification information from the shielding gate in the shielding position.

As a fifth aspect of the invention, in the X-ray inspection device according to the first aspect, the shielding gate is formed with a plurality of types of the shielding gates having passage parts in different shapes respectively corresponding to a plurality of outer shapes of the inspection objects to be passed, and one of the plurality of types of shielding gates is selected in correspondence with a particular type of inspection object, and removably attached to the shielding position so as to suppress X-ray leakage from the shielded space. The plural types of shielding gates, each linked to corresponding one of the plurality of types of inspection objects, respectively have a gate engagement part unique to the respective shielding gates to match the shape of the inspection object to the shape of the passage part. The device further comprises: a main body engagement part, provided in the vicinity of the shielding position, set in a state corresponding to a particular type of the inspection object selected from the plural types of inspection objects, that becomes engageable only with respect to the gate engagement part of the shielding gate having the passage part corresponding to the inspection object; and an interlock unit that detects attachment of the shielding gate to the shielding position, and unless the shielding gate is attached to the shielding position based on the engagement between the gate engagement part and the main body engagement part, prohibits irradiation of the X-ray.

As a sixth aspect of the invention in the X-ray inspection device according to the fifth aspect, the gate engagement part is a hole, and the main body engagement part is a projection engaged with the hole.

As a seventh aspect of the invention, in the X-ray inspection device according to the sixth aspect, the projection is an operation knob operated for selection of the particular type of the inspection target.

As an eighth aspect of the invention, in the X-ray inspection device according to the sixth or seventh aspect, the projection is provided in a plurality of positions, and the hole is provided, in correspondence with the projections, in a plurality of positions of the shielding gate.

As a ninth aspect of the invention, in the X-ray inspection device according to the eighth aspect, the plurality of projections are arrayed closely to each other.

As a tenth aspect of the invention, the X-ray inspection device according to the fifth aspect further comprises a driving unit that operates by operation for selection of the particular type of inspection object from the plurality of types of inspection objects. Further, by the operation of the driving unit, the main body engagement part is set in a state engageable with the gate engagement part of the shielding gate corresponding to the particular type of inspection object.

As an eleventh aspect of the invention, in the X-ray inspection device according to the first aspect, the shielding gate is formed with a plurality of shielding members movable to arbitrarily set the shape of the passage part in correspondence with the outer shape of the inspection object, and the shielding members are moved so as to change the shape of the passage part.

As a twelfth aspect of the invention, in the X-ray inspection device according to the eleventh aspect, the shielding members include: at least one pair of first shielding members movable in a lateral direction to set a width of the passage part in correspondence with a width of the inspection object; and a second shielding member movable in a vertical direction to set a height of the passage part in correspondence with a height of the inspection object.

As a thirteenth aspect of the invention, in the X-ray inspection device according to the twelfth aspect, the shielding members further include a third shielding member movable in a diagonal direction to set an tilted corner in the passage part.

Advantageous Effects of Invention

According to the first aspect of the invention, the passage part formed in the shielding gate has a shape corresponding to the outer shape of the inspection object. Further, the shape of the passage part is changeable in correspondence with the outer shape of the inspection object conveyed with the conveyance unit and actually passed through the gate. Accordingly, it is possible to reduce the gap between the inspection object and the passage part, through which X-ray is leaked. It is therefore possible to suppress X-ray leakage to the outside of the shielded space without the conventional tunnel-shaped extension cover or the like for attenuation of the X-ray. With this configuration, the length of the inspection device in a conveyance direction is reduced.

According to the second aspect of the invention, the shielding gate, having a passage part formed in correspondence with the shape of the inspection object, is provided in the shielded space. The gap or the like to allow X-ray leakage is reduced. It is therefore possible to suppress X-ray leakage to the outside of the shielded space without the conventional tunnel-shaped extension cover or the like for attenuation of the X-ray. With this configuration, the length of the inspection device in the conveyance direction is reduced. The shielding gate is retractably carried in and out with respect to the shielding position in the shielded space. That is, it is removable with respect to the device. When the shape of the inspection object is changed, the shielding gate can be changed with another shielding gate having a passage part corresponding to the shape of the current inspection object. It is possible to facilitate handling of the inspection object.

According to the third aspect of the invention, the plurality of shielding gates having passage parts formed in correspondence with respective shapes of plural types of inspection objects are previously accommodated in the accommodation position. A shielding gate having a passage part corresponding to the shape of a current inspection object is selected from among the plural shielding gates and is provided in the shielding position. With this configuration, it is possible to quickly handle inspection objects in different shapes. Further, it is possible to facilitate management of the shielding gates.

According to the fourth aspect of the invention, the identification information acquisition unit acquires identification information from the identification part of the shielding gate provided in the shielding position. It is determined based on the identification information whether or not the acquired identification information corresponds with the shape of the inspection object of the set product class, i.e., whether or not the outer shape of the inspection object corresponds with the shape of the passage part of the shielding gate. When the identification information corresponds with the shape of the inspection object, the device is set in an X-ray irradiatable state, otherwise, the device is set in an X-ray unirradiatable state. With this configuration, when a shielding gate unsuitable for the shape of the inspection object is erroneously selected, X-ray irradiation is not performed. Thus safety for X-ray leakage is ensured.

According to the fifth aspect of the invention, it is possible to provide a shielding gate, having a passage part formed in correspondence with a shape of the inspection object, in the shielded space. Since it is possible to reduce the gap or the like to cause X-ray leakage, it is possible to suppress X-ray leakage to the outside of the shielded space without the conventional tunnel-shaped extension cover or the like for attenuation of the X-ray. With this configuration, the length of the inspection device in a conveyance direction is reduced. The shielding gate is retractably carried in and out with respect to the shielded space, and is removable with respect to the device. When the shape of the inspection object is changed, the shielding gate is changed with another shielding gate having a passage part corresponding to the shape of the current inspection object, and handling of the inspection object is facilitated. Further, when attaching the shielding gate, with engagement between the gate engagement part of the shielding gate and the main body engagement part set to the particular type, the attachment is enabled. With the correct engagement, the interlock unit enables X-ray irradiation. When the main body engagement part is not engageable with the gate engagement part, i.e., a wrong shielding gate is erroneously selected, the shielding gate is not attached, and X-ray irradiation is not enabled. Thus the X-ray inspection device is safely operated.

According to the sixth aspect of the invention, the main body engagement part and the gate engagement part, to be engaged with each other, are a combination of a projection and a hole. The engagement relationship corresponds with a key to a keyhole relationship. The shielding gate is attached to the shielding position with the mutual engagement operation. Further, as the gate engagement part of the shielding gate is a hole, it is possible to avoid interference between the plural shielding gates in e.g. a plate shape, such as mutual catching, upon handling or accommodation. Thus it is possible to facilitate management of the plural types of shielding gates.

According to the seventh aspect of the invention, since the projection is an operation knob, the projection is used not only as a knob but also as an operation part or a display part. The position, direction and the like of the operation knob may be variable. It is therefore possible to cause one operation knob to function as plural types of engagement parts. Further, the position and direction of the operation knob are easily checked by observation or touching. Thus it is possible to improve the operability.

According to the eighth aspect of the invention, as plural projections are provided, plural types of inspection objects are handled with combination of the position and the direction of the respective projections, and a shielding gate is specified from the plural types of shielding gates. Further, the number of distinguishable shielding gates is easily increased.

According to the ninth aspect of the invention, with the projections provided closely to each other, it is possible to improve the operability and the visibility. Further, when the projection is used as an operation knob and the operation knob is connected with a signal line or the like having a detection function, the wiring of the signal line or the like is facilitated in the device body.

According to the tenth aspect of the invention, with the driving unit that operates upon operation for selection of an inspection object, the setting of the main body engagement part is automated. Further, it is possible to prevent erroneous setting of the main body engagement part by manual setting.

According to the eleventh aspect of the invention, by moving the plural shielding members forming the shielding gate, the passage part of the shielding gate which the inspection object is passed through is arbitrarily set in correspondence with the outer shape of the inspection object. The gap between the passage part of the shielding gate and the inspection object passed through the gate is sufficiently narrow. While the inspection object is passed through the passage part, the inspection object itself effectively shields the X-ray. Accordingly, when the carry-in of the inspection object is continuously performed and the interval between the carried-in inspection object is sufficiently short, X-ray leakage is substantially prevented. Thus necessary and sufficient X-ray shielding is attained. When an inspection object having a predetermined outer shape is to be inspected in the middle of inspection of another inspection object having a different outer shape, the plural shielding members are moved to change the shape of the passage part of the shielding gate in correspondence with the new inspection object. Accordingly, it is possible to start inspection of the new inspection object without delay.

According to the twelfth aspect of the invention, it is possible to set the interval between the pair of first shielding members by moving the pair of first shielding members in the lateral direction. It is possible to set the position of the second shielding member in the vertical direction by moving the second shielding member in the vertical direction. With this configuration, it is possible to easily form a passage part having a width and a height corresponding to those of an inspection object by movement of the first and second shielding members.

According to the thirteenth aspect of the invention, it is possible to change the right-angle part of the rectangular passage part formed with the first and second shielding members to a tilted angle in an arbitrary size by moving the third shielding member to an appropriate position. With this configuration, it is possible to approximate the shape of the passage part formed with the shielding members to the outer shape of the inspection object. Further, it is possible to further reduce the gap between the inspection object and the passage part with a possibility of X-ray leakage.

BRIEF DESCRIPTION OF DRAWINGS

FIG. 4A is an explanatory diagram of use of the shielding gate;

FIG. 4B is a schematic diagram upon selection of plural types of shielding gates;

DESCRIPTION OF EMBODIMENTS

Hereinbelow, an X-ray inspection device according to embodiments 1 to 3 of the present invention will be described with reference to the drawings.

The X-ray inspection device according to the present invention is preferably applicable to inspection for various purposes such as foreign material detection, by irradiating an X-ray on a vertically long and so-called tall inspection object such as glass bottle drink or plastic bottle drink, which is conveyed in upright state.

Note that the inspection object in the present X-ray inspection device is not limited to the above type of inspection object. That is, the inspection object may be a vertically long packaging container, the size of which differs based on capacity, such as a 1000 ml or 500 ml carton drink, plastic bottle drink, glass bottle drink, and drink in other types of bottles. Further, the inspection object may be drink in a container not in a vertically long shape but in a flat shape.

First Embodiments

Embodiment 1-1

Figure 1:
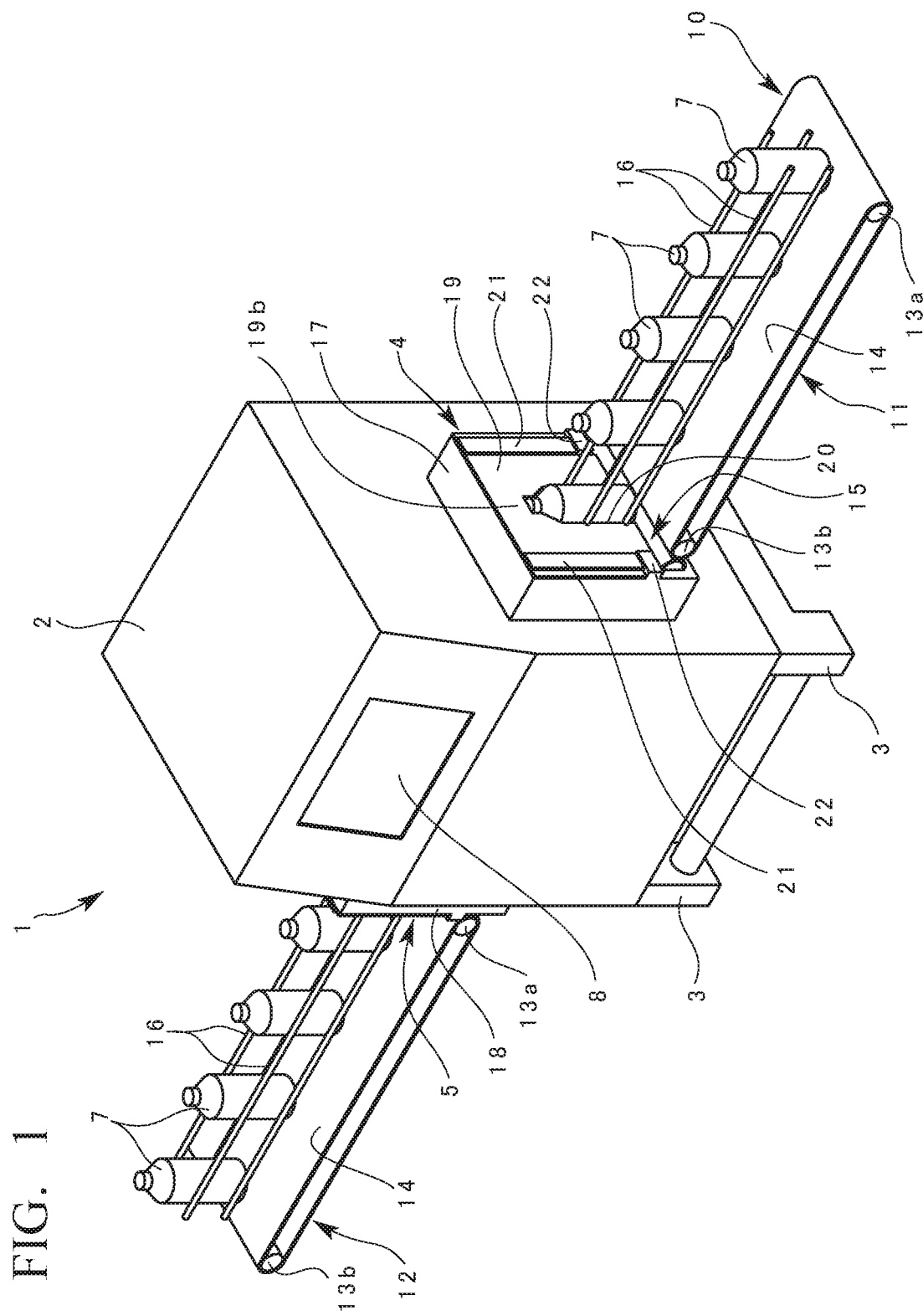
FIG. 1 is a perspective view of an X-ray inspection device according to an embodiment 1-1 of the present invention.
Figure 2:
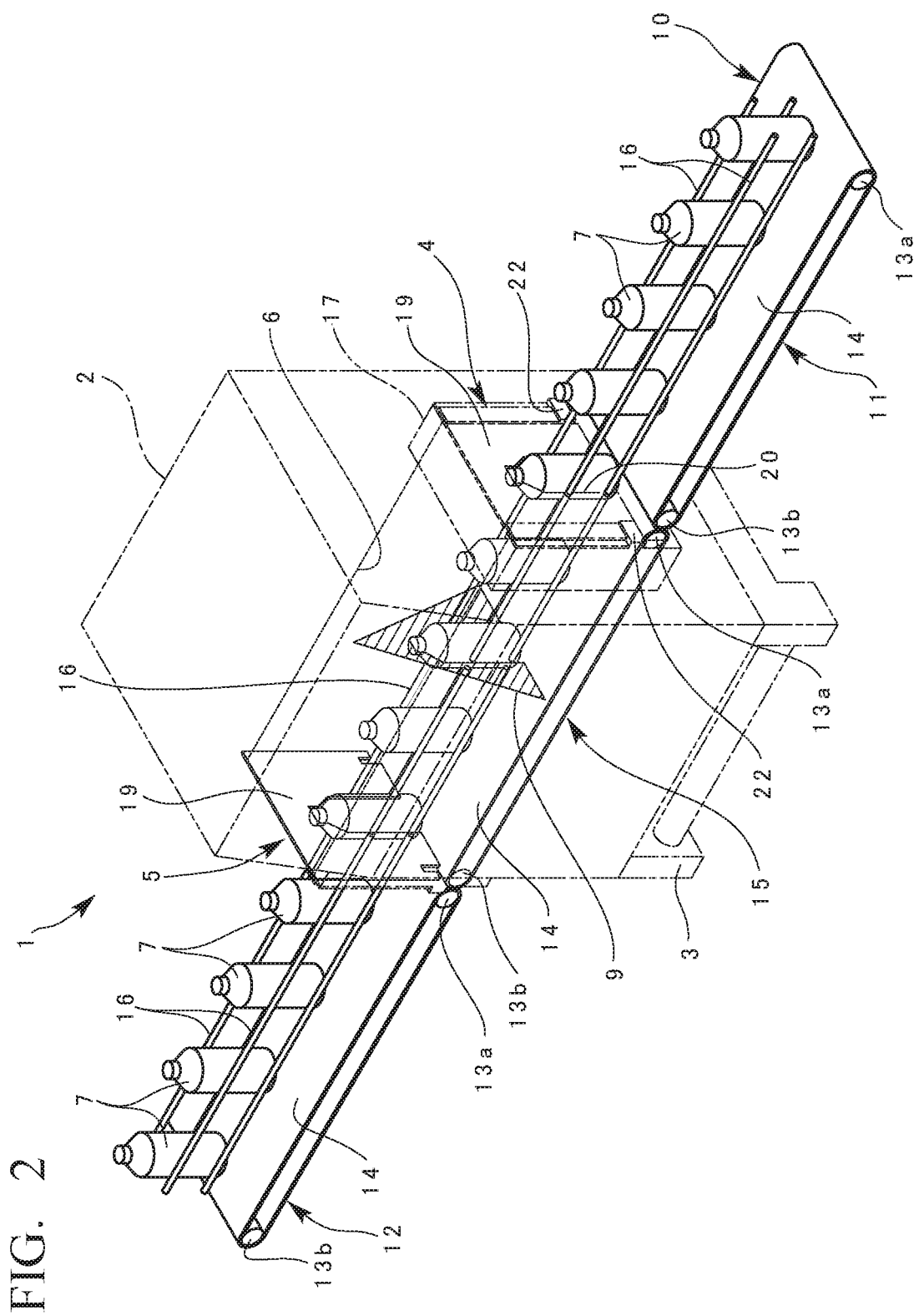
FIG. 2 is a perspective view showing the inside of the case of the X-ray inspection device shown in FIG. 1.

FIG. 1 is a perspective view of an X-ray inspection device according to an embodiment 1-1 of the present invention. FIG. 2 is a perspective view showing the inside of the case of the X-ray inspection device shown in FIG. 1.

An X-ray inspection device 1 according to the embodiment 1-1 has a box-shaped housing 2. The housing 2 is supported with e.g. four legs 3 on an installation surface. The housing 2 is formed by using a radiation protective material to prevent X-ray leakage from the inside by a harmful amount to the outside. More specifically, the housing is lined with a shielding material such as lead.

The housing 2 has an entrance 4 and an exit 5 which an inspection object 7 is passed through in its both side surfaces. Note that in the present embodiment, in the figure, the entrance 4 is formed on the right side of the housing 2, and the exit 5 is formed on the left side of the housing 2. The space between the entrance 4 and the exit 5 is shielded space 6. Further, the housing 2 has a touch-panel type display unit 8 as a touch-panel display screen for checking of inspection result, display of various information, input operation and the like, on its front surface.

The housing 2 includes an X-ray generating device (not shown). The X-ray generating device irradiates an X-ray toward the inspection object 7 conveyed in the shielded space 6. The X-ray forms an approximately triangular plane-shaped inspection region 9 spread in an emission direction from an X-ray tube, and irradiates the inspection object 7. The irradiated X-ray is received with a sensor (not shown). The sensor photoelectric-converts the X-ray, and outputs the converted result to an inspection processing unit (not shown) of the device main body. Note that in the X-ray inspection device 1 shown in FIG. 2, the X-ray is irradiated toward the inspection object 7 from an upper position. However, the X-ray irradiation may be performed from e.g. a diagonal direction or a side direction to the inspection object 7 in correspondence with the inspection of the inspection object 7.

A conveyance unit 10 is provided through the housing 2. In the present embodiment, the conveyance unit 10 has an entrance conveyance unit 11 on the entrance 4 side, an exit conveyance unit 12 on the exit 5 side, and an inner conveyance unit 15 between the entrance conveyance unit 11 and the exit conveyance unit 12 and inside the housing 2. The entrance conveyance unit 11, the exit conveyance unit 12, and the inner conveyance unit 15 have plural rollers 13a and 13b, and an endless-type conveyance belt 14 put between the rollers 13a and 13b. In the respective conveyance units 11, 12, and 15, the roller 13a (13b) is driven with a driving unit such as a motor attached to the main body, and the conveyance belt 14 circulate-moves in accordance with the driving of the roller, to transfer the inspection object 7 placed on the conveyance belt 14 on the upper side. The inspection object 7, conveyed with the entrance conveyance unit 11 to the entrance 4, is transferred to the inner conveyance unit 15 provided inside the housing 2. In the housing 2, the inspection object 7 is irradiated with the X-ray, then is transferred from the inner conveyance unit 15 to the exit conveyance unit 12, and the X-ray inspection is ended. Note that the entrance conveyance unit 11, the exit conveyance unit 12, and the inner conveyance unit 15 are provided with a pair of guide bars 16 to prevent falling of the inspection object 7 and to guide the inspection objects 7 in line. Further, the conveyance units 11, 12, and 15 may be one unit and may be driven with an outside driving unit.

In the subsequent stage from the X-ray inspection device 1, e.g., a selection device to discriminate the quality of the inspection object 7 is provided.

In the housing 2, the entrance 4 and the exit 5 are provided with rectangular frame-shaped frame bodies 17 and 18 projected to the outside of the housing 2. The respective frames 17 and 18 are formed to surround the entrance 4 and the exit 5. Note that the length of projection of the frame bodies 17 and 18 with respect to the outer surface of the housing 2 is not as long as the length of the conventional tunnel-shaped extension cover. The frame bodies are projected by a slight amount for assembling guide rails 21 and an interlock mechanism 22 for attachment of a shielding gate 19 to be described later. The frame bodies have a frame-type thickness with respect to the entrance 4 and the exit 5 of the housing 2. The entrance conveyance unit 11, the exit conveyance unit 12, and the inner conveyance unit 15 are provided along a lower edge 17a on the inside of the frame bodies 17 and 18. The respective frame bodies 17 and 18 communicate with the inside of the housing 2 via the entrance 4 and the exit 5. Accordingly, the inside of the frame bodies 17 and 18 corresponds to the shielded space 6. The frame bodies form the shielded space 6 in a tunnel shape continuing to the inside of the housing 2, between the entrance 4 and the exit 5. Note that the shielded space 6 includes a position in which X-ray irradiation is performed with the X-ray generating device for inspection of the inspection object 7. The inspection object 7 is carried in and out with respect to the X-ray irradiation position in the shielded space 6. Further, as in the case of the housing 2, the frame bodies 17 and 18 are formed by using a radiation protective material so as to prevent X-ray leakage from the inside by a harmful amount to the outside.

Figure 3:
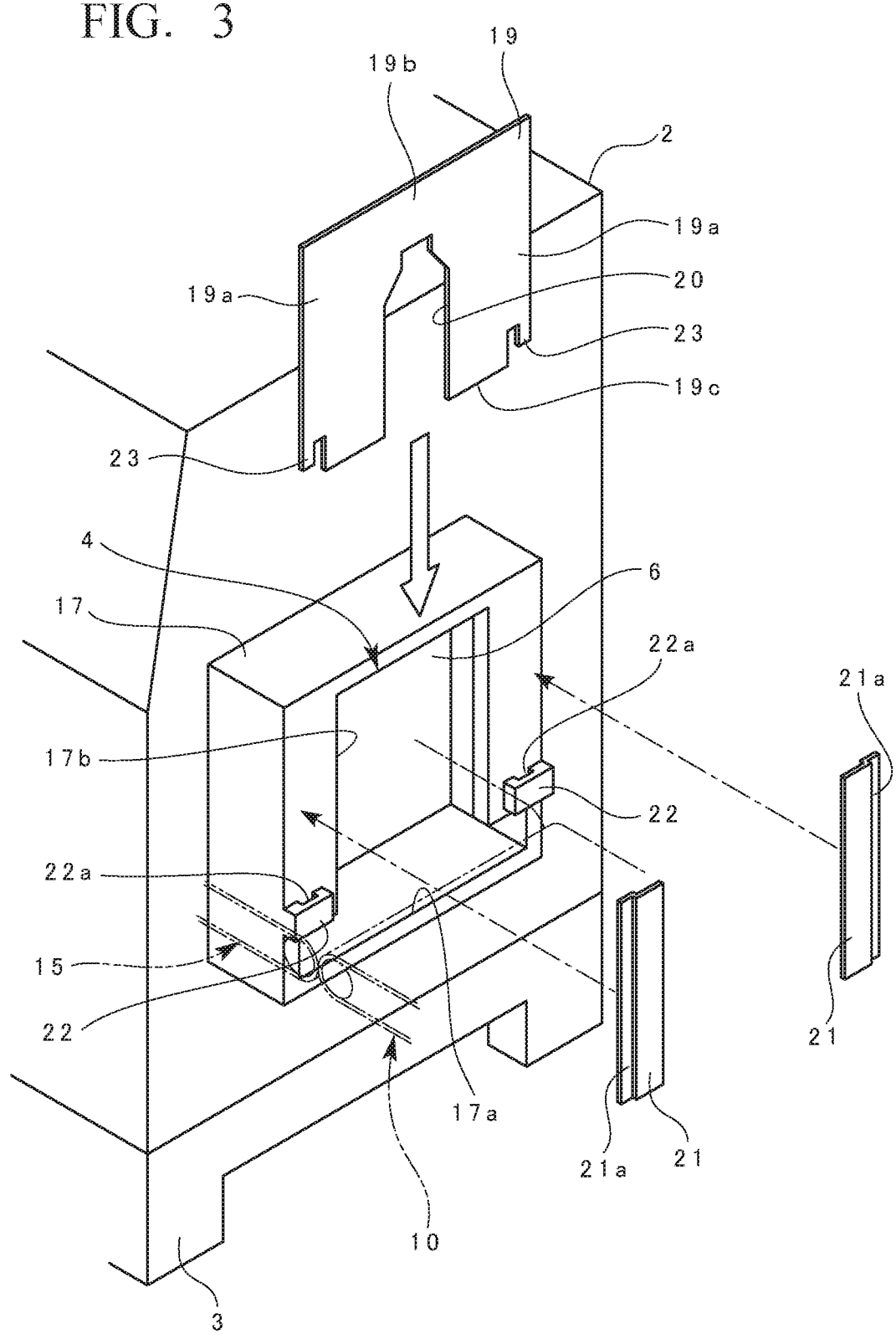
FIG. 3 is an exploded perspective view in the vicinity of a shielding gate shown in FIG. 1.

FIG. 3 is an exploded perspective view in the vicinity of a shielding gate shown in FIG. 1.

In the frame bodies 17 and 18, a shielding gate 19 is provided in a frame body opening 17b on the outside opposite to the housing 2. The frame bodies 17 and 18, and the shielding gate 19 are provided at least one of the entrance 4 and the exit 5 so as to reduce X-ray leakage. In the present embodiment, the frame bodies 17 and 18 and the shielding gate 19 are provided at the both entrance 4 and the exit 5. In the present embodiment, the shielding gate 19 is carried in and out with respect to the shielded space 6 inside the frame bodies 17 and 18 attached to the outer side surfaces of the housing 2.

Further, the shielding gate 19 may be carried in and out with respect to the inside of the frame bodies 17 and 18 on the slightly inside from the frame body opening 17b, i.e., a slightly back position from the frame body opening 17b, or any position in the shielded space 6 in the case body 2.

Note that in the following description, the respective configurations where the shielding gate is provided on the entrance 4 side will be described using the respective figures.

The shielding gate 19 is formed with a stainless steel plate such as SUS, or a plate-shaped member which is made of an X-ray shielding material or a material including the X-ray shielding material. The shielding gate 19 has a passage part 20 which the inspection object 7 is passed through. The passage part is an opening or a hole which the inspection object 7 is passed through. The passage part 20 is formed in correspondence with the outer shape of the inspection object 7. More particularly, in the square shaped shielding gate 19, a part of a lower edge 19c is released, and the passage part 20 formed in correspondence with the contour of the inspection object 7 is formed in an approximately C shape. The lower edge 19c is released so as to prevent interference with the inspection object 7 placed on and transferred with the conveyance belt 14 of the conveyance unit 10. The passage part 20 is formed almost along the contour of the inspection object 7. For example, when the passage part 20 is formed in correspondence with the shape of a milk carton, the contour of the uprisen paper part at the upper end is not necessarily accurately formed. The passage part 20 is formed almost along the contour of the inspection object 7 to avoid obstruction of the conveyance of the inspection object due to catching of the inspection object with the passage part.

A pair of right and left guide rails 21, holding the frame body opening 17b between them, are attached vertically to the frame body 17 in parallel to each other. The guide rails 21 are formed in an approximately Z shape, and fixed edges 21a respectively on one side of the guide rail are fixed along the frame body opening 17b. Then insertion slits 21b, for insertion of right and left side edges 19a of the shielding gate 19, are formed so as to face each other between the guide rails and the frame body 17. The guide rails 21 guide the right and left side edges 19a of the shielding gate 19. Thus the guide rails 21 guide the shielding gate 19 to move downward with respect to the frame body opening 17b, to set the shielding gate 19 immediately above the conveyance belt 14. The shielding gate 19 suppresses X-ray leakage to the outside of the shielded space 6. In this case, the shielding gate 19 is inserted in the guide rails 21 from an upper position, and is set by its own weight. An operator inserts the shielding gate 19 in the guide rails 21 while holding an upper edge 19b. Further, the operator removes the shielding gate 19 by pulling the shielding gate up. Accordingly, the shielding gate 19 is retractably provided in the shielded space 6. In the present embodiment, the shielding gate 19 is changeable in the vertical direction. Further, the shielding gate 19 may be provided crosswise-slidably in a front-back direction with respect to the housing 2, i.e., in the lateral direction with respect to the frame body opening 17b.

An interlock mechanism 22 is provided below the respective guide rails 21. Further, at right and left corners as right and left ends of the lower edge 19c of the shielding gate 19, projection pieces 23 inserted in holes 22a of the interlock mechanism 22 are vertically provided. When the projection pieces 23 enter the holes 22a, the interlock mechanism 22 detects that the shielding gate 19 is inserted in the shielded space 6 and correctly provided, i.e., X-ray leakage is prevented. In accordance with this detection, a control unit of the device main body releases restriction of the X-ray generating device, to set the device in an X-ray irradiatable state. In the present embodiment, the interlock mechanism 22 is positioned at lower edges of the guide rails 21. As the interlock mechanism 22 supports the lower edge of the shielding gate 19, it functions not only as a mechanism for detection of insertion of the shielding gate 19 but also as a support part to support the shielding gate 19 in the shielding position. In the shielding gate 19 supported with the shielding position, the lower edge 19c is provided in a non-contact position in the close vicinity of the conveyance belt 14 on the upper side of the conveyance unit 10.

FIG. 4A is a use explanatory diagram of the shielding gate. FIG. 4B is a schematic diagram upon selection of plural types of shielding gates.

In the X-ray inspection device 1, it is possible to previously prepare plural shielding gates 19 having passage parts 20 in different shapes respectively corresponding to plural types of inspection objects 7. For example, as shown in FIG. 4B, four types of shielding gates 19 with four types of passage parts 20A to 20D are previously prepared in correspondence with different shapes of four types of inspection objects 7. Upon X-ray inspection, one of the shielding gates 19 is selected in correspondence with the outer shape of the inspection object 7, and is inserted into the guide rails 21 of the frame body 17. In FIG. 4B, the shielding gate 19 in which the passage part 20C corresponding to the shape of the inspection object 7 shown in FIGS. 1 and 2 is formed is selected, and is inserted as shown in FIG. 4A.

Next, the operation of the above-described configuration will be described.

In the X-ray inspection device 1 according to the present embodiment, the shielding gate 19 having the passage part 20 formed in correspondence with the shape of the inspection object 7 is retractably provided in the shielded space 6 between the entrance 4 and the exit 5. In the shielding gate 19, as the shape of the passage part 20 is formed in correspondence with the outer shape of the inspection object 7, the gap between the passage part 20 as an opening of the shielding gate 19 and the outer shape of the inspection object 7 passing through the passage part 20 is small. Thus X-ray leakage is suppressed.

The shielding gate 19 is carried in and out with respect to the shielded space 6, and the passage part 20 as an entrance of passing of the inspection object 7 is provided, so as to reduce X-ray leakage. In comparison with the conventional device 100 requiring the tunnel-shaped extension cover 102, the whole length of the X-ray inspection device 1 in the conveyance direction, i.e., so-called device length is short. With this configuration, space saving is attained in the X-ray inspection device 1. Further, as the device length is short, the whole inspection line including the X-ray inspection device 1 is reduced. That is, the distance between the X-ray inspection device and the prior stage or subsequent stage is short, thus space saving is attained.

In the present embodiment, the shielding gates 19 having the passage parts 20 corresponding to the inspection objects 7 are previously prepared. One of the shielding gates 19 corresponding to the shape of the inspection object 7 is selected, and it is provided in the shielded space 6, to reduce X-ray leakage. Unlike the conventional device having a structure where the entrance and exit are fixed, there is no complicated work such as a special operator goes to the site and fastens bolts again, to change the entrance member. Accordingly, even when many types of inspection objects 7 are handled or even when a change cycle such as outer-shape specification change or design change is fast, it is possible to form a passage entrance to suppress X-ray leakage by preparing the shielding gates 19 having passage parts 20 in shapes corresponding to the outer shapes of the inspection objects 7, and quickly change the shielding gate upon change of the inspection object 7.

Embodiment 1-2

Next, the X-ray inspection device according to an embodiment 1-2 of the present invention will be described.

Figure 5:
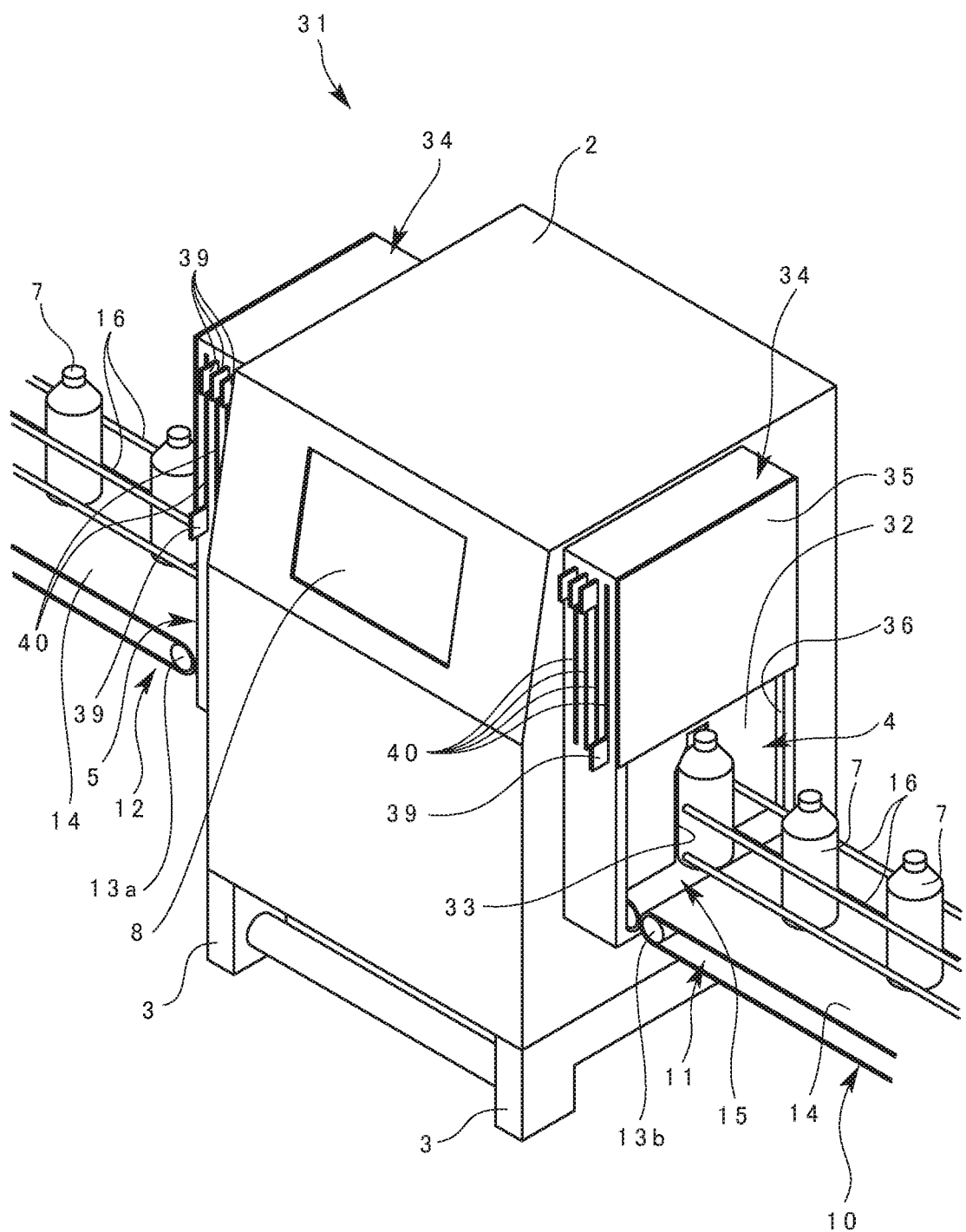
FIG. 5 is a perspective view of the X-ray inspection device according to an embodiment 1-2 of the present invention.
Figure 6:
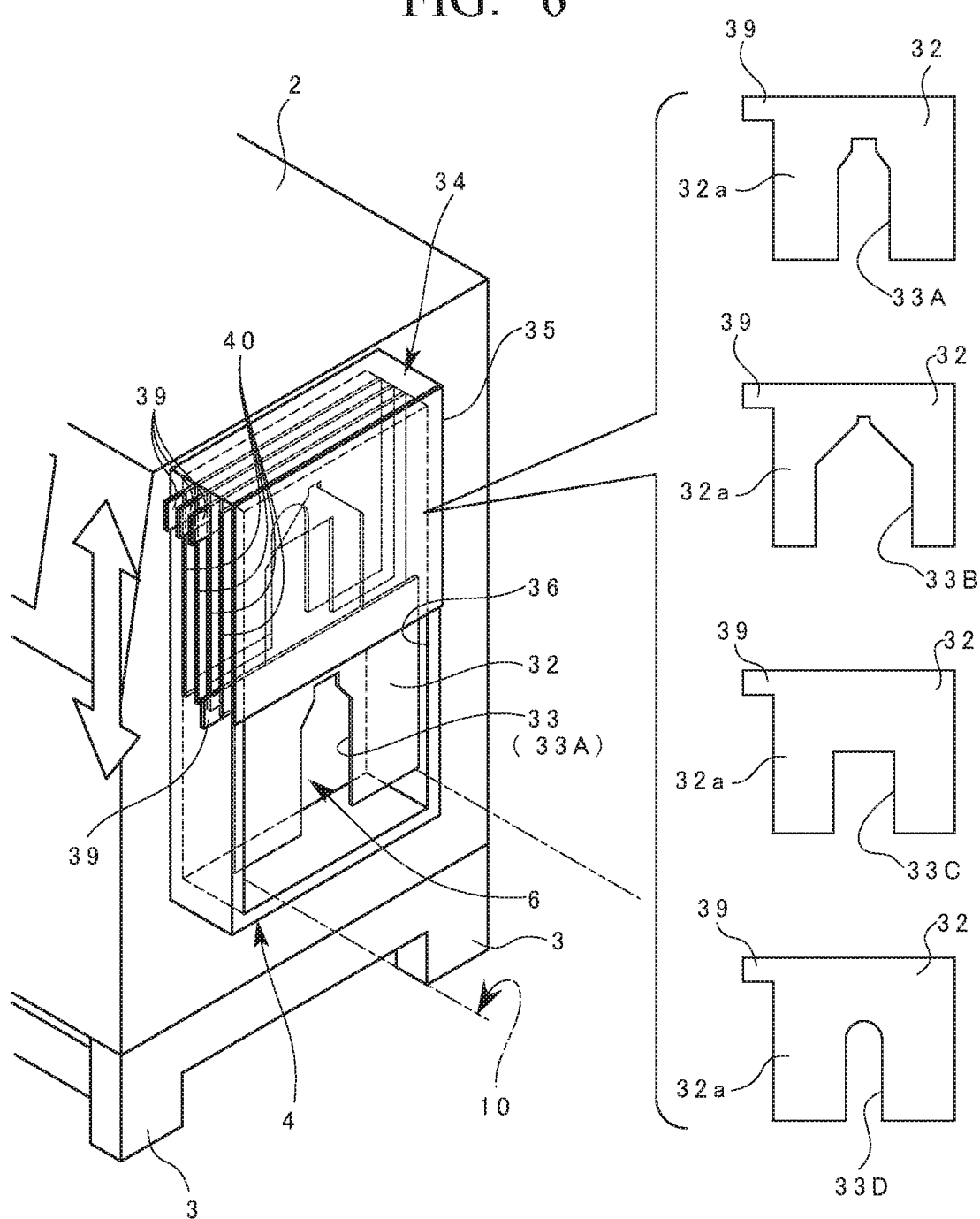
FIG. 6 is an enlarged view of primary elements in the vicinity of the shielding gate shown in FIG. 5.

FIG. 5 is a perspective view of the X-ray inspection device according to the embodiment 1-2. FIG. 6 is an enlarged view of primary elements in the vicinity of the shielding gate shown in FIG. 5. Note that in the embodiment 1-2, the constituent elements identical or equivalent to those described in the embodiment 1-1 will have the same reference numerals, and overlapped explanations of these elements will be omitted.

In an X-ray inspection device 31 according to the present embodiment, the housing 2 is provided with an approximately square-box case 34 accommodating plural types of shielding gates 32 corresponding to the outer shapes of plural types inspection objects 7, outside of at least one of the entrance 4 and the exit 5. In the present embodiment, as in the case of the embodiment 1-1, four types of shielding gates 32 having four types of passage parts 33A to 33D are provided as shown in FIG. 6. These four types of four shielding gates 32 are accommodated in the case 34. Note that the number and the number of types of the shielding gates 32 are not limited to the above number and the number of types.

The case 34 has a square shaped accommodation unit 35 accommodating the plural shielding gates 32, overlapped in a thickness direction i.e. the conveyance direction of the inspection object 7, in its upper half part. The case 34 also has a square shaped gate moving unit 36, having approximately the same volume as that of the accommodation unit 35, in its lower half part. The case 34 is formed by integrally connecting these units in a rectangular shape.

Figure 7:
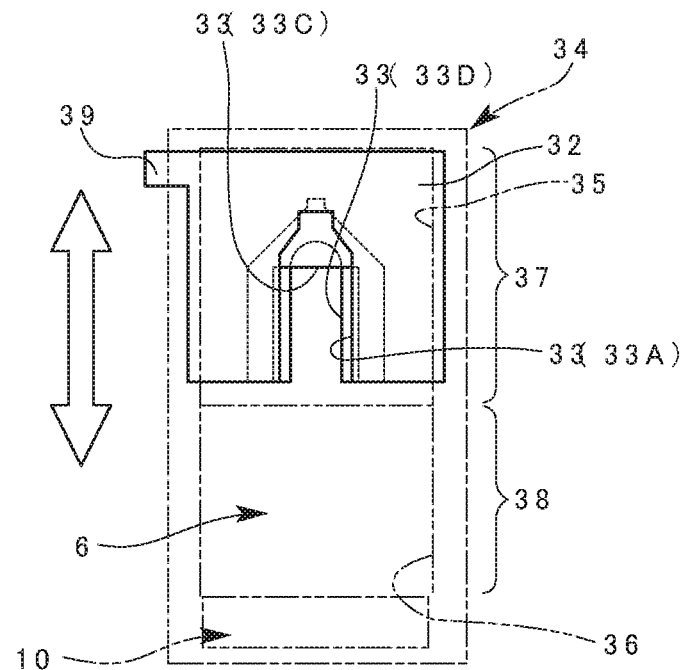
FIG. 7 is an explanatory diagram of an accommodation position and a shielding position of the shielding gate.
Figure 8:
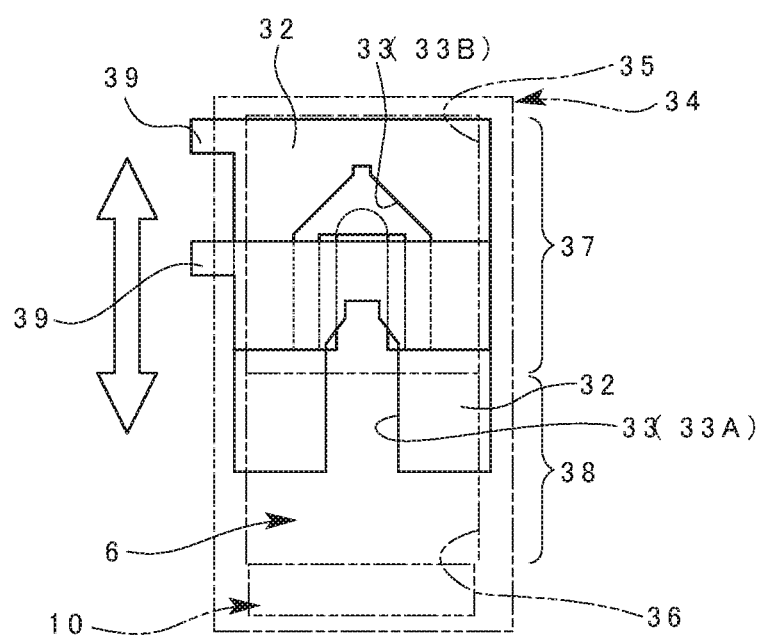
FIG. 8 is an explanatory diagram of operation in the shielding position in the middle of downward movement.

FIG. 7 is an explanatory diagram of accommodation position and shielding position of the shielding gate. FIG. 8 is an explanatory diagram of operation in the shielding position in the middle of downward movement.

In the present embodiment, the case 34 accommodates the shielding gates 32 slidably from the accommodation unit 35 in the upper part to the gate moving unit 36 in the lower part. Note that the moving direction of the shielding gate 32 may be the front-back direction of the housing 2 in addition to the above direction. The position in which the shielding gate 32 is accommodated in the accommodation unit 35 is an accommodation position 37. The position in which the shielding gate 32 is moved to the gate moving unit 36 is a shielding position 38. That is, the case 34 accommodates the shielding gates 32 respectively corresponding to the inspection objects 7, movably and changeably between the accommodation position 37 and the shielding position 38. The shielding position 38 exists inside the gate moving unit 36 formed in a frame shape as the entrance 4 or the exit 5, and in the shielded space 6 on the conveyance belt 14 of the conveyance unit 10.

As shown in FIG. 6, the shielding gates 32 accommodated in the case 34 respectively have an operation knob 39 projected from an upper end of one side edge 32a. In the accommodation unit 35 in the case 34, plural guide slits 40 to move the operation knobs 39 of the respective shielding gates 32 in the vertical direction are formed through in the thickness direction of the case 34.

Note that it may be configured such that the shielding gates 32 are respectively suspended with e.g. a spring and held in the accommodation position 37, and accommodated in the accommodation unit 35. With this configuration, an arbitrarily selected shielding gate 32 is moved downward against the spring restoring force. The moved-down shielding gate 32 is held in the shielding position 38 with a lock mechanism such as a hook or a pin. With this configuration, the selected shielding gate 32 maintains suppression of X-ray leakage in the shielding position 38. Further, the other shielding gates 32 are prevented from respectively falling to the shielding position.

Note that although not shown, as a slide mechanism for the shielding gate 32, it may be configured such that the case 34 includes a guide slit structure, similar to that in the embodiment 1-1, to respectively guide upward/downward movement of the shielding gates 32. Further, unlike the structure to slide the shielding gate 32 straight down i.e. in the falling direction, an inverse L-shaped guide structure to e.g. pull the shielding gate frontward once then drop it may be used. Further, in addition to the above-described slide mechanism to manually slide the shielding gate 32, a slide mechanism with an actuator to automatically move the shielding gate 32 upward/downward may be used.

In this manner, in the X-ray inspection device 31, one of the shielding gates 32, i.e., in the figure, the shielding gate 32, having the passage part 33A formed in correspondence with the shape of the inspection object 7, is moved down and placed on the conveyance path. Thus the passage part 33 corresponding to the shape of the inspection object 7 is formed in the shielded space 6.

Figure 9:
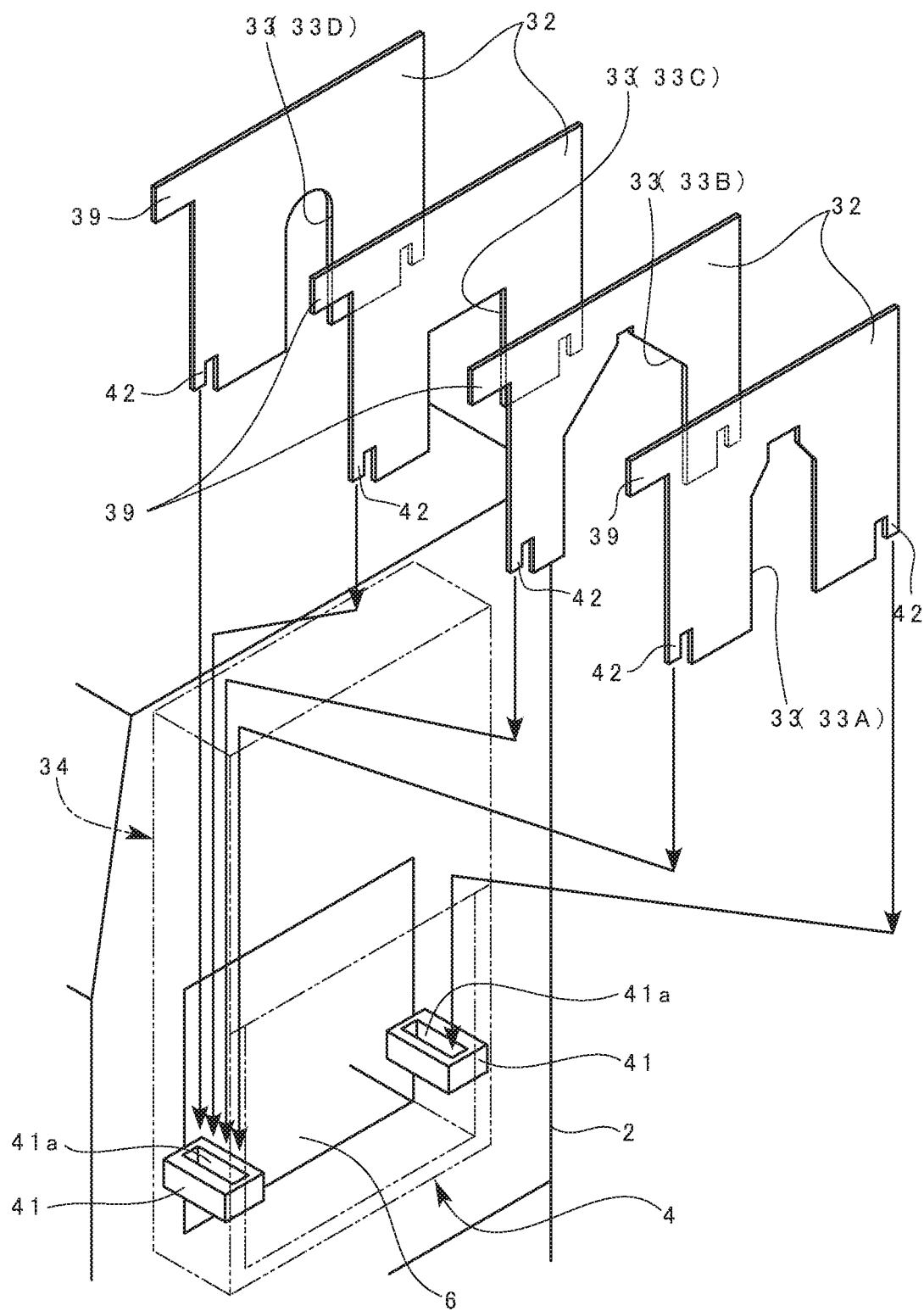
FIG. 9 is an exploded perspective view of primary elements of the X-ray inspection device, provided with an interlock, according to a modification of the embodiment 1-2.

FIG. 9 is an exploded perspective view of primary elements of the X-ray inspection device, provided with an interlock, according to a modification of the embodiment 1-2.

The X-ray inspection device 31 has an interlock mechanism 41 similar to the interlock mechanism of the X-ray inspection device 1 according to the embodiment 1-1. The interlock mechanism 41 has a hole 41a formed in an approximately long rectangular shape in the thickness direction of the shielding gate 32. The interlock mechanism 41 is formed such that a projection piece 42 of an arbitrarily selected shielding gate 32 enters the hole 41a. The operation of the interlock mechanism 41 is the same as that of the X-ray inspection device 1 according to the embodiment 1-1, accordingly, the explanation of the operation will be omitted.

According to the X-ray inspection device 31 described above, plural types of shielding gates 32 are previously accommodated in the accommodation position 37. One of the shielding gates 32, corresponding to the shape of the inspection object 7 is selected, and provided from the accommodation position 37 to the shielding position 38. When the shape of the inspection object 7 is changed, another shielding gate 32 corresponding to the new shape of the inspection object 7 is immediately provided. That is, the already-provided shielding gate 32 is moved from the shielding position 38 to the accommodation position 37, then the shielding gate 32 having the passage part 33 having the shape corresponding to the new shape of the inspection object 7 is moved from the accommodation position 37 to the shielding position 38. This configuration dispenses with a complicated operation to bring the shielding gate 32 with a passage part 33 formed in it in a necessary shape from another place and manually set the shielding gate 32, as in the case of the conventional art.

Further, in the X-ray inspection device 31, it is not necessary to separately manage the respective shielding gates 32 and the device itself. In comparison with a case where the plural shielding gates 32 having different types of passage parts 33 are stored by one gate, it is possible to collectively manage necessary types of plural shielding gates 32 accompanying the device in the management of the device. This facilitates management of the shielding gates 32, i.e., accommodation and carrying in/out of the shielding gates 32. As a result, it is possible to quickly respond to suppression of X-ray leakage with respect to different types of inspection objects 7.

Further, when the shielding gate 32 is changeable in a state where it is accommodated in the case 34, i.e., when the accommodation unit 35, accommodating four shielding gates 32, is changeable, it is possible to handle four more types of shielding gates 32. It is possible to accommodate more types of shielding gates 32 in the accommodation unit 35, in correspondence with more types of inspection objects 7.

Note that it may be configured such that the case 34 according to the above-described embodiment 1-2, provided along the outside of the housing 2, as described above in the above-described embodiment 1-2, is provided on the inside of the housing 2, in the vicinity of the entrance 4 or the exit 5. Further, when the case 34 is provided in the inside of the housing 2, the case 34 does not necessarily have a box shape. It may be configured such that the guide slits 40 are formed on the surface of the housing 2 itself and the operation knobs 39 of the respective shielding gates 32 are projected.

Embodiment 1-3

Next, the X-ray inspection device according to an embodiment 1-3 of the present invention will be described.

Figure 10:
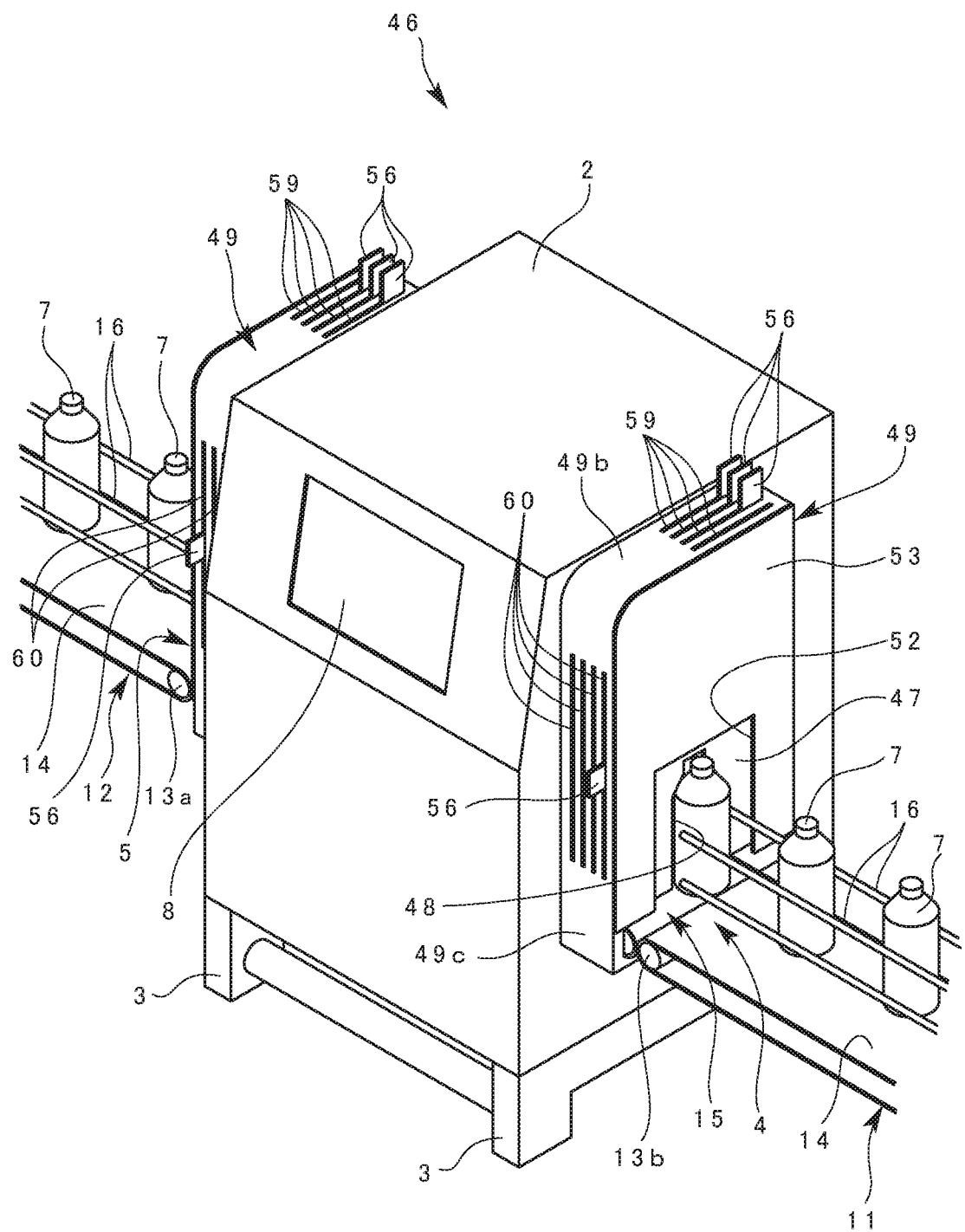
FIG. 10 is a perspective view of the X-ray inspection device according to an embodiment 1-3 of the present invention.
Figure 11:
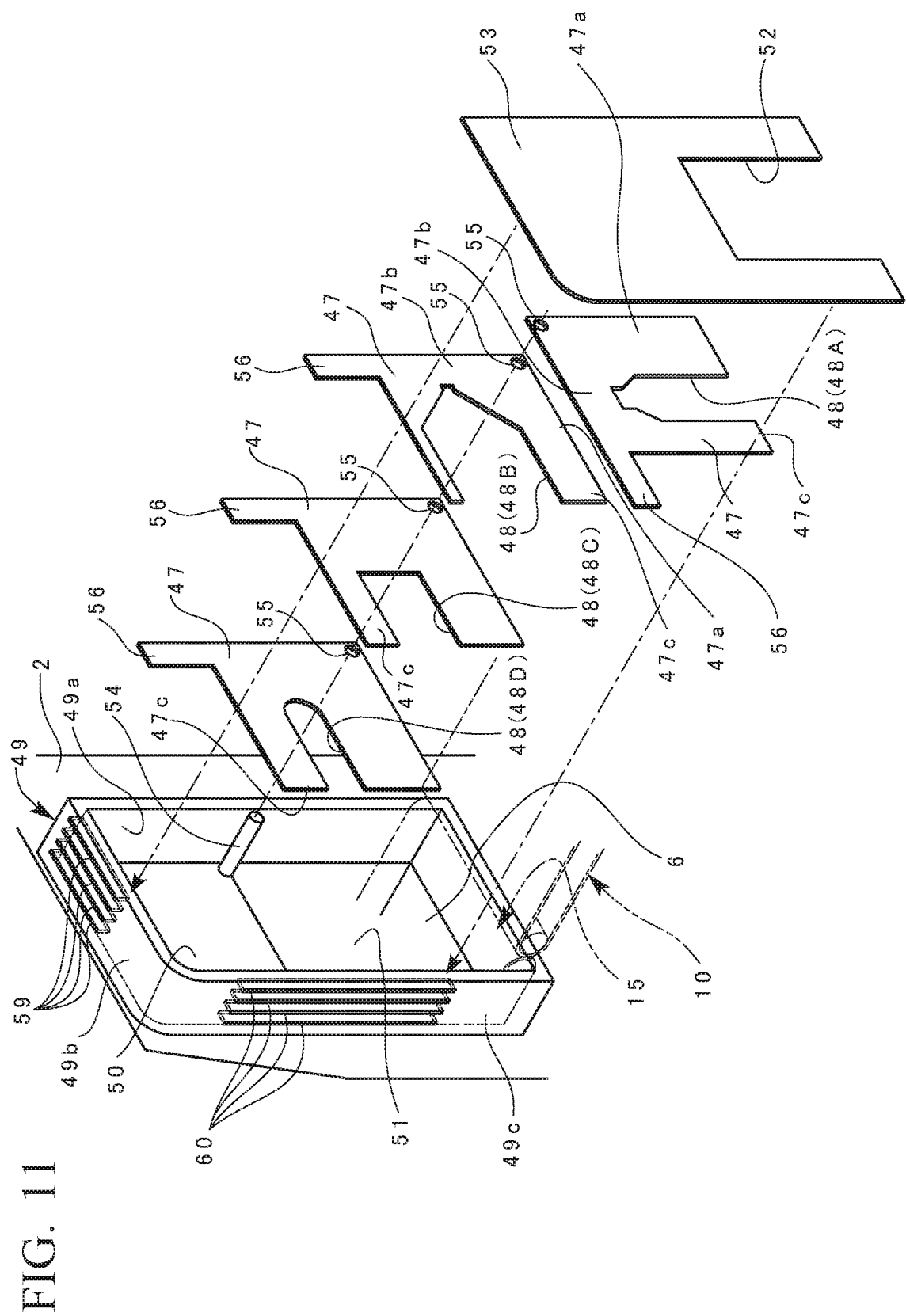
FIG. 11 is an exploded perspective view of the primary elements of the X-ray inspection device shown in FIG. 10.

FIG. 10 is a perspective view of the X-ray inspection device according to the embodiment 1-3. FIG. 11 is an exploded perspective view of the primary elements of the X-ray inspection device shown in FIG. 10. Note that in the embodiment 1-3, constituent elements identical or equivalent to those described in the embodiment 1-1 will have the same reference numerals, and overlapped explanations of these elements will be omitted.

An X-ray inspection device 46 according to the present embodiment has a case 49 accommodating plural types of shielding gates 47 having passage parts 48 corresponding to the outer shapes of plural types of respectively differently-shaped inspection objects 7, on the outside of at least one of the entrance 4 and the exit 5.

The case 49 has a square-shaped accommodation unit 50 accommodating plural shielding gates 47 laterally stacked in the thickness direction. The case 49 also has a square shaped gate moving unit 51 having approximately the same volume of that of the accommodation unit 50. Thus the case 49 is formed in a rectangular shape. The gate moving unit 51 is formed in a frame shape as the entrance 4 or the exit 5. The gate moving unit 51 is connected to the shielded space 6 in the housing 2. Note that a circular case cover 53, which covers the accommodation unit 50 and the gate moving unit 51, and which has a gate front opening 52 formed in a part of the gate moving unit 51, is attached to the case 49.

In the present embodiment, the case 49 has a support shaft 54 positioned between the accommodation unit 50 and the gate moving unit 51. The support shaft 54 has a length through the plural shielding gates 47. The support shaft 54 is horizontally provided in the vicinity of a side wall 49a as one of the pair of side walls in the case 49.

In the shielding gate 47, a support hole 55 which the support shaft 54 is inserted through is formed at a corner on the side edge 47a side of an upper part 47b. The respective shielding gates 47, in which the support shaft 54 is inserted through the support hole 55, are provided in the accommodation unit 50.

In the present embodiment, the case 49 accommodates the shielding gates 47, rotate-movably from the accommodation unit 50 in an upper part to the gate moving unit 51 in a lower part, about the support shaft 54. The position in which the shielding gate 47 is accommodated in the accommodation unit 50 is an accommodation position 57. The position in which the shielding gate 47 is moved to the gate moving unit 51 is a shielding position 58. That is, the case 49 accommodates the shielding gates 47, having passage parts 48 corresponding to the shapes of the inspection objects 7, rotatably at 90' and changeably, between the accommodation position 57 and the shielding position 58.

The respective shielding gates 47 accommodated in the case 49 are provided with an operation knob 56 similar to that in the embodiment 1-2.

In the accommodation unit 50 in the case 49, plural guide slits 59 to movably guide the operation knobs 56 of the respective shielding gates 47 are formed in the thickness direction in an upper surface 49b of the case 49. Further, plural guide slits 60, to avoid interference with lower edges 47c of the respective shielding gates 47 and to cause the operation knob 56 of the shielding gate 47 provided in the gate moving unit 51 to project, are formed in the thickness direction in a front surface 49c as the other side wall of the case 49.

Figure 12:
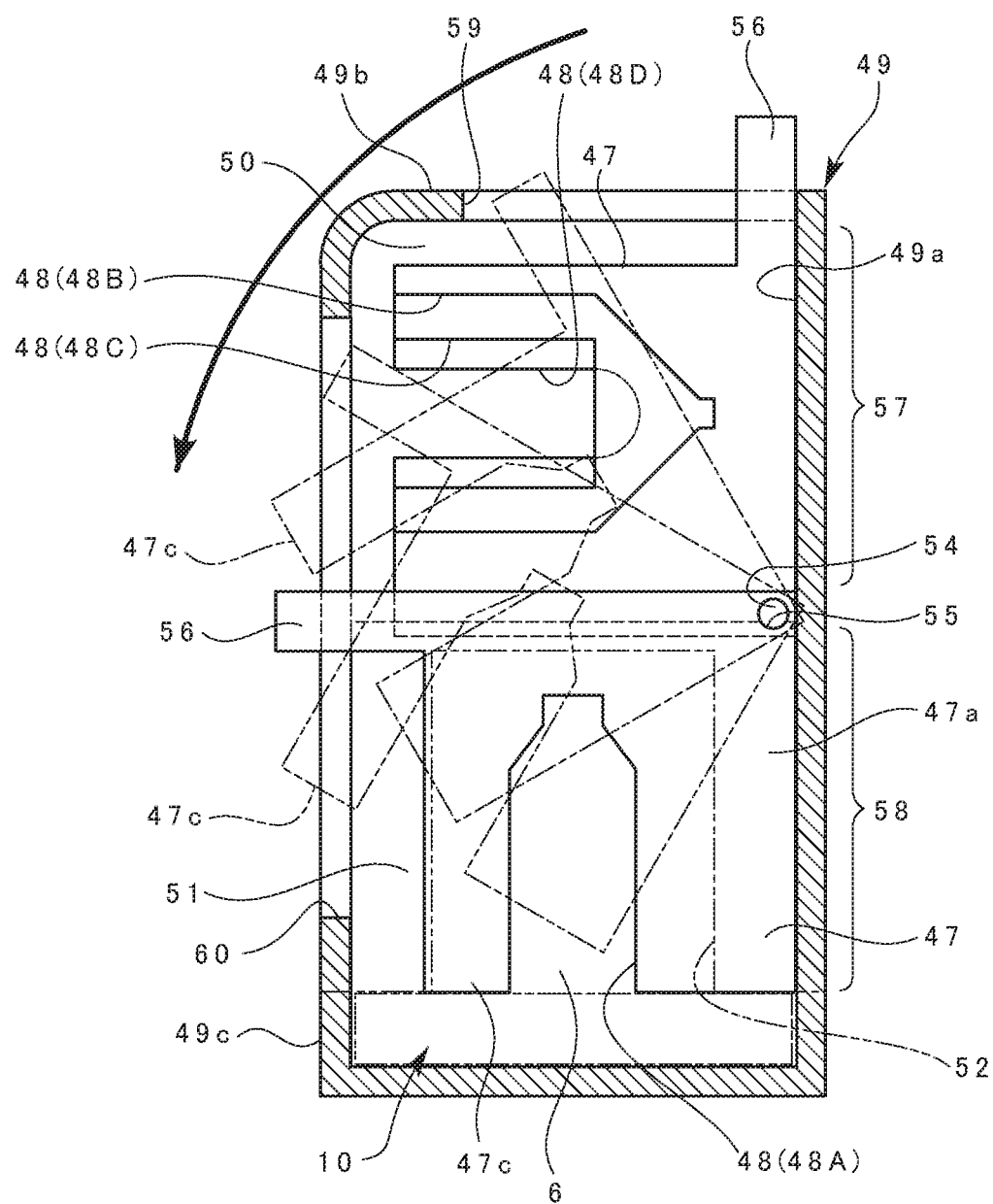
FIG. 12 is an explanatory diagram of operation in the X-ray inspection device according to the embodiment 1-3.

FIG. 12 is an explanatory diagram of operation in the X-ray inspection device according to the embodiment 1-3.

In the X-ray inspection device 46, the operation knob 56 of a desired shielding gate 47, projected from the guide slit 59 in the upper surface 49b of the case 49, is held, and the shielding gate 47 is rotated. In the shielding gate 47 rotated from the accommodation position 57, the side edge 47a on the support hole 55 side comes into contact with the inner wall 49a of the case 49. Thus the rotation of the shielding gate is regulated within 90°, and the shielding gate 47 is provided in the shielding position 58. At this time, the operation knob 56 is projected from the guide slit 60 formed in the front surface 49c of the case 49. Further, upon rotation of the shielding gate 49, the lower edge 47c of the shielding gate 47 is projected from the guide slit 60, so as to avoid interference with the case 49 (the alternate long and short dash line in FIG. 12). The change of the shielding gate 49 is performed by rotating the shielding gate 47 upward while holding the operation knob 56 provided in the guide slit 60 on the front surface 49c side, and returning the shielding gate 49 to the accommodation position 57. When the shielding gate 47 is returned to the accommodation position 57, once the operation knob 56 of the shielding gate 47 is moved to the back of the guide slit 60 on the front side, the lower edge 47c projected from the guide slit 60 as well as the operation knob 56 projected from the upper guide slit 59, are sequentially held, to rotate the shielding gate 47 to the accommodation position 57.

Note that although not shown, it may be configured such that a biasing member such as a spring to hold the shielding gate 47 in the accommodation unit 50 and a lock mechanism to hold the shielding gate 47 rotated downward against the restoring force of the biasing member in the shielding position 58 are provided in the case 49. With this configuration, it is possible to suppress unexpected entry of the shielding gate 47 accommodated in the accommodation unit 50 into the shielding position 58, and to infallibly hold the shielding gate 47 in the shielding position 58.

In this manner, in the X-ray inspection device 46, any one of the shielding gates 47 is rotated and moved downward. In the figure, the shielding gate 47 having a passage part 48A formed in correspondence with the shape of the inspection object 7 is rotated and downward. Then the shielding gate 47 is provided on the conveyance path of the inspection object 7. Thus the passage part 48A corresponding to the shape of the inspection object 7 is provided in the shielded space 6.

Note that in the above-described embodiment, the case 49 accommodates the four types of four shielding gates 47. The number of types and the number of the shielding gates 47 are not limited to these numbers. Further, the case 49 or the accommodation unit 50 and the gate moving unit 51 may be provided, within the housing 2, in the vicinity of the entrance 4 or the exit 5.

Figure 13:
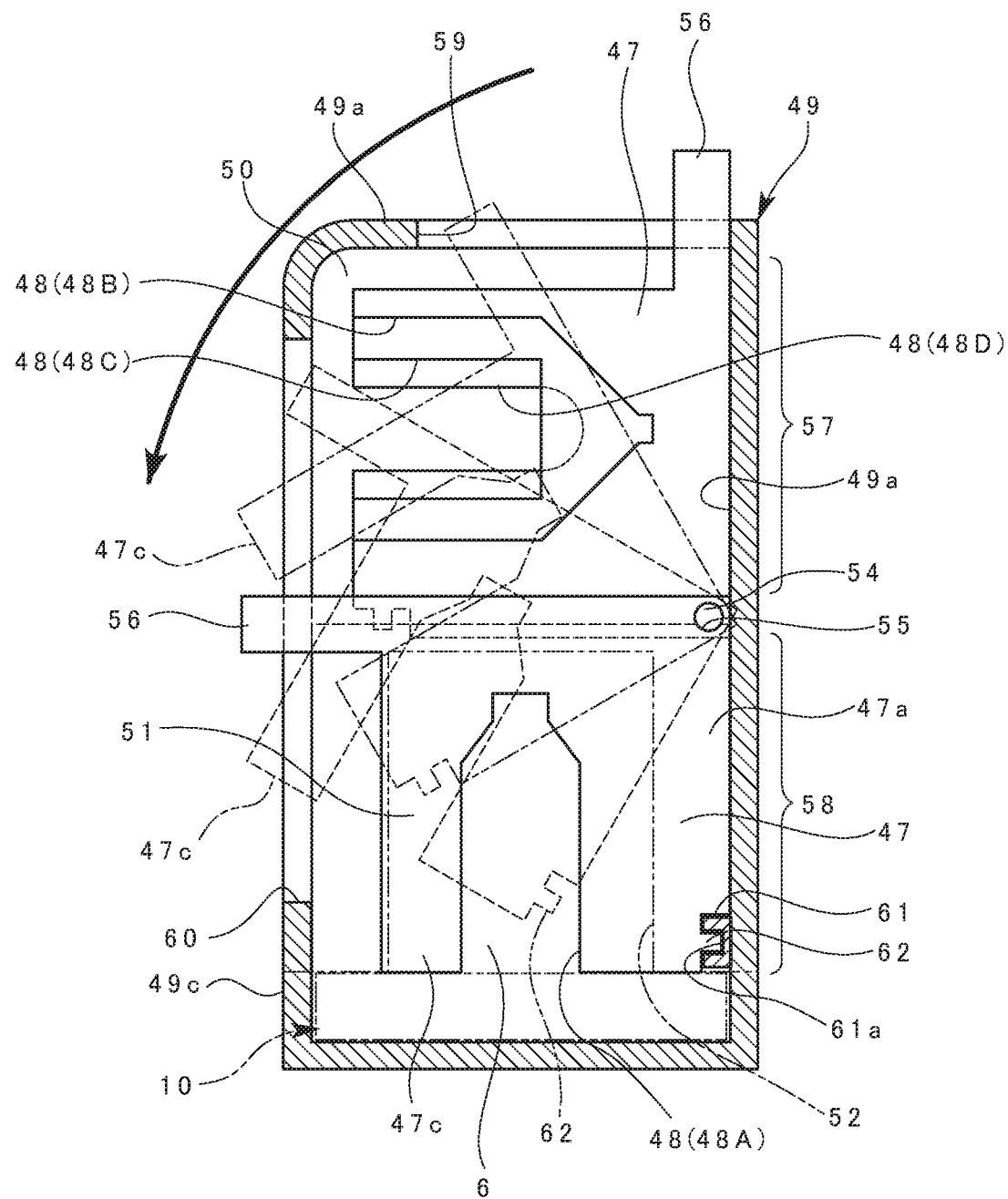
FIG. 13 is a front view showing the primary elements of the X-ray inspection device, provided with the interlock, according to the embodiment 1-3.

FIG. 13 is a front view showing the primary elements of the X-ray inspection device, provided with the interlock, according to the embodiment 1-3.

The X-ray inspection device 46 may be provided with an interlock mechanism 61 similar to that of the X-ray inspection device 1 according to the embodiment 1-1 or 1-2. The shielding gates 47 respectively have a projection piece 62 projected toward the rotation direction at a lower end corner of the side edge 47a in which the support hole 55 is formed. The interlock mechanism 61 is provided in a back part of the case 49 below the support shaft 54 in the case 49, for engagement with the projection piece 62 of the shielding gate 47. In this case, a hole 61a of the interlock mechanism 61 is formed in a long rectangular shape in the thickness direction of the shielding gate 47 as in the case of the hole 41a in the embodiment 1-2 shown in FIG. 9. A projection piece 62 of an arbitrarily selected shielding gate 47 enters the hole 61a of the interlock mechanism 61. The operation of the interlock mechanism 61 is the same as that in the X-ray inspection device 1 according to the embodiment 1-1, accordingly, the explanation of the operation will be omitted.

According to the X-ray inspection device 46, plural types of shielding gates 47 are previously accommodated in the accommodation position 57. One of the plural types of shielding gates 47, having the passage part 48 corresponding to the shape of the inspection object 7 is selected, and provided from the accommodation position 57 to the shielding position 58. When the shape of the inspection object 7 is changed, another shielding gate 47 having the passage part 48 corresponding to the new shape is immediately provided. That is, the shielding gate 47 already provided in the shielding position 58 is rotate-moved to the accommodation position 57, then the shielding gate 47 having the passage part 48 in the shape after the change is moved from the accommodation position 57 to the shielding position 58. This configuration dispenses with separate management of the shielding gates 47 from the device. This configuration further dispenses with a complicated operation to bring the shielding gate 47 from another place and manually set the shielding gate 47, as in the case of the conventional art.

Further, in the X-ray inspection device 46, it is unnecessary to manage the plural types of shielding gates 47 separately from the device. In comparison with a case where the plural types of shielding gates 47 having the passage parts 48 in different shapes are stored by one gate, it is possible to collectively manage necessary types of plural shielding gates 47 accompanying the device in advance. This facilitates management of the shielding gates 47, i.e., accommodation and carrying in/out of the shielding gates 47. As a result, it is possible to quickly respond to suppression of X-ray leakage upon inspection with respect to different types of inspection objects 7.

Embodiment 1-4

Figure 14:
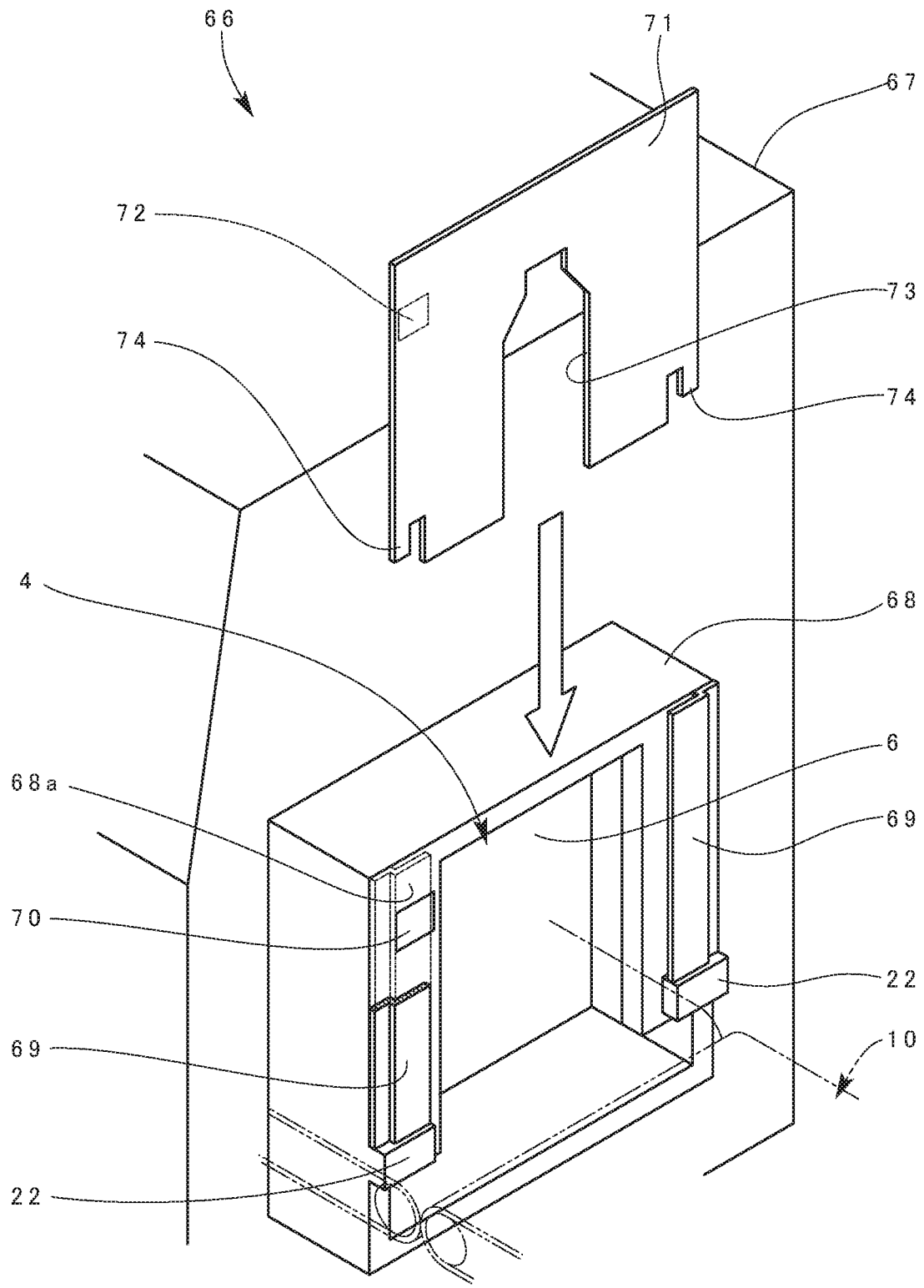
FIG. 14 is a perspective view of enlarged primary elements of the X-ray inspection device according to an embodiment 1-4 of the present invention.
Figure 15:
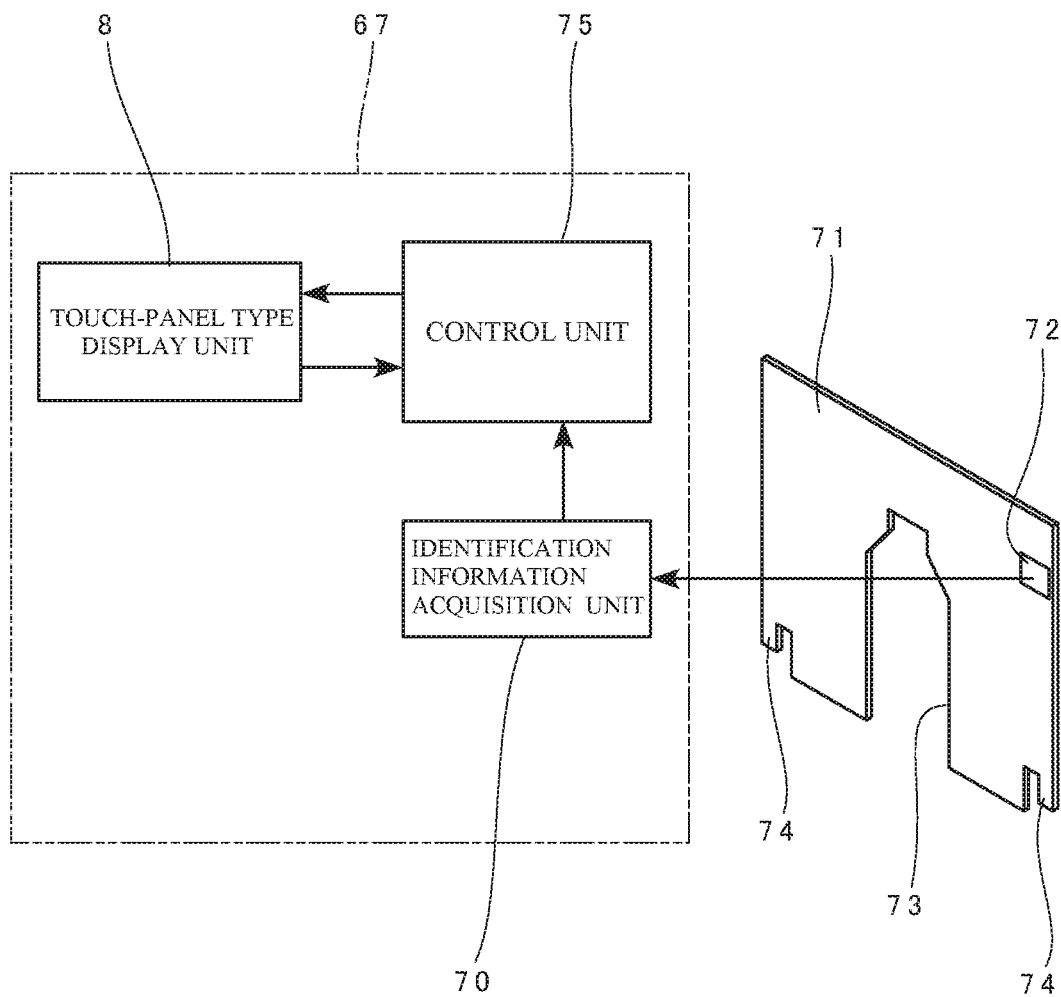
FIG. 15 is a block diagram showing a configuration of a shielding gate discriminating function.

Next, the X-ray inspection device according to an embodiment 1-4 of the present invention will be described. FIG. 14 is a perspective view of enlarged primary elements of the X-ray inspection device according to the embodiment 1-4. FIG. 15 is a block diagram showing a configuration of a shielding gate discriminating function. Note that in the embodiment 1-4, constituent elements identical or equivalent to those described in the embodiment 1-1 will have the same reference numerals, and overlapped explanations of these elements will be omitted.

An X-ray inspection device 66 according to the present embodiment has an identification information acquisition unit 70 on the housing 67 side, and an identification part 72 in a shielding gate 71.

As in the case of the above-described embodiment 1-1, the shielding gate 71 has a passage part 73 in a shape corresponding to the outer shape of the inspection object 7. Further, the shielding gate 71 has a projection piece 74 at a corner of a lower edge. The identification part 72 provided in the shielding gate 71 is an identifier to specify the shielding gate 71 including code information such as one dimensional bar code or QR code (registered trademark), a mark such as a symbol, character(s), color(s) or combination of them. The identification part 72 is provided in the vicinity of a corner of one surface of the shielding gate 71 facing the housing 67 side by printing, attachment processing or the like. As described above, the identification part 72 is unique identification information to discriminate the respective plural types of shielding gates 71 having the passage parts 73 in different shapes corresponding to the respective inspection objects 7. Any one of the above-described code information, marks and the like is selected and provided.

The identification information acquisition unit 70 is provided on the front surface 68a of a frame body 68 on the housing 67 side. In the present embodiment, as shown in FIG. 14, the identification information acquisition unit 70 is provided in a position covered with one guide rail 69, opposite to the identification part 72 of the shielding gate 71 inserted in the guide rails 69. The identification information acquisition unit 70 is a reading device to read the identification information of the identification part 72. For example, when the identification information is one dimensional bar code, the identification information acquisition unit 70 is a bar code reader. When the identification information is a mark, character(s), color(s) or the like, the identification information acquisition unit 70 may be an optical sensor or a camera to read the information.

The identification information acquisition unit 70 is connected to a control unit 75 incorporated in the X-ray inspection device 66 main body 66. The identification information read from the identification part 72 is transmitted to the control unit 75. The control unit 75 monitors the state of the interlock mechanism 22 and the like, and controls irradiation of X-ray from the X-ray generating device and driving of the conveyance unit 10. Further, the control unit 75 is connected to the touch panel type display unit 8 (see FIG. 1) or the like provided on the front surface of the housing 67. The control unit 72 determines whether or not the attached shielding gate 71 having the passage part 73 corresponds to product class information of the inspection object 7 inputted at the touch panel type display unit 8 and the shape of the inspection object 7.

According to the X-ray inspection device 66, the shielding gate 71 having the passage part 73 formed in correspondence with the shape of the inspection object 7 is retractably provided in a shielding position between the right and left guide rails 69 within the shielded space 6 between the entrance 4 and the exit 5. As one of the shielding gates 71 is selected from the plural shielding gates 71 having the passage parts 73 in different shapes corresponding to the plural types of inspection object 7, and is inserted in the guide rails 69, the opening area of the entrance 4 and the exit 5 is reduced to an area surrounded with the outer shape of the inspection object 7. When the shielding gate 71 is inserted along the guide rails 69, the projection piece 74 is inserted into the interlock mechanism 22. With this operation, the correct positioning of the shielding gate 71 in the shielding position is detected. At the same time, the identification part 72 of the shielding gate 71 faces the identification information acquisition unit 70. The identification information acquisition unit 70 reads the information described in the identification part 72, and the information is transmitted to the control unit 75. The shapes of the inspection objects 7 are previously inputted in the control unit 75. The control unit 75 compares the identification information of the identification part 72 as information on the shape of the passage part 73 of the attached shielding gate 71 with the shape of the inspection object 7. When the control unit 75 determines that the identification information corresponds to the shape of the inspection object, it determines that X-ray irradiation is possible, and starts driving of the device.

Note that when the attached shielding gate 71 does not correspond with the inspection object 7 input-set with the touch panel type display unit 8, i.e., when the outer shape of the inspection object 7 and the shape of the passage part 73 of the shielding gate 71 attached to the shielding position are different, the control unit 75 notifies the outside of the situation. For example, the control unit 75 displays an alert indicating that the shapes are different on the screen, or emits alarming sound to notify the operator of the situation. When the shape of the inspection object 7 and the shape of the passage part 73 are different, there is a risk of X-ray leakage. When these shapes are different, even though the interlock mechanism 22 has correctly operated, the control unit 75 invalidates the interlock release, not to perform X-ray irradiation, and does not start driving of the device until safety is secured.

In this manner, according to the X-ray inspection device 66 according to the present embodiment, the device is not operated as an inspection device unless the shielding gate 71, having the passage part 73 corresponding to the outer shape of the inspection object 7, is correctly selected and attached to the shielding position. That is, it is possible to select one shielding gate 71, having the passage part 73 in the shape corresponding to the outer shape of the inspection object 7, and provide the selected shielding gate 71 in the shielding position. It is possible to quickly form a passage entrance to suppress X-ray leakage. Further, it is possible to determine whether or not the shape of the passage part 73 is different from the outer shape of the inspection object 7, upon attachment of the shielding gate, based on the information of the identification part 72 provided in the shielding gate 71. When a wrong shielding gate 71 different from the previously set information in the device has been selected, the driving of the device is not started, and the X-ray irradiation and the like are not performed, thus the operator is notified of the wrong selection of the shielding gate 71. That is, it is possible to cause the operator to notice the selection mistake, prevent driving of the device in a state where a wrong shielding gate is attached, i.e., avoid the risk of X-ray leakage, and to ensure safety.

Note that the identification information acquisition unit 70 and the identification part 72 of the X-ray inspection device according to the embodiment 1-4 are applicable to the X-ray inspection devices according to the above-described embodiments 1-2 and 1-3. In such case, the respective shielding gates are provided with the identification part 72 having identification information. Further, the information acquisition unit is provided so as to obtain the information from the identification part of the shielding gate when the shielding gate is provided in the shielding position. With this configuration, as in the case of the previously described embodiments, it is possible to determine whether or not the shielding gate has the passage part corresponding to the outer shape of the set inspection object. When the shape of the passage part is different from the outer shape of the inspection object, it is possible to perform control not to start driving of the device and prohibit X-ray irradiation. Thus it is possible to improve safety.

Note that the present invention is not limited to the above-described respective embodiments. For example, in the above embodiments, the shielding gates 19, 32 and 47 are provided at the entrance 4 and the exit 5, however, the shielding gates 19, 32, and 47 may be provided together with the conventional tunnel-shaped extension cover, or may be provided on the outer side surface and the inside of the housing 2, thus in combination, in plural positions. Further, the shielding gates 19, 32, and 47 may be provided in any position with respect to the shielded space 6. Further, the number of provided shielding gates may be more than one. For example, two shielding gates having the passage parts formed in the same shape are provided on the entrance 4 side such that two inspection objects are simultaneously carried in and out with respect to the shielded space 6. Further, when the shielding gates 19, 32, and 47 having the passage parts 20, 33, and 48 in the same shape are provided in plural positions in the shielded space 6, the device may be provided with a structure to simultaneously move the shielding gates. For example, the device may be provided with a mechanism to simultaneously carry in and out the shielding gates 19, 32, and 47 on the entrance 4 side and the exit 5 side with respect to the shielded space 6.

Further, the shielding gate may be formed with not the above-described SUS plate but a flexible material. Further, an accommodation structure to wind the shielding gates may be provided. In this case, the shielding gates wound in a curtain or roll-screen shape may be provided in plural positions shifted in the vertical direction, or may be arrayed in the conveyance direction of the inspection object.

The primary reference numerals in the first embodiment are as follows.

1, 31, 46, and 66 . . . X-ray inspection device
6 . . . shielded space
7 . . . inspection object
10 . . . conveyance unit
19, 32, 47, and 71 . . . shielding gate
20, 33, 48, and 73 . . . passage part
37 and 57 . . . accommodation position
38 and 58 . . . shielding position
70 . . . identification information acquisition unit
72 . . . identification part Second Embodiments Embodiment 2-1

Figure 16:
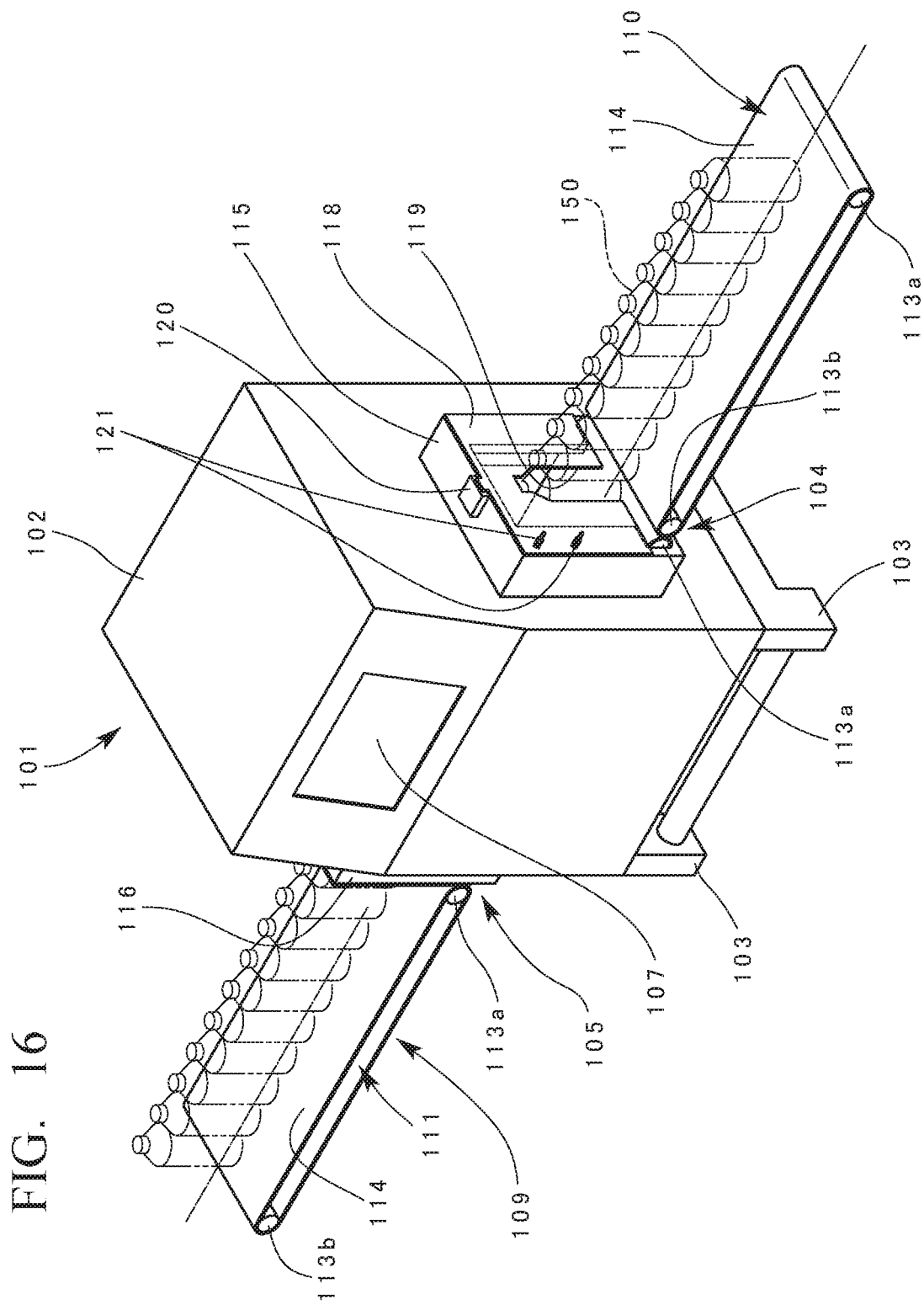
FIG. 16 is a perspective view of the X-ray inspection device according to an embodiment 2-1 of the present invention.
Figure 17:
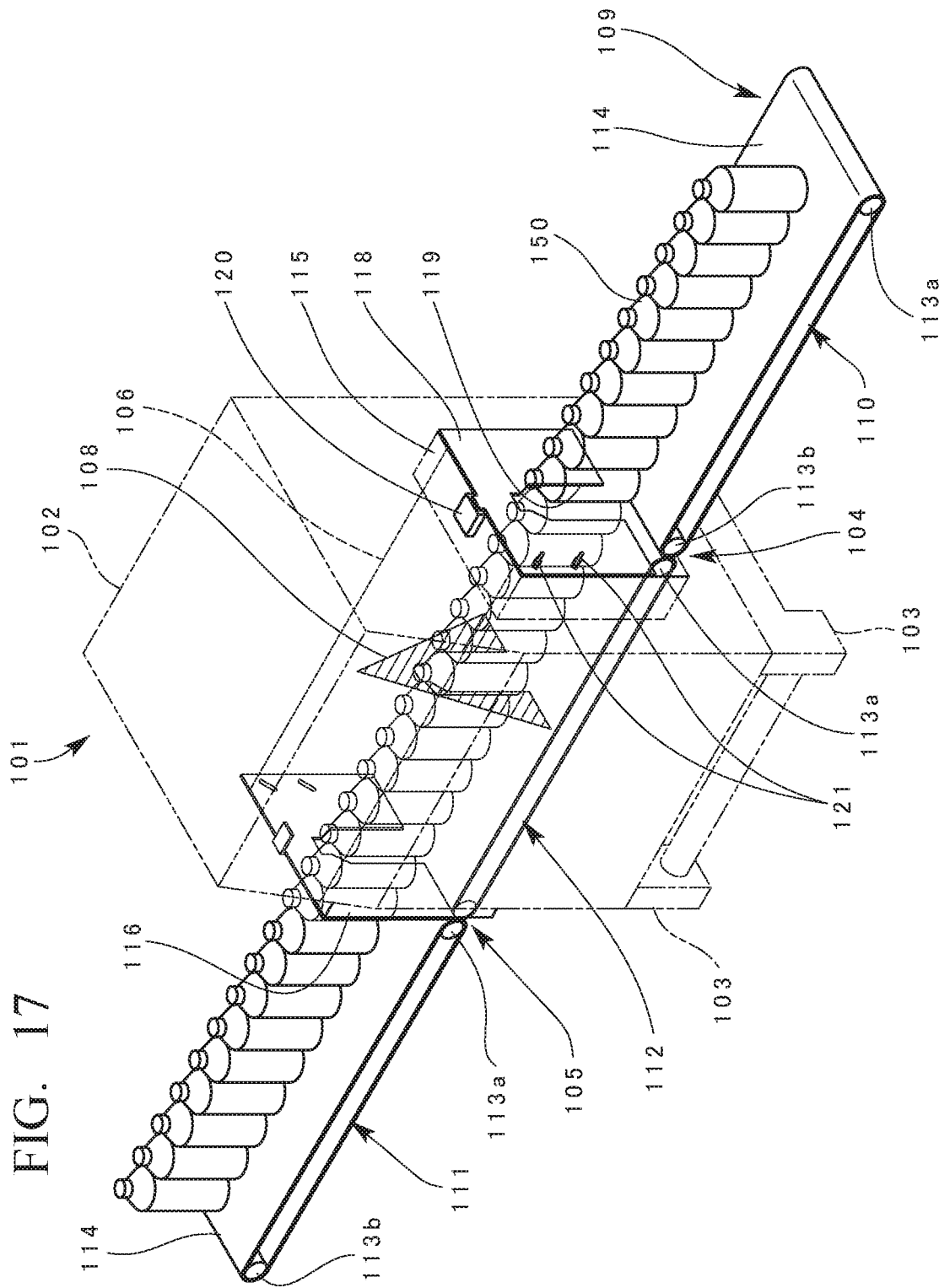
FIG. 17 is a perspective view showing the inside of the case of the X-ray inspection device shown in FIG. 16.

FIG. 16 is a perspective view of the X-ray inspection device according to an embodiment 2-1 of the present invention. FIG. 17 is a perspective view showing the inside of the housing of the X-ray inspection device shown in FIG. 16.

An X-ray inspection device 101 according to the embodiment 2-1 has a box-shaped housing 102. The housing 102 is supported with e.g. four legs 103 on an installation surface. The housing 102 is formed by using a radiation protective material to prevent X-ray leakage from the inside by a harmful amount to the outside. More specifically, the housing is lined with a shielding material such as lead.

The housing 102 has an entrance 104 and an exit 105 which an inspection object 150 is passed through in its both side surfaces. Note that in the present embodiment, in the figure, the entrance 104 is formed on the right side of the housing 102, and the exit 105 is formed on the left side of the housing 102. The space between the entrance 104 and the exit 105 is shielded space 106. Further, the housing 102 has a touch-panel type display operation unit 107 as a touch-panel display screen for checking of inspection result, display of various information, input operation and the like, on its front surface.

The housing 102 includes an X-ray generating device (not shown). The X-ray generating device irradiates an X-ray toward the inspection object 150 conveyed in the shielded space 106. The X-ray forms an approximately triangular plane-shaped inspection region 108 spread in an emission direction from an X-ray tube, and irradiates the inspection object 150. The irradiated X-ray is received with a sensor (not shown). The sensor photoelectric-converts the X-ray, and outputs the converted result to an inspection processing unit (not shown) of the device main body. Note that in the X-ray inspection device 101 shown in FIG. 17, the X-ray is irradiated toward the inspection object 150 from an upper position. However, the X-ray irradiation may be performed from e.g. a diagonal direction or a side direction to the inspection object 150 in correspondence with the inspection of the inspection object 150.

A conveyance unit 109 is provided through the housing 102. In the present embodiment, the conveyance unit 109 has an entrance conveyance unit 110 on the entrance 104 side, an exit conveyance unit 111 on the exit 105 side, and an inner conveyance unit 112 between the entrance conveyance unit 110 and the exit conveyance unit 111 and inside the housing 112. The entrance conveyance unit 110, the exit conveyance unit 111, and the inner conveyance unit 112 have plural rollers 113a and 113b, and an endless-type conveyance belt 114 put between the rollers 113a and 113b. In the entrance conveyance unit 110, the exit conveyance unit 111, and the inner conveyance unit 112, the roller 113a or 113b is driven with a driving unit such as a motor attached to the main body, and the conveyance belt 114 circulate-moves in accordance with the driving of the roller, to transfer the inspection object 150 placed on the conveyance belt 114 on the upper side. The inspection object 150, conveyed with the entrance conveyance unit 110 to the entrance 104, is transferred to the inner conveyance unit 112 provided inside the housing 102. In the housing 102, the inspection object 150 is irradiated with the X-ray, then is transferred from the inner conveyance unit 112 to the exit conveyance unit 111, and the X-ray inspection is ended. Note that although not shown, the entrance conveyance unit 110, the exit conveyance unit 111, and the inner conveyance unit 112 may be provided with a pair of guide bars to prevent falling of the inspection object 150 and to guide the inspection objects 150 in line in the conveyance direction. Further, conveyance unit 109 may not be necessarily divided into the above-described entrance conveyance unit 110, the exit conveyance unit 111, and the inner conveyance unit 112, but may be one conveyance unit. The driving unit such as the motor may not be provided in the device main body. The driving may be performed with an outside device.

In the subsequent stage from the X-ray inspection device 101, e.g., a selection device to discriminate the quality of the inspection object 150 is provided.

In the housing 102, the entrance 104 and the exit 105 are provided with rectangular frame-shaped frame bodies 115 and 116 projected to the outside of the housing 102. The respective frame bodies 115 and 116 are formed to surround the entrance 104 and the exit 105. Note that the frame bodies 115 and 116 are projected by a slight amount, and the length of projection of the frame bodies 115 and 116 with respect to the outside of the housing 102 is not as long as the length of the conventional tunnel-shaped extension cover. The frame bodies have a frame-type thickness with respect to the entrance 104 and the exit 105 of the housing 102. The entrance conveyance unit 110, the exit conveyance unit 111, and the inner conveyance unit 112 are provided along a lower edge on the inside of the frame bodies 115 and 116. The respective frame bodies 115 and 116 communicate with the inside of the housing 102 via the entrance 104 and the exit 105. Accordingly, the inside of the frame bodies 115 and 116 corresponds to the shielded space 106. The frame bodies 115 and 116 form the shielded space 106 in a tunnel shape continuing to the inside of the housing 102, between the entrance 104 and the exit 105. Note that the shielded space 106 includes a position in which X-ray irradiation is performed with the X-ray generating device for inspection of the inspection object 150. The inspection object 150 is carried in and out with respect to the X-ray irradiation position in the shielded space 106. Further, the shielded space 106 is formed for prevention of X-ray leakage. Further, as in the case of the housing 102, the frame bodies 115 and 116 are formed by using a radiation protective material so as to prevent X-ray leakage from the inside by a harmful amount to the outside.

In the frame bodies 115 and 116, a shielding gate 118 is provided in a frame body opening 117 (see FIG. 20) on the outside opposite to the housing 102. The frame bodies 115 and 116, and the shielding gate 118 are provided at least one of the entrance 104 and the exit 105 so as to prevent X-ray leakage. In the present embodiment, the frame bodies 115, 116 and the shielding gate 118 are provided at the both entrance 104 and the exit 105. In the present embodiment, the shielding gate 118 is carried in and out with respect to the shielded space 106 inside the frame bodies 115 and 116 attached to the outer side surfaces of the housing 102. The position of the frame body opening 117 is the shielding position.

Further, the shielding gate 118 may be carried in and out with the inside of the frame bodies 115 and 116 on the slightly inside from the frame body opening 117, i.e., a slightly back position from the frame body opening 117, or any position in the shielded space 106 inside the housing 102, as the shielding position.

Note that in the following description, the respective configurations where the shielding gate 118 is provided at the entrance 104 will be described using the respective figures.

As the shielding gate 118, plural types of shielding gates having passage parts 119 in shapes corresponding to the shapes of the inspection objects 150 are prepared. One shielding gate 118 is selected from the plural types of shielding gates in correspondence with a particular type of inspection object 150, and retractably provided at an opening (entrance 104) of the housing 102 which the inspection object 150 is passed through.

The shielding gate 118 is formed with a stainless steel plate such as SUS, or a plate-shaped member which is made of an X-ray shielding material or a material including the X-ray shielding material. The passage part 119 is formed in correspondence with the outer shape of the inspection object 150. More particularly, in the square shaped shielding gate 118, a part of a lower edge is released, and the passage part 119 formed in correspondence with the contour of the inspection object 150 is formed in an approximately C shape. The lower edge is released so as to prevent interference with the inspection object 150 placed on and transferred with the conveyance belt 114 of the conveyance unit 109. The passage part 119 is formed almost along the contour of the inspection object 150. For example, when the passage part 119 is formed in correspondence with the shape of a milk carton, the contour of the upraised paper part at the upper end is not necessarily accurately formed. The passage part 119 is formed almost along the contour of the inspection object to avoid reduction of the conveyance due to catching of the inspection object with the passage part.

Figure 18:
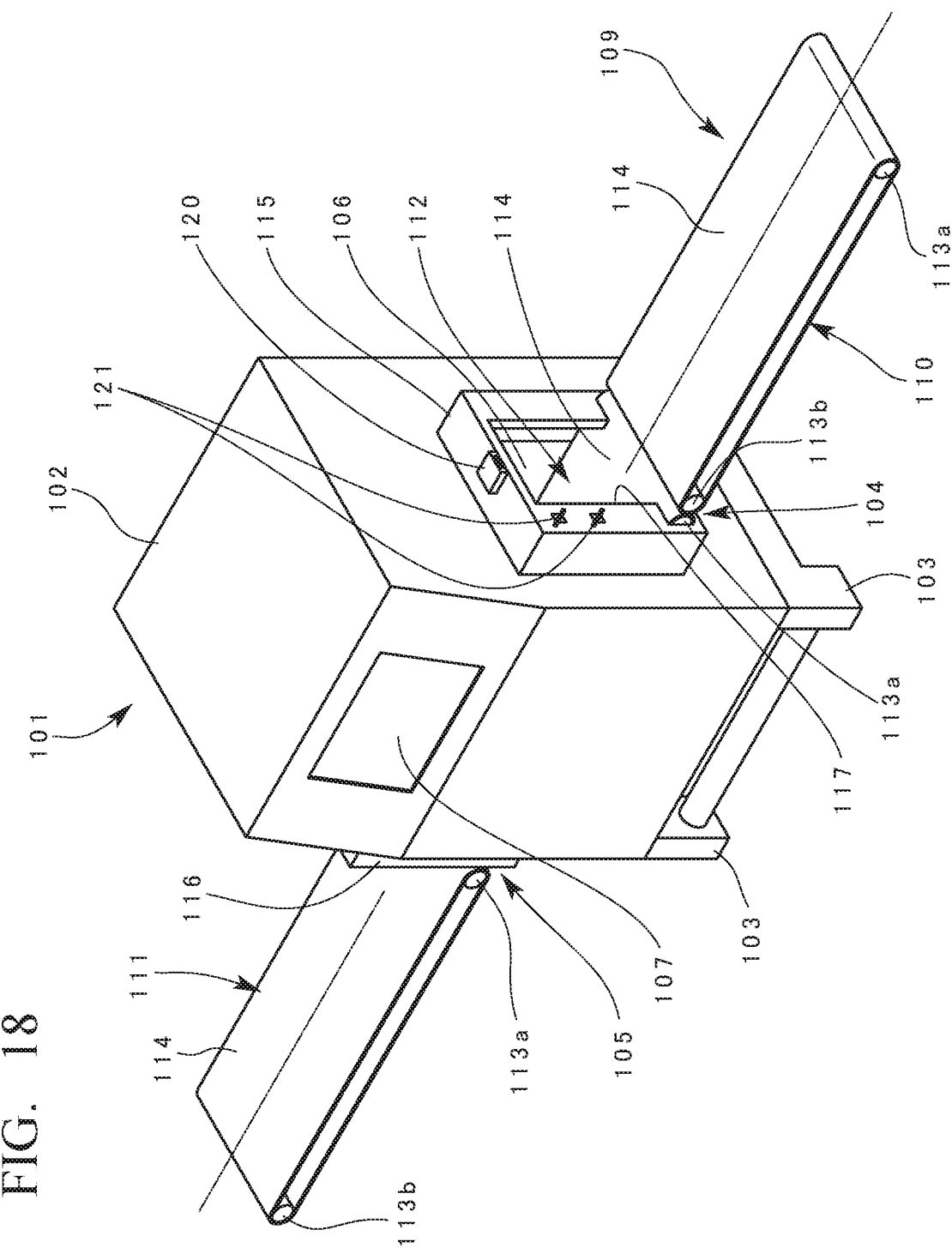
FIG. 18 is a perspective view of the X-ray inspection device shown in FIG. 16 before attachment of the shielding gate.

FIG. 18 is a perspective view of the X-ray inspection device shown in FIG. 16 before attachment of the shielding gate.

In the X-ray inspection device 101, an identification number of the inspection object 150 is inputted with the above-described display operation unit 107 provided on the housing 102. The identification number is set by type of the inspection object 150, i.e., outer shape of the inspection object. The identification number inputted from the display operation unit 107 is sent to a device control unit (not shown).

A main body engagement part 121 is provided around the entrance 104 of the housing 102 in the vicinity of the shielding position. In the present embodiment, the main body engagement part 121 is provided in a left upper position of the entrance 104 in front view, but the position of the main body engagement part is not limited to this position. The main body engagement part 121 is set in an engageable state with the shielding gate 118 corresponding to a particular type of inspection object 150 by selecting the particular type inspection object 150 from the plural types of inspection objects 150. In the present embodiment, the main body engagement part 121 is engageable with the gate engagement part 122 to be described later provided in the shielding gate 118.

Further, an interlock unit 120 is provided around the entrance 104 of the housing 102. In the present embodiment, the interlock unit 120 is provided at an upper center of the entrance 104 in front view; however, the position of the interlock unit is not limited to this position. The interlock unit 120 prohibits X-ray irradiation unless the shielding gate 118 is provided in a regular state at the entrance 104 of the housing 102 by engagement between a gate engagement part 122 of the shielding gate 118 and the main body engagement part 121.

Figure 19:
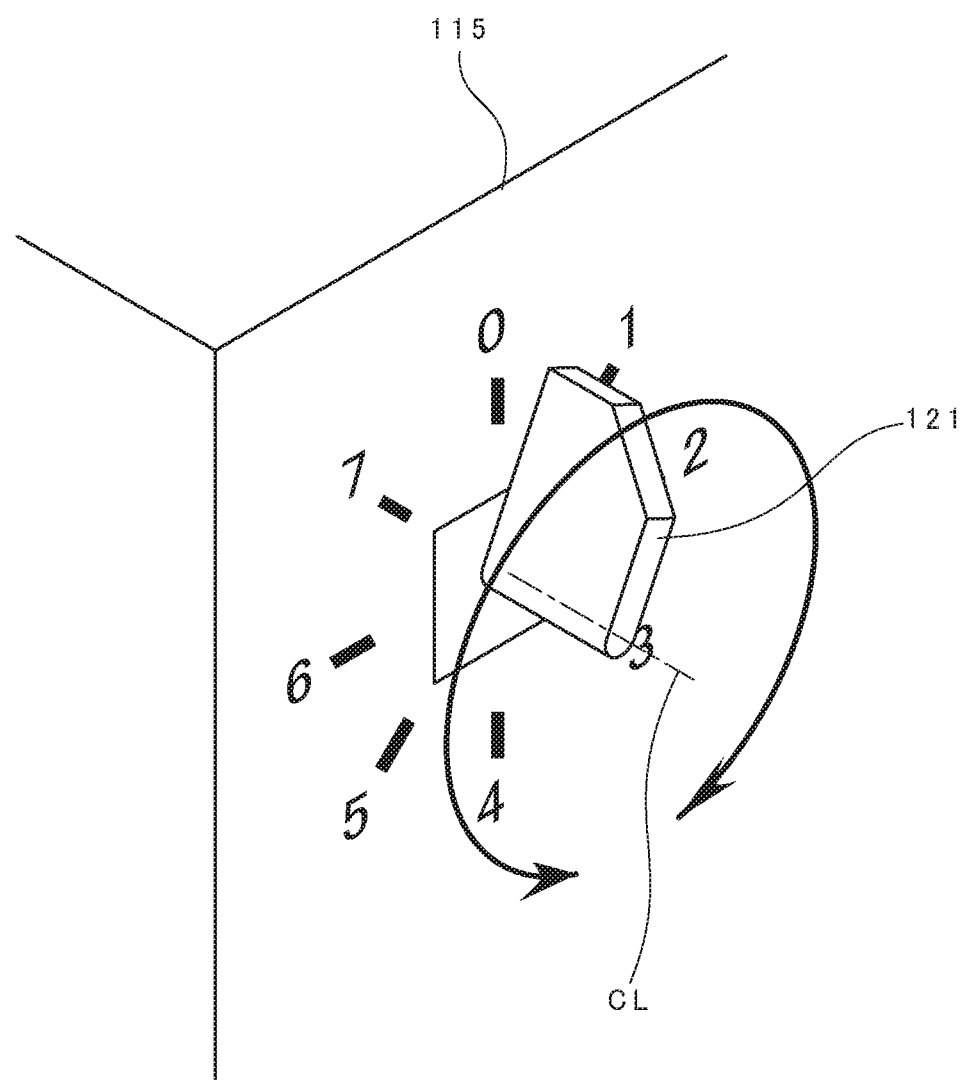
FIG. 19 is an enlarged view of an operation knob shown in FIG. 18.

FIG. 19 is an enlarged view of the operation knob shown in FIG. 18.

The main body engagement part 121 may be a projection. In the present embodiment, the projection is the operation knob 121. The operation knob 121 is configured for rotation operation to select a particular type of inspection object 150. As the operation knob 121, e.g., a rotary switch is used. The operation knob 121 is a rotary setting projection member having a knob part extended in a wing shape from one side with respect to a rotation axis CL. That is, with the rotation of the operation knob, the direction of the knob part is changed with respect to the rotation center. The operation knob 121 is formed with click-operation feeling and a stop position. In the present embodiment, the operation knob 121 provides click-operation feeling by 45° and the rotation is stopped. That is, it is stopped in eight directions with respect to the rotation axis CL. The operation knob 121 presents 0 to 7, i.e., eight identification numbers in correspondence with the directions. The eight identification numbers are transmitted as identification signals to the device control unit.

Figure 20:
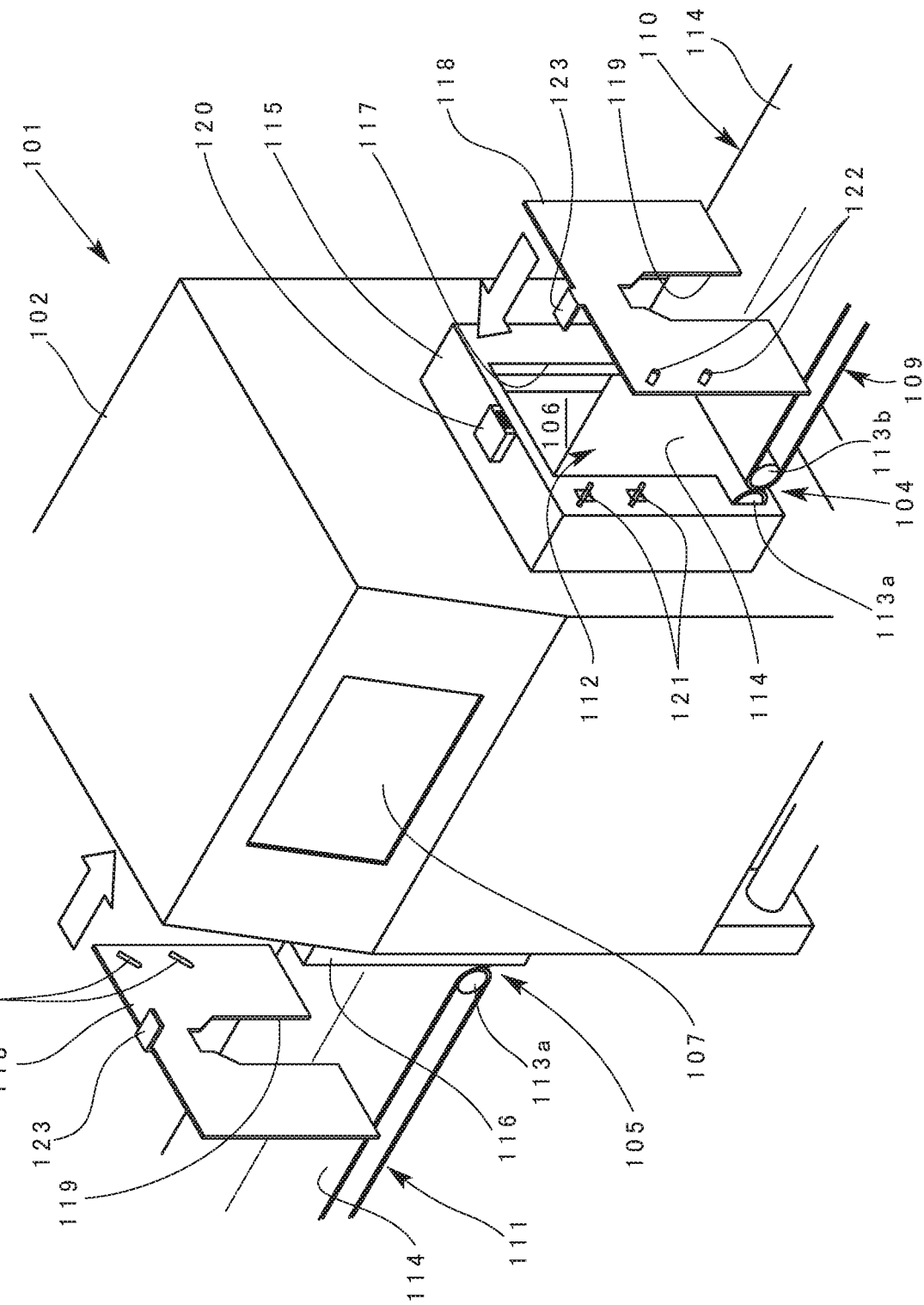
FIG. 20 is an explanatory diagram of operation of the X-ray inspection device immediately before the attachment of the shielding gate.

FIG. 20 is an explanatory diagram of operation of the X-ray inspection device immediately before the attachment of the shielding gate.

The plural types of shielding gates 118 are respectively provided with the gate engagement part. The gate engagement part, as a match between the shape of the inspection object 150 and the shape of the passage part 119, is unique to each shielding gate 118. In the present embodiment, the gate engagement part is a hole 122. The hole 122 is formed in a vertical orientation, a horizontal orientation, or a diagonal orientation, for engagement with only one operation knob 121 rotated in a particular rotation orientation. The shielding gate 118 is attachable to the frame body 115 in the regular shielding position when the operation knob 121 is engaged with the hole 122.

Note that the gate engagement part may be the projection 121 and the main body engagement part may be the hole 122. That is, contrary to the present embodiment, in the X-ray inspection device, the shielding gate 118 may be provided with a projection, and the frame bodies 115 and 116 may be provided with the hole 122.

The plural types of shielding gates 118 are respectively provided with an interlock operation piece 123. In the present embodiment, the interlock operation piece 123 is provided, in an L-shape bent shape, at an upper edge of the shielding gate 118. Only when the shielding gate 118 is attached to the frame body 115 in a regular position, the interlock operation piece 123 is inserted into the interlock unit 120. That is, only with this state of the interlock operation piece 123, the attachment of the shielding gate 118 is detected, and the regulation of X-ray irradiation with the interlock unit 120 is released.

Figure 21:
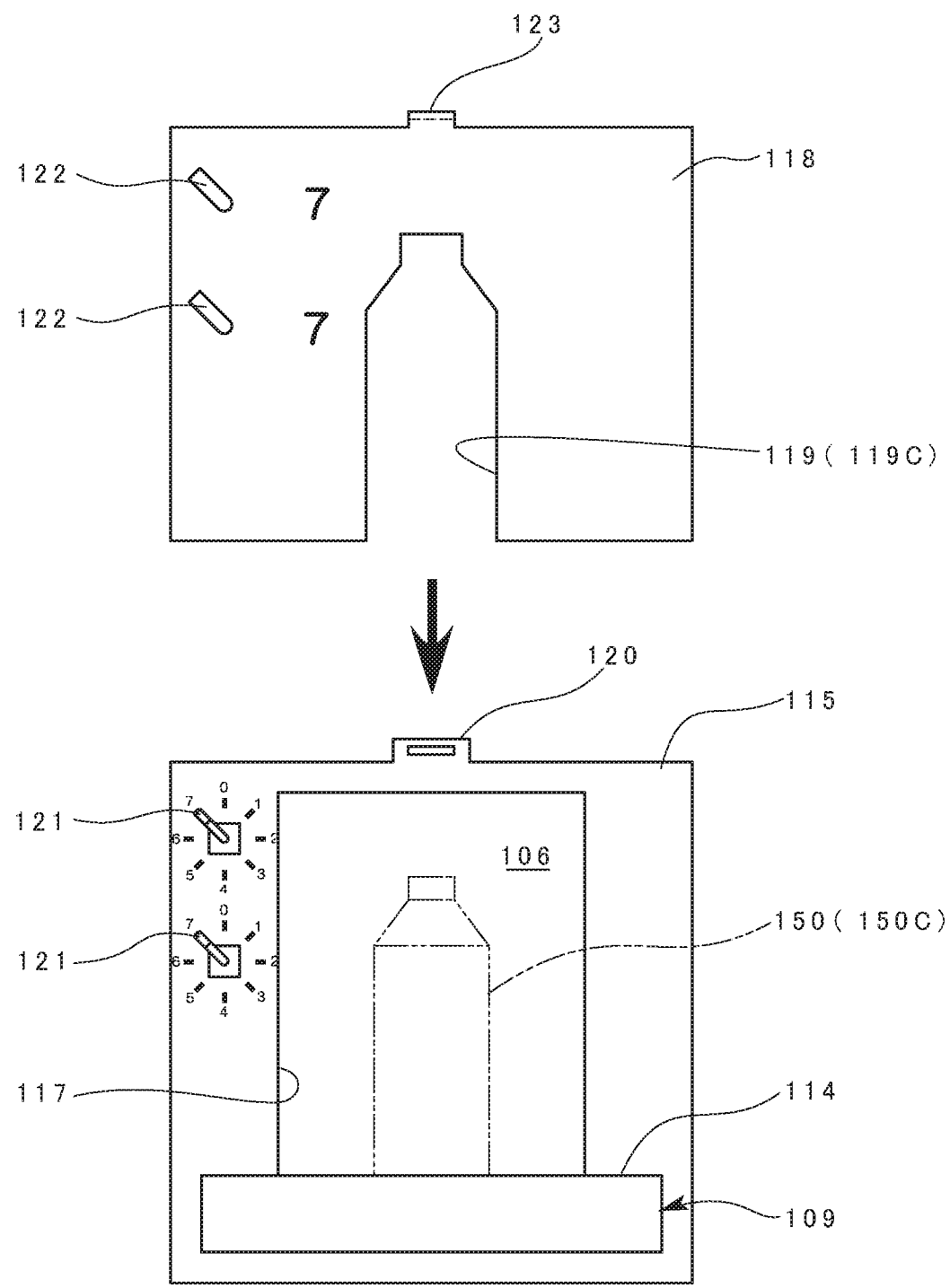
FIG. 21 is an explanatory diagram of operation of the shielding gate attached to an entrance.

FIG. 21 is an explanatory diagram of operation of the shielding gate attached to the entrance.

The projection may be provided in plural positions. In the present embodiment, two operation knobs 121 as projections are provided. Note that the number of the operation knobs 121 (projections) is not limited to two.

Further, it is preferable that the plural operation knobs 121 are arrayed close to each other. In the present embodiment, the two operation knobs 121 are arrayed close to each other in the vertical direction. Note that the positions of the operation knobs 121 (projections) are not limited to those in this embodiment.

In the example shown in FIG. 21, the two operation knobs 121 are respectively set with the rotation orientation "7" shown in FIG. 19. Accordingly, it is possible to set the shielding gate 118 with an "identification number 77". In this shielding gate 118 with the "identification number 77", the two holes 122 are formed in a diagonal orientation corresponding to the rotation orientation of the operation knobs 121. Accordingly, when the two operation knobs 121 are set to the position "7", only the shielding gate 118 with the "identification number 77" is attached to the frame body 115 in a regular position.

Figure 22:
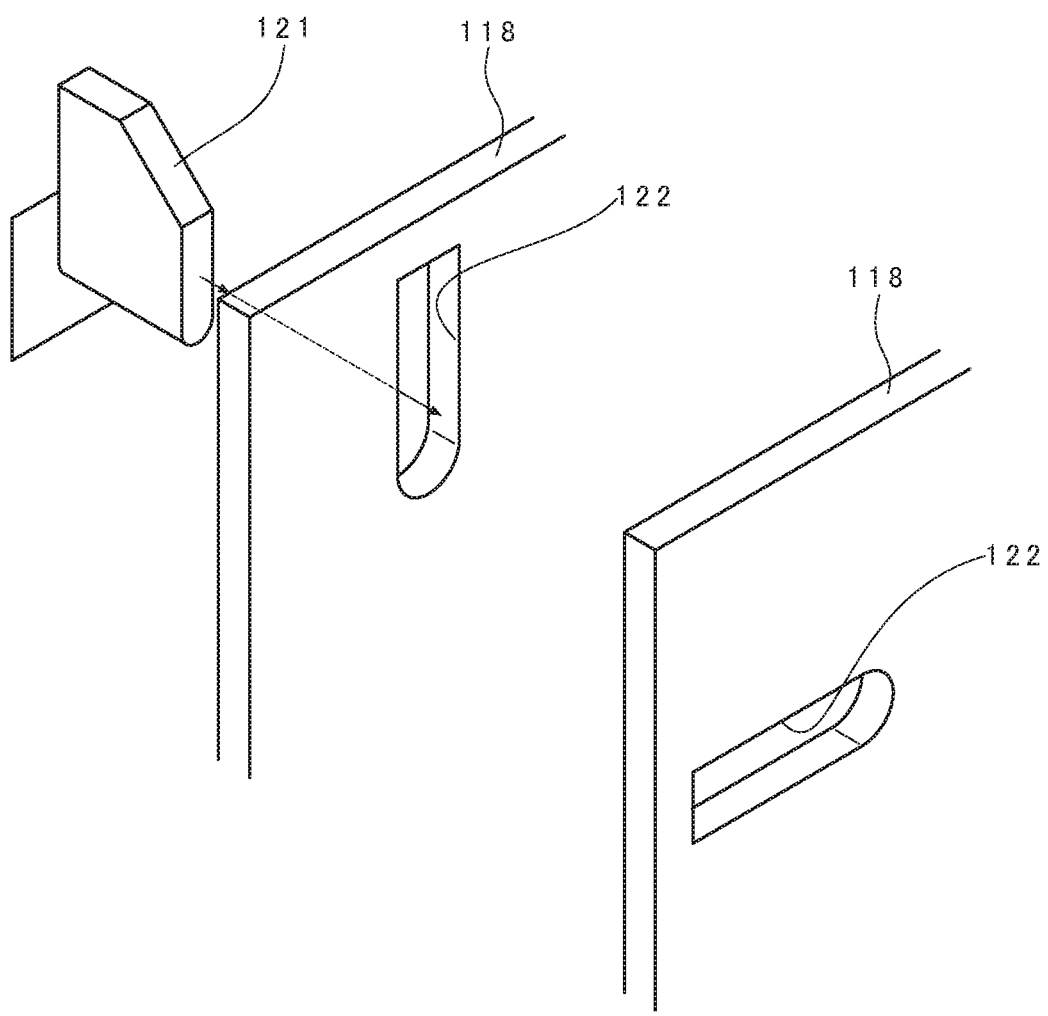
FIG. 22 is an explanatory diagram of operation upon establishment of consistency between the operation knob and a gate engagement part.

FIG. 22 is an explanatory diagram of operation upon establishment of consistency between the operation knob and the gate engagement part.

In the shielding gate 118, when the rotation orientation of the operation knob 121 is along the vertical direction and the hole 122 is formed in the vertical direction, the operation knob 121 is inserted through the hole 122. Accordingly, it is possible to attach the shielding gate 118 to the frame body 115, i.e., it is possible to attach the shielding gate 118 in the shielding position. On the other hand, when the rotation orientation of the operation knob 121 is along the vertical direction while the hole 122 is formed in the horizontal direction, the operation knob 121 is not inserted through the hole 122. Accordingly, it is not possible to attach the shielding gate 118 to the frame body 115, i.e., it is not possible to attach the shielding gate 118 in the shielding position. Note that in the present embodiment, the rotation orientation "0" and the rotation orientation "4" shown in FIG. 19, both along the same vertical direction, are distinguished from each other as different rotation orientations. That is, the knob part of the operation knob 121 is eccentric to the rotation center CL in the radial direction.

Figure 23:
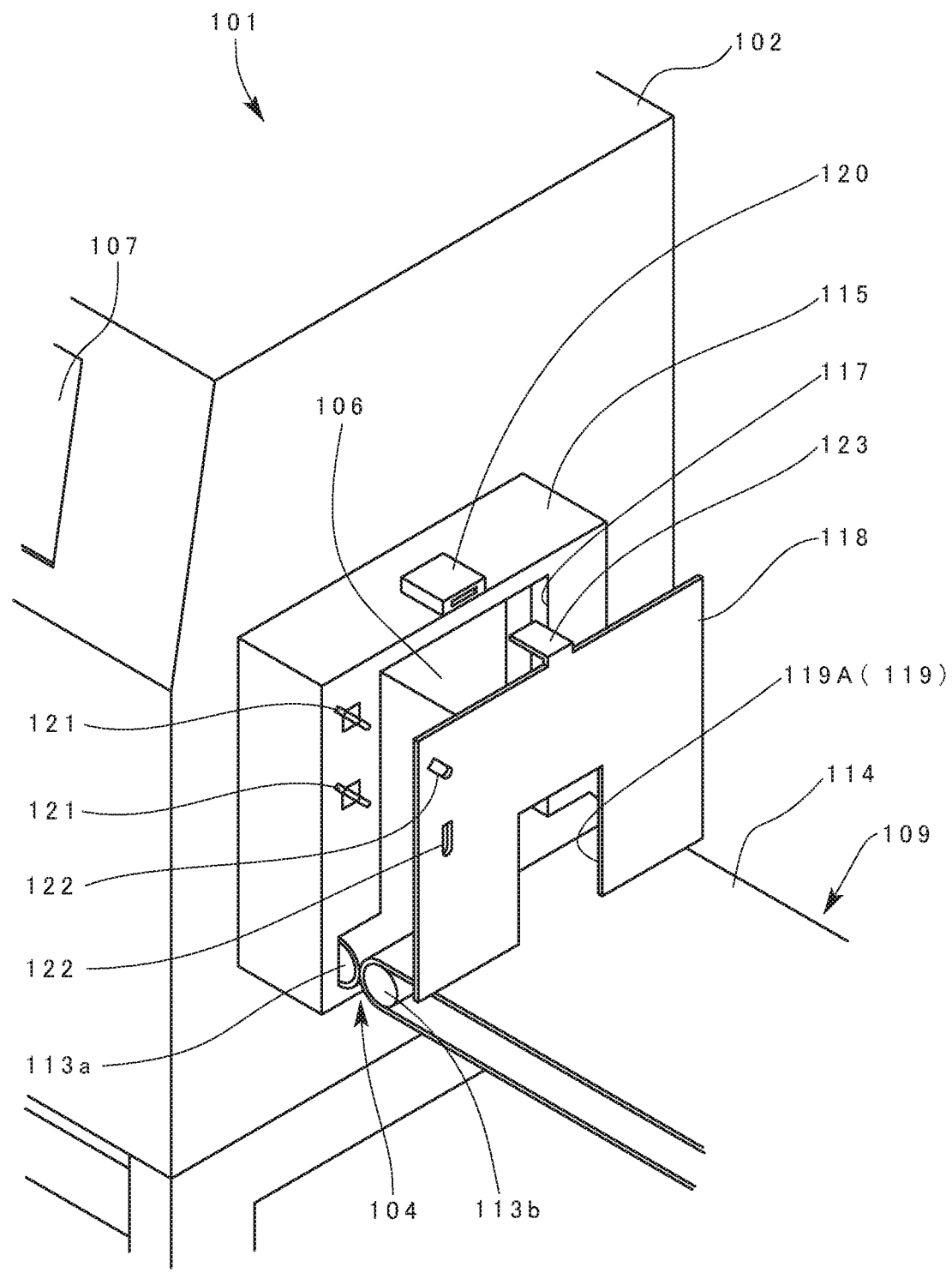
FIG. 23 is an explanatory diagram of operation upon erroneous attachment of the shielding gate.

FIG. 23 is an explanatory diagram of operation upon erroneous attachment of the shielding gate.

In the frame body 115, the two operation knobs 121 are both set with diagonal orientation. In the shielding gate 118, one hole 122 is diagonally formed and the other hole 122 is vertically formed. In this case, it is not possible to attach the shielding gate 118 to the frame body 115. In the X-ray inspection device 101, when the shielding gate 118 is not attached to the frame body 115, the interlock operation piece 123 is not inserted in the interlock unit 120. Accordingly, the interlock unit is not released.

Figure 24:
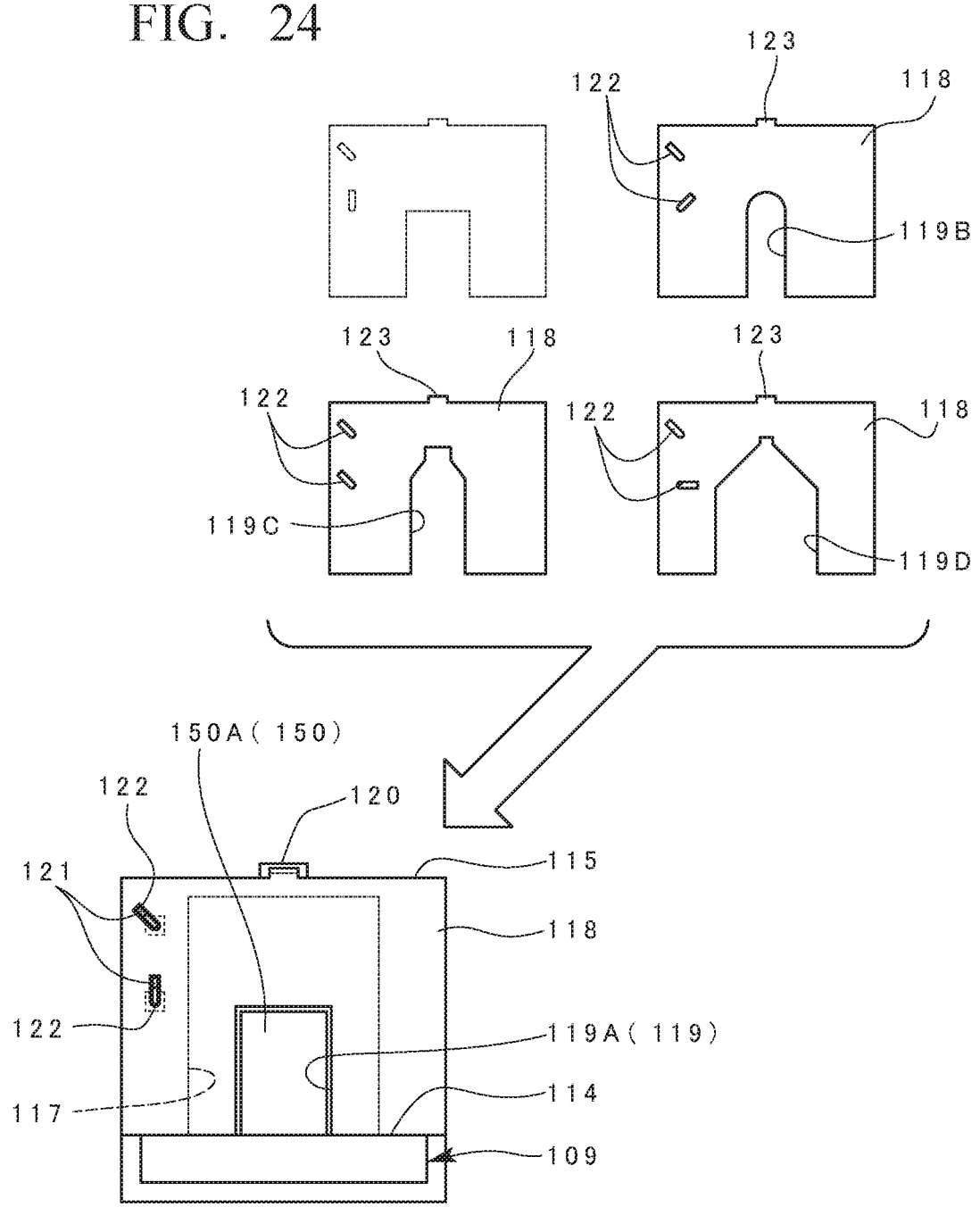
FIG. 24 is an explanatory diagram of operation in an example of different shielding gates and establishment of consistency with respect to setting of a main body engagement part.
Figure 25:
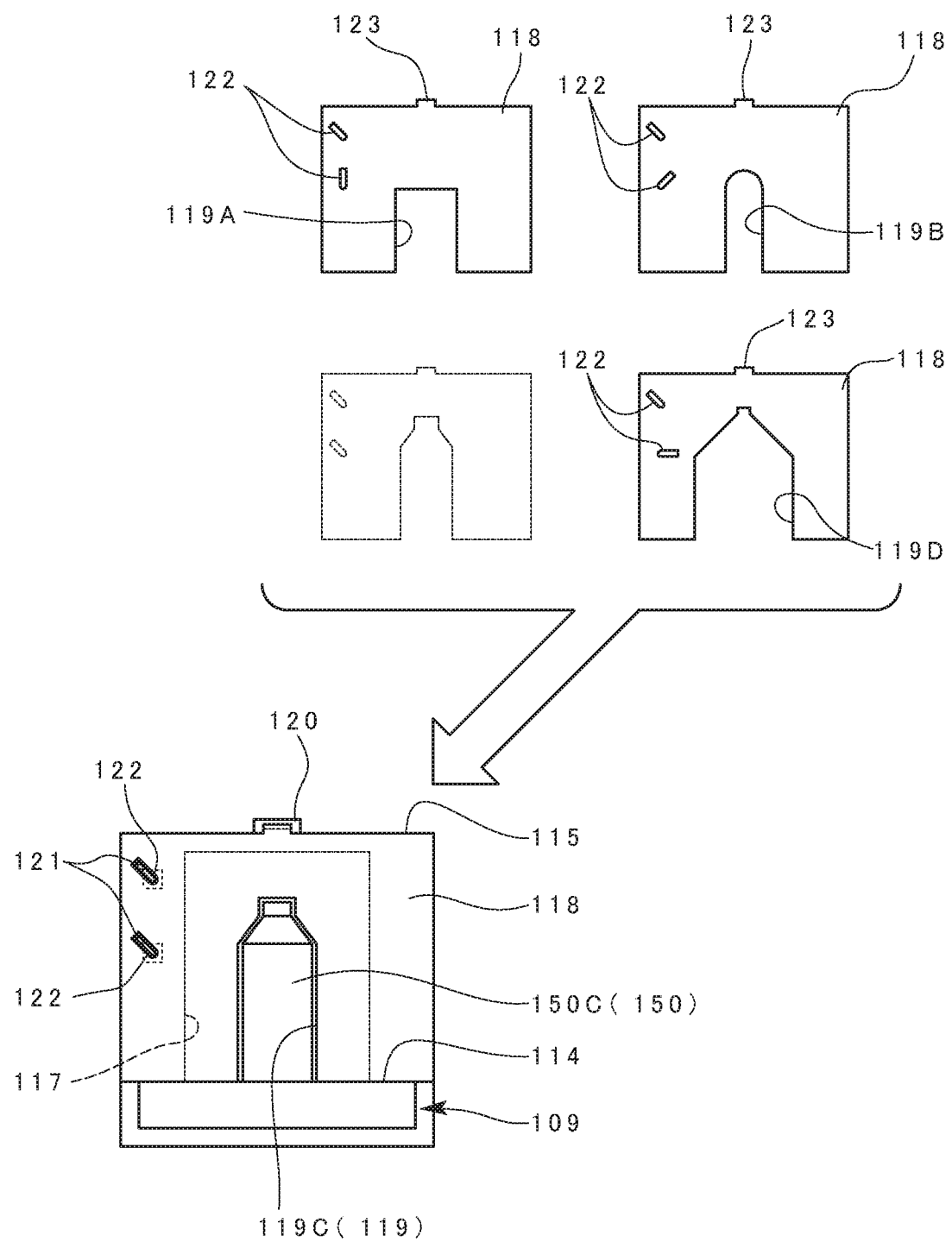
FIG. 25 is an explanatory diagram of operation showing another example of different shielding gates and establishment of consistency with respect to other setting of the main body engagement part.

FIG. 24 is an explanatory diagram of operation in an example of different shielding gates and establishment of consistency with respect to setting of the main body engagement part. FIG. 25 is an explanatory diagram of operation in another example of different shielding gates and establishment of consistency with respect to other setting of the main body engagement part.

The X-ray inspection device 101 may be provided with plural shielding gates 118 having passage parts 119 in different shapes respectively corresponding to the plural types of inspection objects 150. For example, as shown in FIG. 24, four types of shielding gates 118 having four types of passage parts 119A to 119D are previously prepared in correspondence with the shapes of four types of inspection objects 150 in different shapes.

The shielding gate 118 having the passage part 119A has an identification number "70". The shielding gate 118 having the passage part 119B has an identification number "71". The shielding gate 118 having the passage part 119C has an identification number "77". The shielding gate 118 having the passage part 119D has an identification number "72".

In the X-ray inspection device 101, upon X-ray inspection, one of the shielding gates 118 corresponding to the outer shape of the inspection object 150 is selected, and attached to the frame body 115. In the example of FIG. 24, when the inspection object 150A corresponds to the "identification number 70", the identification number "70" is inputted into the display operation unit 107. The operation knob 121 is turned to the number "70". Then the shielding gate 118 having the passage part 119A is attached to the frame body 115. In the example of FIG. 25, when the inspection object 150C corresponds to the "identification number 77", the identification number "77" is inputted into the display operation unit 107. The operation knob 121 is turned to the number "77". Then the shielding gate 118 having the passage part 119C is attached to the frame body 115.

The flow of the operation at this time will be described.

In the X-ray inspection device 101, first, the inspection object 150 upon X-ray inspection is determined.

With this determination, the outer shape of the inspection object 150 and the shape of the passage part 119 are determined.

Next, with respect to the device control unit, the shape of the inspection object 150 is set by input from the display operation unit 107 such as input of the identification number, or operation to select the shape from displayed shapes of the plural types of inspection objects 150.

Next, the operation knob 121 is set with the orientation corresponding the shape of the inspection object 150. The orientation of the operation knob 121 i.e. the knob angle is set in accordance with the identification number shown in FIG. 19.

Next, the shielding gate 118 having one of the passage parts 119A to 119D corresponding to the shape of the inspection object 150 (with the corresponding identification number) is prepared.

The prepared shielding gate 118 is attached to the frame body 115.

Note that when the shielding gate 118 cannot be attached to the frame body 115, the shielding gate 118 has a passage part different from the set shape and identification number. In such case, the shielding gate 118 is changed. That is, the operator is notified that the prepared shielding gate 118 is not attachable to the frame body 115.

When the newly prepared shielding gate 118 is attached to the frame body 115, the operation knob 121 and the hole 122 are engaged with each other. That is, when the shielding gate 118 corresponds to the identification number, the interlock operation piece 123 is inserted into the interlock unit 120. The correct attachment of the shielding gate 118 is detected, and the interlock unit 120 is released.

Next, the device becomes in a startable state, and the inspection is started.

Note that in the X-ray inspection device 101, it may be configured such that upon input operation necessary for setting of the inspection condition by product class with respect to the inspection object 150, the identification number is also inputted and stored, then upon change of product class, comparison is made between the identification number of the manually operated operation knob 121 and the identification number byproduct class. With this configuration, in the X-ray inspection device 101, X-ray irradiation is prohibited upon erroneous setting of the operation knob 121. Thus security is ensured.

Further, in the X-ray inspection device 101, it may be configured such that monitoring and comparison are performed between the identification number of a product class and the identification number set with the operation knob 121. When the identification numbers are different, alarm (alert) is emitted. With this configuration, it is possible to notify the operator of the mistake.

Next, the operations of the above-described embodiment will be described.

In the X-ray inspection device 101 according to the present embodiment, the shielding gate 118 with the passage part 119 formed in a shape corresponding to the outer shape of the inspection object 150 is previously prepared. This shielding gate 118 is provided in the shielded space 106, to form a passage entrance for the inspection object 150 conveyed with the conveyance unit 109. The shielding gate 118 is selected in correspondence with the shape of the inspection object 150, and is easily attached. As the shielding gate 118 is provided, the shape of the passage part 119 corresponds to the outer shape of the inspection object 150, and the gap is reduced, and further, X-ray leakage is reduced. This configuration dispenses with a tunnel-shaped long cover as in the conventional art, and reduces the length of the inspection device in the conveyance direction. As a result, space saving is attained.

Further, this configuration dispenses with a complicated work such as a special operator goes to the site and fastens bolts again, to change the entrance member, unlike the conventional device where the entrance part of the inspection object 150 has a fixed structure. Accordingly, even when the product class of the inspection object 150 is frequently changed in one production line, it is possible to quickly respond to suppression of X-ray leakage by selecting the shielding gate 118 having the passage part 119 corresponding to the shape of the inspection object 150 and setting the selected shielding gate in the shielded space 106.

In the X-ray inspection device 101, the shielding gates 118 are respectively provided with the gate engagement part 122 unique to the shielding gate. The main body engagement part 121, set in a state engageable with the gate engagement part 122 of the shielding gate 118 corresponding to a particular type of inspection object 150 is provided around the opening of the housing 102 as a shielding position. Further, the housing 102 is provided with the interlock unit 120. The interlock unit 120 prohibits X-ray irradiation except that the regular attachment state of the shielding gate 118 where the gate engagement part 122 and the main body engagement part 121 are engaged with each other. That is, it is possible to check the consistency between the setting of the selected shielding gate 118 and the shielding gate 118 to be attached, with ease. A wrong shielding gate 118 is not attached. When the shielding gate 118 is not attached, X-ray irradiation is not performed, and the device is driven. As a result, it is possible to reduce X-ray leakage and ensure safety.

Further, in the X-ray inspection device 101, the gate engagement part of the shielding gate 118 is formed with the hole 122. Upon handling and accommodation of plural shielding gates 118 formed in a plate shape, it is possible to avoid interference due to catching or the like between the shielding gates. Further, the gate engagement part formed in the shielding gate 118 is the hole 122. It is possible to manufacture the shielding gate 118 by press working or the like, with ease. As a result, it is possible to delete projection(s) on the plate surface of the shielding gate 118 in the plate shape, and facilitate management of plural shielding gates. Note that as shown in FIG. 20, the interlock operation piece 123 is projected with respect to the plate surface. However, since it is positioned at the edge and is bent, it does not cause interference when the plural shielding gates 118 are stacked laterally.

Further, in the X-ray inspection device 101, the projection is the operation knob 121. It is possible to use one operation knob 121 as an engagement part having plural types of functions by changing the position and the orientation of the operation knob 121. Further, it is possible to check the position and the orientation of the operation knob 121 at such time with ease by observation or touching. As a result, by using the projection as the operation knob 121, it is possible to use the projection as an operation part, an engagement part and a display part.

Further, in the X-ray inspection device 101, when plural projections 121 are used, it is possible to specify the shielding gate 118 based on a number indicating the combination of the position and the orientation of the respective projections 121. That is, it is possible to increase the number of identifiable shielding gates 118 with ease. For example, assuming that one projection 121 is turned to eight positions, when the number of projections 121 is two, eight squared i.e. sixty-four types of setting are made; and when the number of projections 121 is three, eight cubed i.e. five hundred twelve types of setting are made. Thus it is possible specify to many types of shielding gates 118. As a result, it is possible to increase the number of combinations in correspondence with a larger number of types of shielding gates 118.

Further, in the X-ray inspection device 101, it is possible to improve operability and visibility by providing the projections 121 close to each other. Further, when the projection is used as the operation knob 121, it is possible to facilitate wiring of signal lines and the like in the housing. As a result, it is possible to improve the operability and the visibility.

The X-ray inspection device 101 may be further provided with a driving unit which operates by performing operation to select a particular type of inspection object 150 from the plural types of inspection objects 150. In this case, in the X-ray inspection device 101, with the operation of the driving unit, the projection (the operation knob 121) is set in an engageable state with the gate engagement part (the hole 122) of the shielding gate 118 corresponding to the particular type of inspection object 150.

In the X-ray inspection device 101 configured as above, upon operation to select an inspection object 150, the driving unit operates. The operation of the driving unit automatically sets the operation knob 121 in an engageable state with the hole 122 of the selected shielding gate 188. Note that in this case, the projection may be rotate-positioned with the operation of the driving unit, or may be slide-positioned with a slide. As a result, it is possible to automate the setting operation for the projection (operation knob 121) and prevent erroneous setting of the projection (operation knob 121) with manual operation.

Embodiment 2-2

Next, the X-ray inspection device according to an embodiment 2-2 of the present invention will be described.

Figure 26:
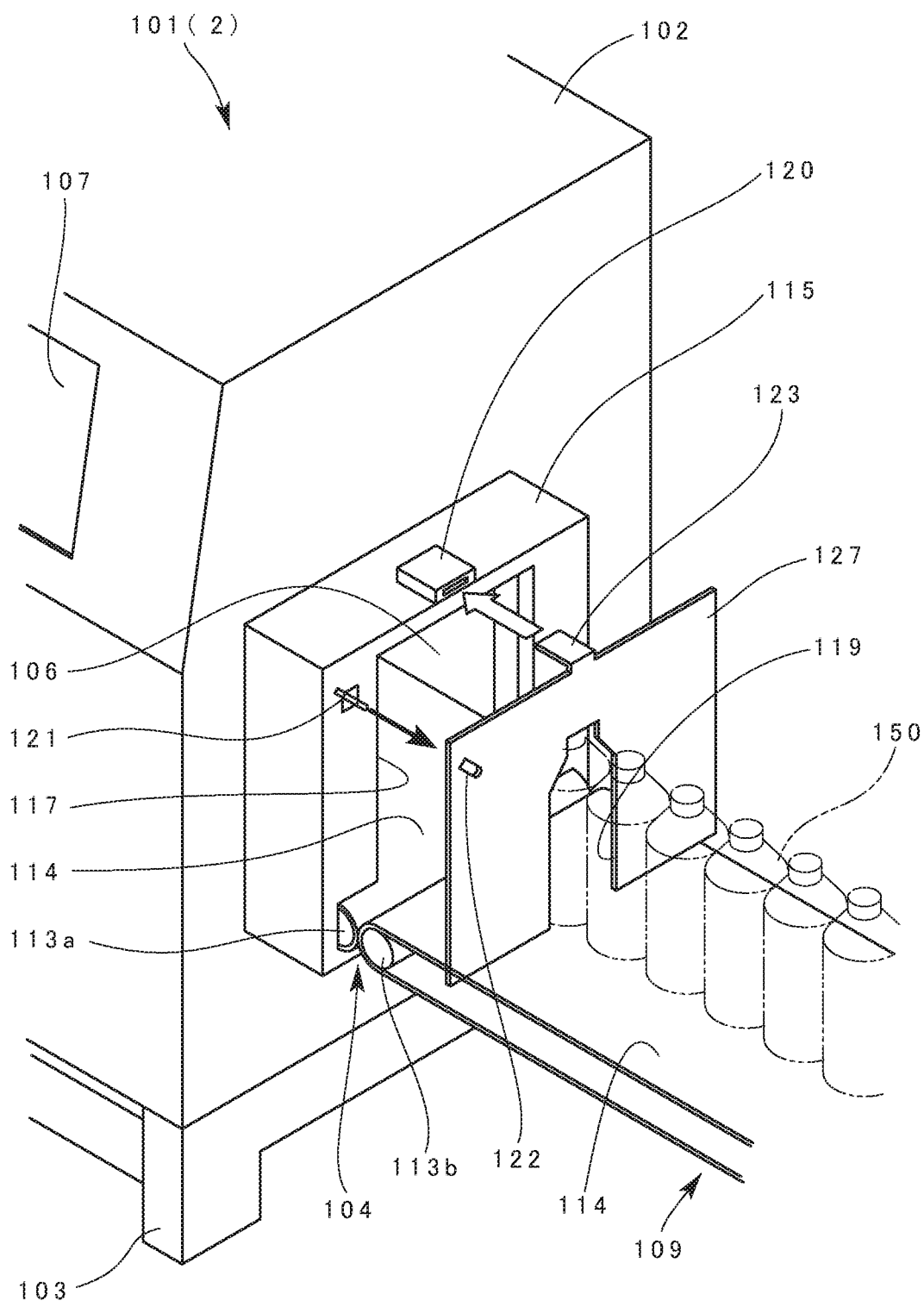
FIG. 26 is a perspective view of the primary elements of the X-ray inspection device, in which a hole and a projection are used as a pair, according to an embodiment 2-2 of the present invention.

FIG. 26 is a perspective view of the primary elements of the X-ray inspection device, in which a hole and a projection are used as a pair, according to the embodiment 2-2. Note that in the embodiment 2-2, the constituent elements identical or equivalent to those described in the embodiment 2-1 will have the same reference numerals, and overlapped explanations of these elements will be omitted.

In an X-ray inspection device 101(2) according to the embodiment 2-2, the frame bodies 115 and 116 are respectively provided with one operation knob 121. A shielding gate 127 is provided with one hole 122. The other constituent elements are the same as those of the X-ray inspection device 101.

According to the X-ray inspection device 101(2), the device structure is simplified. The X-ray inspection device 101(2) is preferably applicable to a device for inspection of a comparatively few types of inspection objects 150.

Embodiment 2-3

Next, the X-ray inspection device according to an embodiment 2-3 of the present invention will be described.

Figure 27:
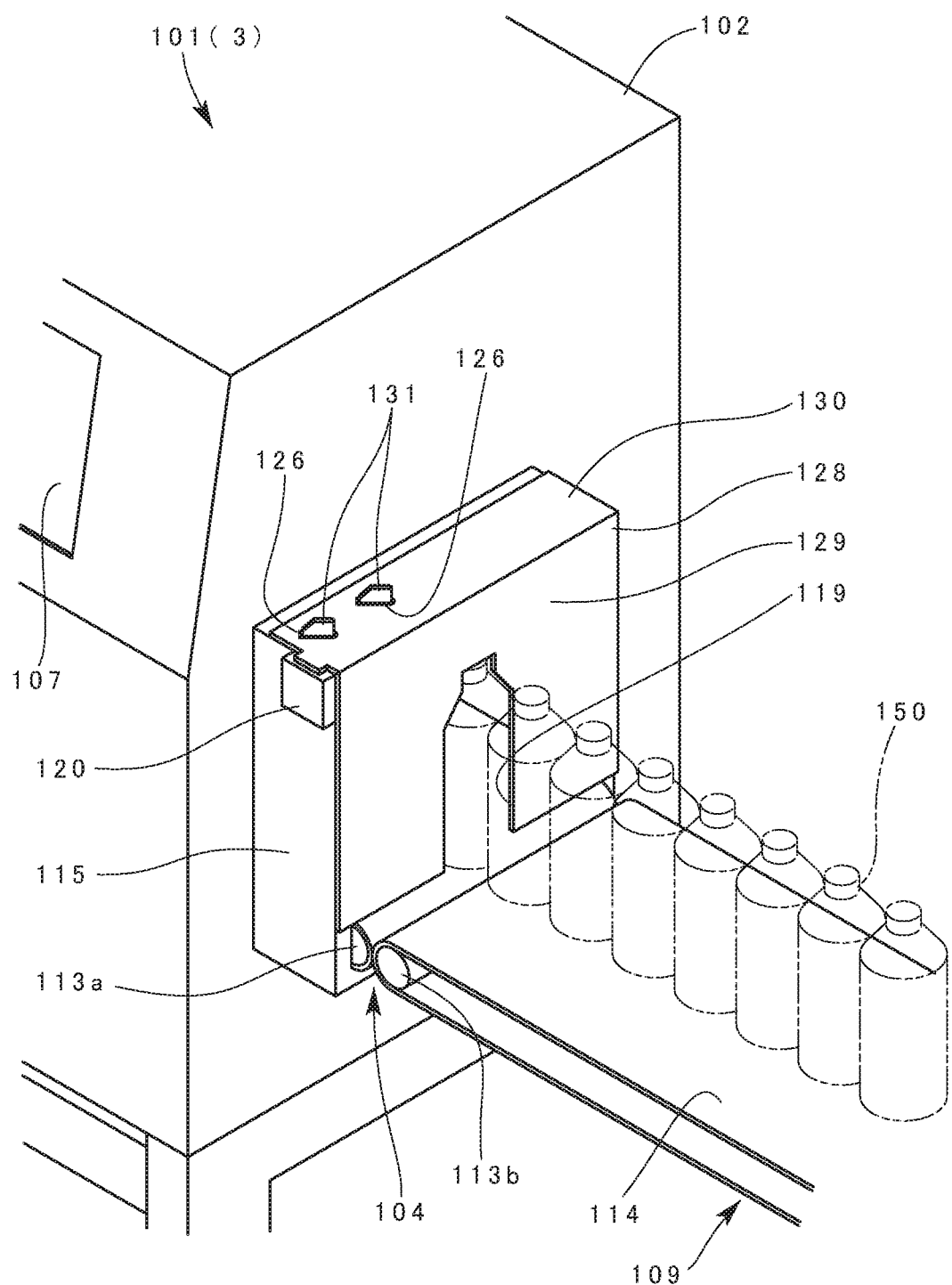
FIG. 27 is a perspective view of the primary elements of the X-ray inspection device according to an embodiment 2-3 of the present invention in which a direction of engagement between the hole and the projection is a vertical direction.
Figure 28:
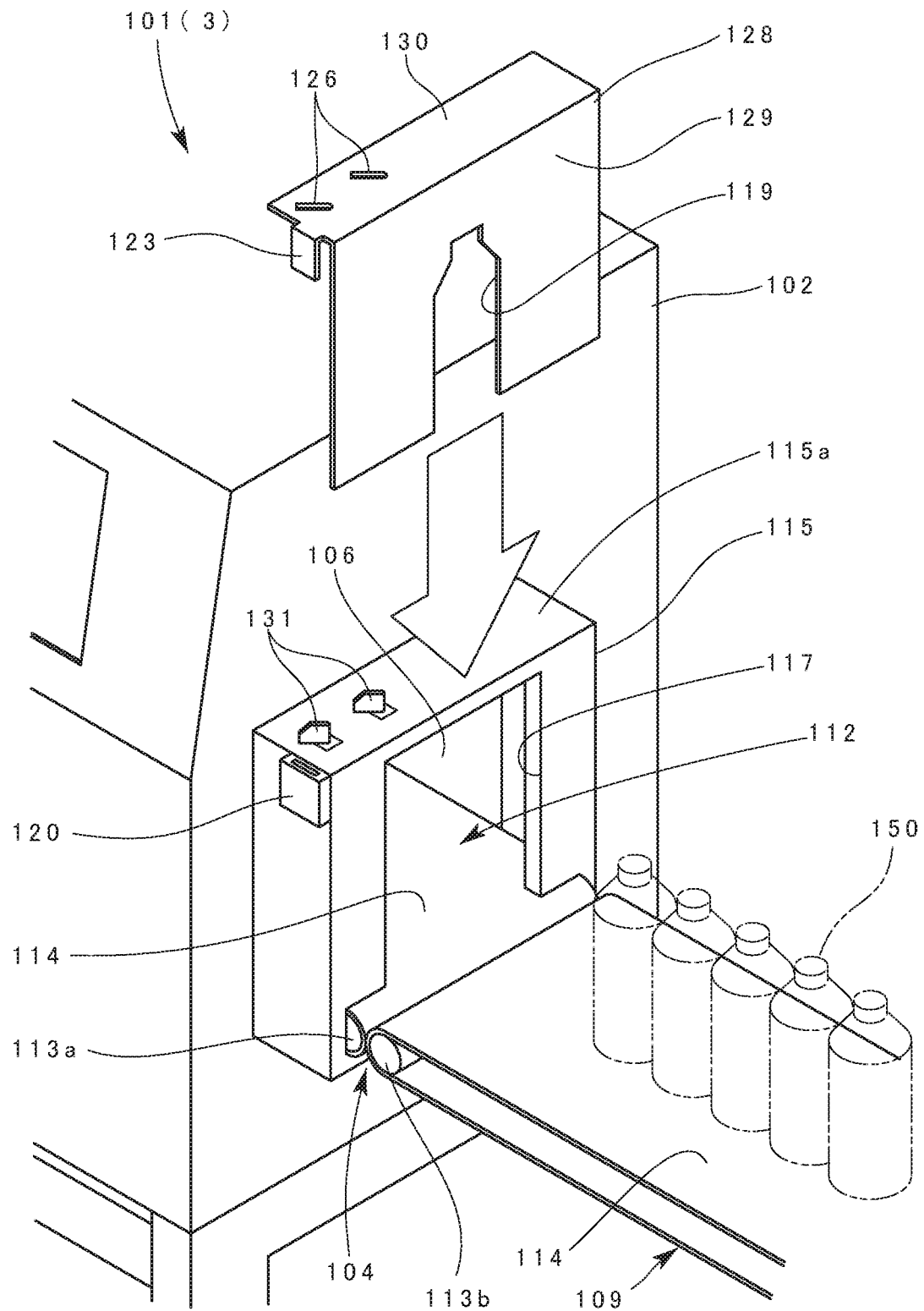
FIG. 28 is an explanatory diagram of operation of the X-ray inspection device according to the embodiment 2-3.

FIG. 27 is a perspective view of the primary elements of the X-ray inspection device according to the embodiment 2-3 in which a direction of engagement between the hole and the projection is a vertical direction. FIG. 28 is an explanatory diagram of operation of the X-ray inspection device according to the embodiment 2-3. Note that in the embodiment 2-3, the constituent elements identical or equivalent to those described in the embodiment 2-1 will have the same reference numerals, and overlapped explanations of these elements will be omitted.

In an X-ray inspection device 101(3) according to the embodiment 2-3, a shielding gate 128 is different from that in the X-ray inspection device 101. The shielding gate 128 has an inverse L shape in which an upper surface plate 130, bent toward the frame bodies 115 and 116, is formed at an upper edge of a front surface plate 129 with the passage part 119.

In the shielding gate 128, two holes 126 as the gate engagement parts are provided in the upper surface plate 130. Further, the interlock operation piece 123 is suspended from a side edge of one side of the upper surface plate 130. As shown in FIG. 28, the shielding gate 128 is attached to the frame bodies 115 and 116 from an upper position.

On the other hand, in the frame bodies 115 and 116, an upper surface 115a is provided two projections 131 as the main body engagement parts. The projection 131 is equivalent to the operation knob 121 in the above-described embodiment 2-1. That is, a rotary switch which is set by rotate operation may be used. The operation knob is projected upward. Further, one side of the frame bodies 115 and 116 is provided with the interlock unit 120 in which the interlock operation piece 123 is inserted. The other constituent elements are the same as those of the X-ray inspection device 101 according to the above-described embodiment 2-1.

Note that in the case of the X-ray inspection device 101 (3), it may be configured such that a pair of right and left guide rails (not shown) is vertically attached, in parallel to each other, holding the frame opening 117 between them, to the frame bodies 115 and 116. The guide rails are formed in an approximately Z shape, and fixed edges respectively on one side of the guide rail are fixed along the frame body opening 117. Then insertion slits, for insertion of right and left side edges of the shielding gate 128, are formed so as to face each other between the guide rails and the frame body 115. The guide rails guide the right and left side edges of the shielding gate 128. Thus the guide rails guide the shielding gate 128 to move downward with respect to the frame body opening 117, to set the shielding gate immediately above the conveyance belt 114. In this case, the shielding gate 128 is inserted in the guide rails from an upper position, and is set by its own weight. An operator inserts the shielding gate in the guide rails while holding an upper surface plate 130. Further, the operator removes the shielding gate 128 by pulling the shielding gate up.

According to the X-ray inspection device 101(3), the shielding gate 128 is attached and removed in the vertical direction. Since the upper surface plate 130 of the shielding gate 128 is hooked on the upper surface 115a of the frame bodies 115 and 116, it is possible to suppress dropping of the shielding gate 128.

Embodiment 2-4

Next, the X-ray inspection device according to an embodiment 2-4 of the present invention will be described.

Figure 29:
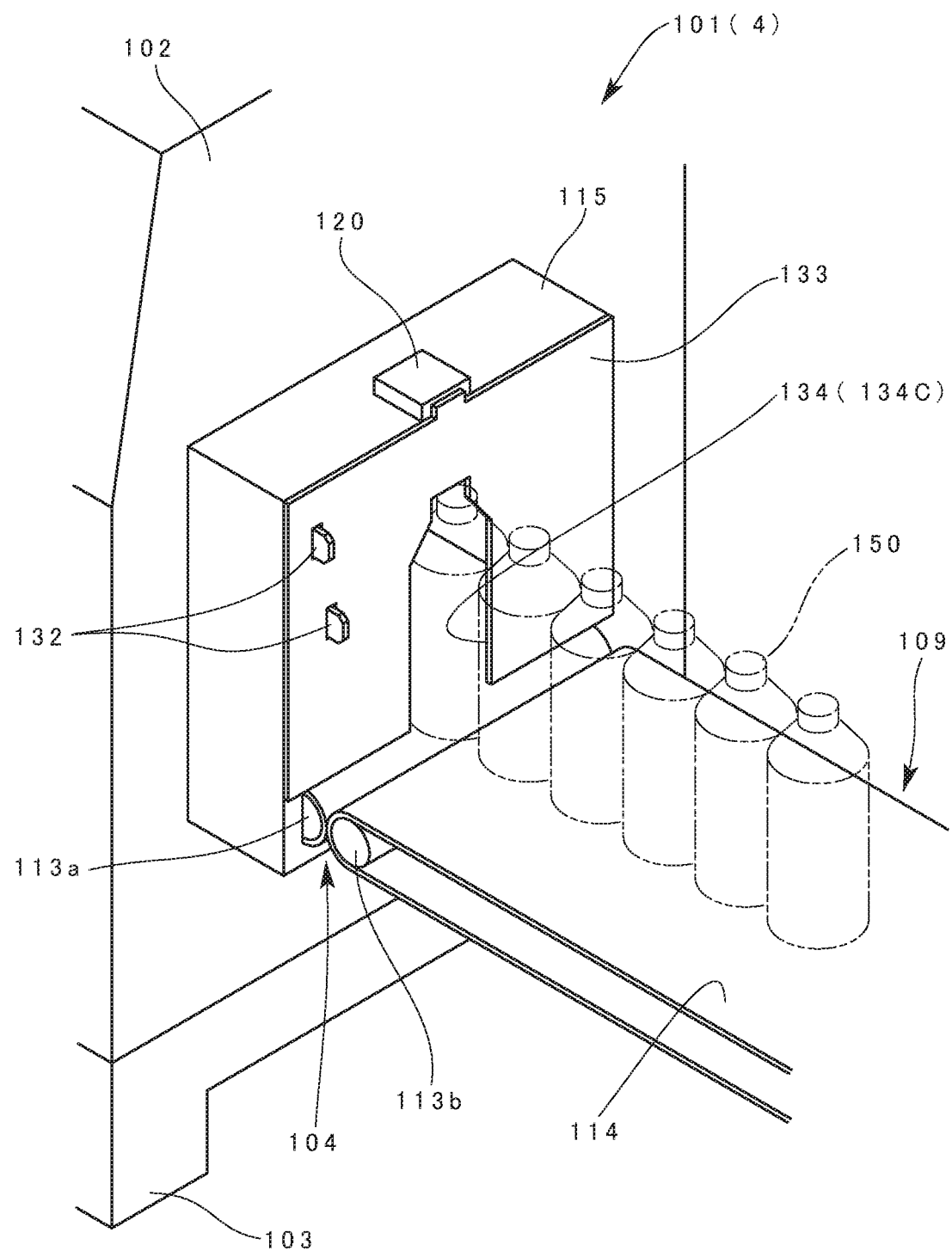
FIG. 29 is a perspective view of the primary elements of the X-ray inspection device according to an embodiment 2-4 of the present invention in which the projection has a slide structure.
Figure 30:
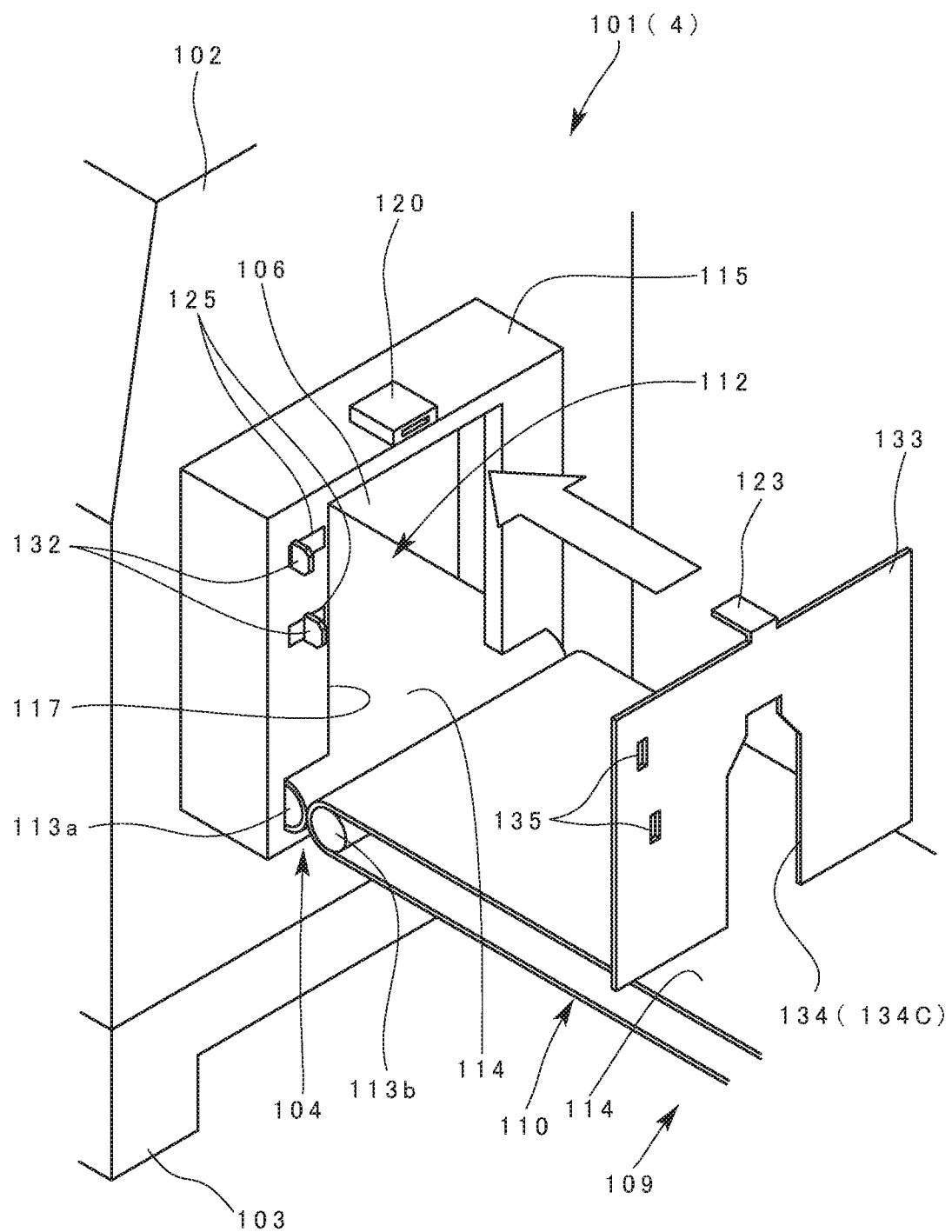
FIG. 30 is an explanatory diagram of operation of the X-ray inspection device according to the embodiment 2-4.
Figure 31:
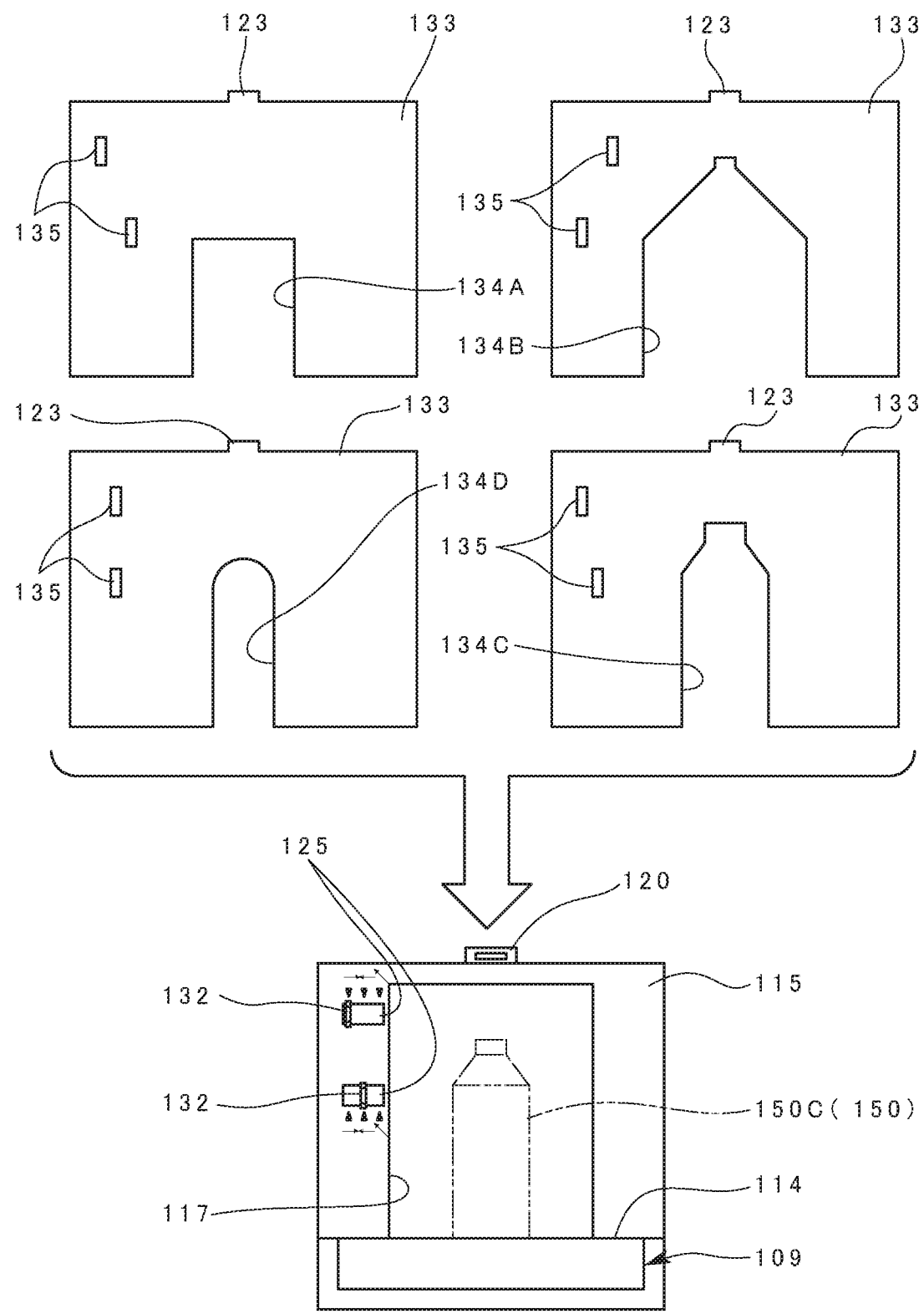
FIG. 31 is an explanatory diagram of operation in an example of different shielding gates and setting of the main body engagement part, in the X-ray inspection device according to the embodiment 2-4.

FIG. 29 is a perspective view of the primary elements of the X-ray inspection device according to the embodiment 2-4 in which the projection has a slide structure. FIG. 30 is an explanatory diagram of operation of the X-ray inspection device according to the embodiment 2-4. FIG. 31 is an explanatory diagram of operation in an example of different shielding gates and setting of the main body engagement part in the X-ray inspection device according to the embodiment 2-4. Note that in the embodiment 2-4, the constituent elements identical or equivalent to those described in the embodiment 2-1 will have the same reference numerals, and overlapped explanations of these elements will be omitted.

In an X-ray inspection device 101(4) according to the embodiment 2-4, the projection as the main body engagement part is formed with a slide switch 125 as a slide type setting projection member. In the present embodiment, the slide switch 125 is provided in two positions. In a shielding gate 133, a hole 135 is provided in a shape and in a position, to be engaged with a slide knob 132 of the slide switch 125. The other constituent elements are the same as those of the X-ray inspection device 101.

The slide knob 132 is slid in the lateral direction to be provided in e.g. three positions, as shown in FIG. 30. As shown in FIG. 31, numbers "0", "1" and "2" may be added to indicate the position of the slide knob 132. When two slide knobs 132 are provided, three squared i.e. nine types of setting is possible. That is, it is possible to specify the shielding gates 133 having nine types of passage parts 134. In FIG. 31, the shielding gates 133 having four types of passage parts 134A to 134D are shown. The positions of the holes 135 to be engaged with the slide knobs 132 are set in the passage parts 134A to 134D in correspondence with the shapes of the inspection objects 150.

According to the X-ray inspection device 101(4), it is possible to simplify the setting operation by using the slide switch 125, and to improve visibility of the setting state.

Note that the slide switch 125 may be provided on the upper surface of the frame body 115(116) as in the case of the above-described embodiment 2-3.

Note that the present invention is not limited to the above-described respective embodiments. For example, in the above examples, the shielding gates 118, 127, 128, and 133 are provided at the entrance 104 and the exit 105. However, the shielding gates 118, 127, 128, and 133 may be provided together with the conventional tunnel-shaped extension cover, or may be provided on the outside surface and the inside of the housing 102, thus in combination, in plural positions.

Figure 32:
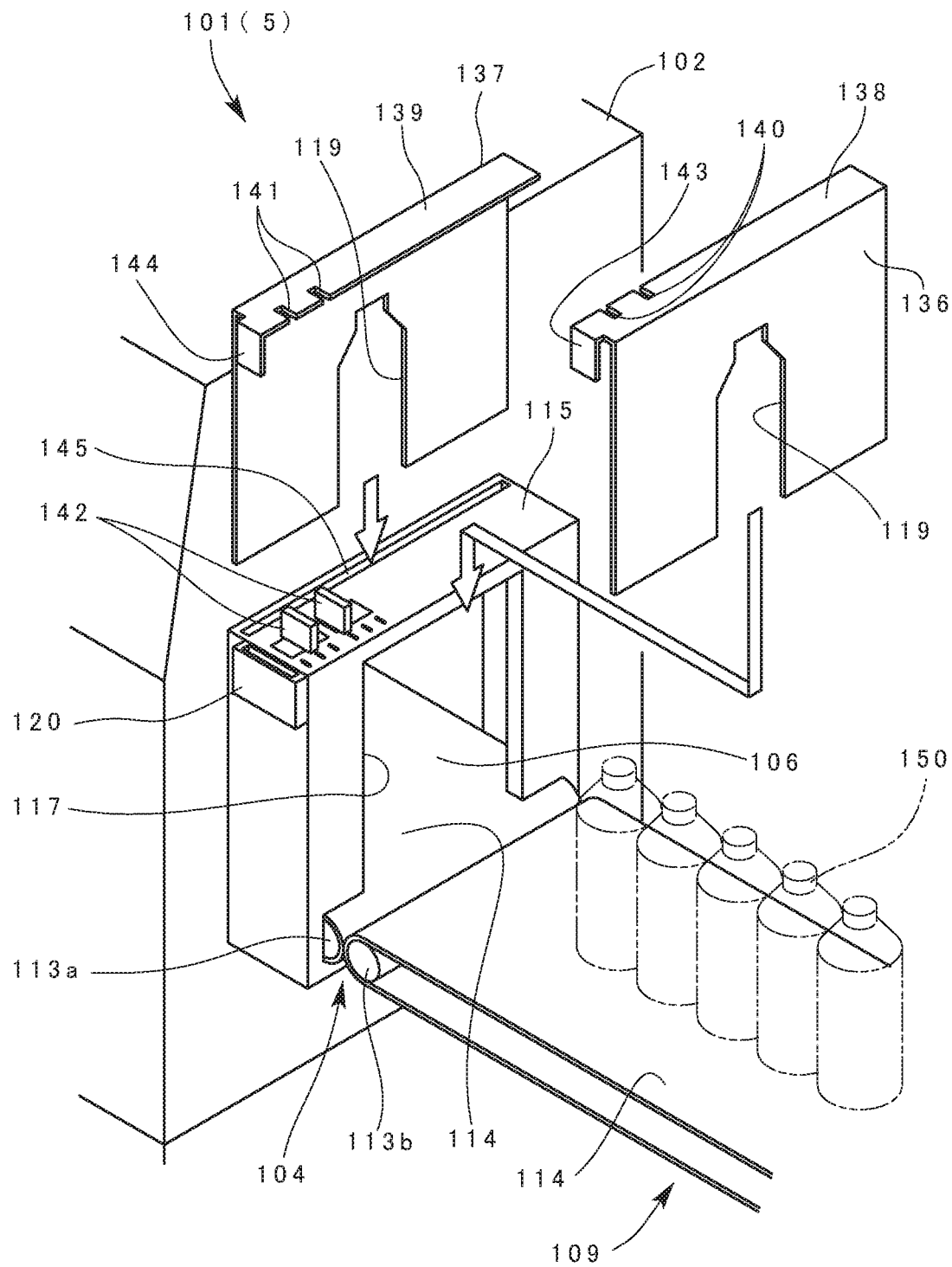
FIG. 32 is a perspective view explaining the operation of the X-ray inspection device according to a modification of the embodiment 2-4.

Further, the shielding gates 118, 127, 128, and 133 may be provided in any position, and may be provided in plural positions, with respect to the shielded space 106. For example, as shown in FIG. 32, it may be configured such that two shielding gates 136 and 137 having the passage parts 119 in the same shape are provided on the entrance 104 side, and the shielding gates 136 and 137 are simultaneously carried in and out with respect to the shielded space 106. In this case, the shielding gates 136 and 137 are attached from upper positions as in the case of the above-described embodiment 2-3. That is, the shielding gates 136 and 137, provided with upper surface plates 138 and 139, have an inverse L shape. The ends of the upper surface plates 138 and 139 are opposed to each other, and gate engagement parts 140 and 141 are provided over these ends. That is, the gate engagement parts 140 and 141 are formed in a notch shape, and these notch-shaped engagement parts 140 and 141 form holes when the ends of the upper surface plates are joined. The frame body 115 is provided with two knobs 142 as projections on the upper surface. The knobs 142 are equivalent to the slide switches 125 in the above-described embodiment 2-4. Further, the shielding gates 136 and 137 are provided with interlock operation pieces 143 and 144. The frame body 115 is provided with a slit 145 which the shielding gate 137 is inserted through. The shielding gate 137 is provided through the slit 145 in the shielded space 106. In an X-ray inspection device 101(5) having this configuration, the shielding gates 136 and 137 are provided on the entrance 4 side. It is possible to further prevent X-ray leakage, and enable correct attachment of the shielding gates 136 and 137, thus ensure safety.

Further, when the shielding gates 118, 127, 128 and 133 having the passage parts 119 and 134 in the same shape are provided in plural positions in the shielded space 106, the X-ray inspection device may be provided with a structure to simultaneously move the shielding gates, e.g., a mechanism to simultaneously carry in and out the shielding gates 118, 127, 128 and 133 on the entrance 104 side and on the exit 105 side, with respect to the shielded space 106.

Further, the shielding gate may be formed with, not the above-described SUS plate, but a flexible material.

Accordingly, according to the X-ray inspection devices 101, 101(2), 101(3), 101(4) and 101(5), it is possible to reduce the length of the inspection device in the conveyance direction. Further, when plural types of inspection objects 150 in different shapes are handled, it is possible to attach selected shielding gate(s) with ease, and to attach shielding gate(s) having passage part(s) correctly corresponding to the shapes of the inspection objects. Further, the inspection device is provided with the limitation that when the shape of the inspection objects and the shape of the passage part are different, the shielding gate is not attached and X-ray irradiation is not performed. Thus it is possible to perform specification change while maintain safety.

The primary reference numerals in the second embodiment are as follows.

101, 101(2), 101(3), 101(4), and 101(5) . . . X-ray inspection device
106 . . . shielded space
109 . . . conveyance unit
118, 127, 128, 133, 136, and 137 . . . shielding gate
119 and 134 . . . passage part
120 . . . interlock unit
121, 131, 132, and 142 . . . main body engagement part (operation knob, projection)
122, 126, 135, 140, and 141 . . . gate engagement part (hole)
150 . . . inspection object Third Embodiments Embodiment 3-1

The X-ray inspection device according to an embodiment 3-1 of the present invention will be described with reference to FIGS. 33A, 33B, 34 and 35.

An X-ray inspection device 201a is provided with a housing 202 as a device main body. The housing 202 is a frame to which the respective parts of the device are attached, and is a structure to partition shielded space S with which X-ray leakage to the outside is prevented. Further, the housing 202 is provided with an opening 203 as a carry-in port to carry an inspection object W in the internal shielded space S and an opening 203 as a carry-out port to carry the inspection object W from the internal shielded space S. The openings 203 communicate with each other. The opening 203 as the carry-in port, the shielded space S, and a conveyer 204 as a conveyance unit to convey the inspection object W between the opening 203 as the carry-in port and the opening 203 as the carry-out port, are provided in the housing 202. Note that in FIGS. 33A and 33B, for the sake of convenience of illustration, only the opening 203 as the carry-in port is shown, and the opening 203 as the carry-out port is not shown.

Figure 33:
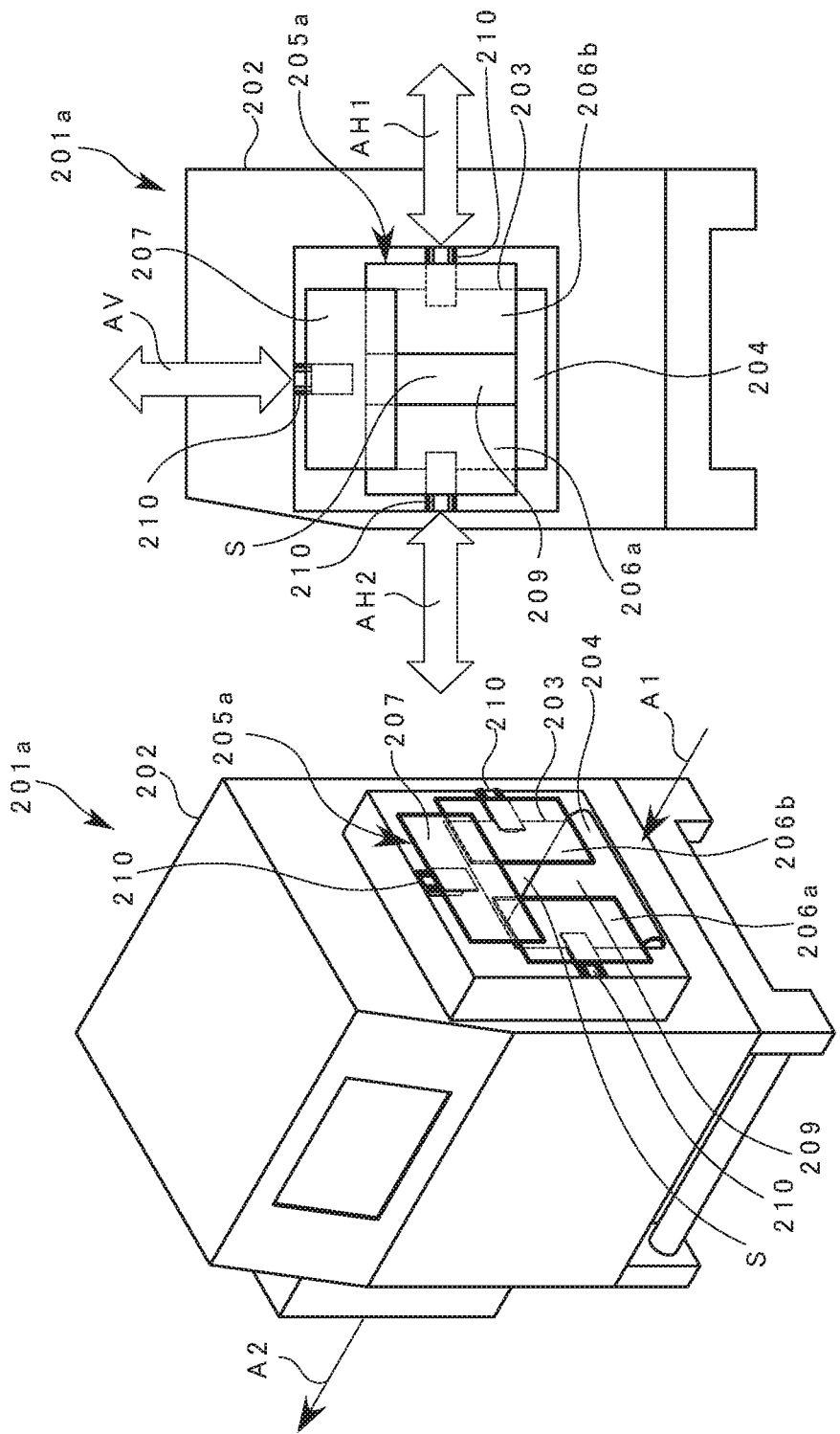
FIG. 33A is a perspective view of the X-ray inspection device according to an embodiment 3-1 of the present invention.
FIG. 33B is a diagram of the X-ray inspection device in FIG. 33A viewed from a direction parallel to a conveyance direction of the inspection object.

In FIG. 33A, the conveyer 204 of the X-ray inspection device 201a conveys the inspection object W from the right front side to the left back side in the figure. In one neighboring part on the upstream side of the X-ray inspection device 201a in the conveyance direction, a carry-in conveyer (not shown in FIGS. 33A and 33B) is provided as a conveyance unit to carry the inspection object W to the conveyer 204 of the X-ray inspection device 201a, in a conveyance direction indicated with an arrow A1 in FIG. 33A. The carry-in conveyer, connected to a manufacture line of the inspection object W or the like, carries the manufactured product as the inspection object W in the X-ray inspection device 201a. Further, in the other neighboring part on the downstream side of the X-ray inspection device 201a in the conveyance direction of the conveyer 204, a carry-out conveyer (not shown in FIGS. 33A and 33B) is provided as a conveyance unit to carry the inspection object W from the conveyer 204 of the X-ray inspection device 201a, in a conveyance direction indicated with an arrow A2 in FIG. 33A. The carry-out conveyer, connected to a process line or the like for the inspection-subjected inspection object W. On the process line, the inspected products are sorted in correspondence with an inspection result, and conveyed to corresponding post steps. Note that in the present embodiment, the inspection object W is positioned at the center of the carry-in conveyer in a width direction functionally indicated with the arrow A1, and is carried in the X-ray inspection device 201a at a predetermined interval. Note that the carry-in conveyer corresponds to a carry-in conveyer 220 according to the third embodiment shown in FIG. 38. The carry-out conveyer corresponds to a carry-out conveyer 221 according to the third embodiment shown in FIG. 38.

Although not shown, an X-ray irradiation unit, faced down, is provided in an upper part of the shielded space S inside the housing 202 shown in FIGS. 33A and 33B. Further, although not shown, an X-ray detection unit is provided in a position in a lower part of the shielded space S and below the inspection object W conveyed with the conveyer 204, inside the housing 202 shown in FIGS. 33A and 33B. The X-ray irradiation unit irradiates an X-ray on the inspection object W conveyed with the conveyer 204 in the shielded space S. The X-ray transmitted through the inspection object W is detected with the X-ray detection unit. Based on the detection result from the X-ray detection unit, the control unit determines the presence/absence of abnormality as to e.g. whether or not the inspection object W includes foreign material(s).

As described with reference to FIGS. 33A and 33B, the shielded space S inside the housing 202 is open to the outside with the two openings 203 as the carry-in port and the carry-out port at the front and back ends of the conveyance direction of the inspection object W. However, these two openings 203 are respectively provided with a shielding gate 205a to shield the X-ray. The X-ray leaked from the shielded space S through the shielding gate 205a is reduced as much as possible. The X-ray inspection device 201a is provided with necessary shielding performance with respect to the outside. Note that for the sake of convenience of illustration in the perspective views, in FIGS. 33A and 33B, only the shielding gate 205a on the carry-in port side is shown, and the shielding gate 205a on the carry-out port side is not shown.

As shown in FIGS. 33A and 33B, the shielding gate 205a is formed with three movable shielding members 206a, 206b and 207. The respective shielding members 206a, 206b and 207 are plate members including an X-ray shielding material such as lead.

In the shielding gate 205a, the shielding members 206a and 206b, as a pair of first shielding members to cover right and left edges of the opening 203 of the housing 202, are respectively moved in the lateral direction. The first shielding members 206a and 206b have the same size such that the entire opening 203 is covered with the two shielding members. The pair of first shielding members 206a and 206b is arbitrarily moved as functionally indicated with arrows AH1 and AH2 in FIG. 33B, between the center position of the conveyer 204 in the width direction and the respective outside positions. With this configuration, it is possible to set the width of the passage part 209, as a gap between the pair of first shielding members 206a and 206b, in correspondence with the width of the inspection object W to be carried in the housing 202, by moving the pair of first shielding members 206a and 206b in the lateral direction. The inspection object W placed on and conveyed with the carry-in conveyer 220 is passed through the gap without being caught with the gap regarding the size in the width direction.

In the shielding gate 205a, the shielding member 207, as a second shielding member to cover the upper edge of the opening 203 of the housing 202, is moved in the vertical direction. The second shielding member 207 is positioned outside from the first shielding members 206a and 206b regarding the opening 203. That is, the respective surfaces of the first shielding members 206a and 206b and the second shielding member 207 are parallel to each other, and the second shielding member 207 is in contact with the surfaces of the first shielding members 206a and 206b on the outside of the opening 203. The second shielding member 207 is moved between an upper limit position and a lower limit position in the vertical direction. With this configuration, it is possible to set the height of the passage part 209 as a gap between the second shielding member 207 and the upper surface of the conveyer 204 in correspondence with the height of the inspection object W to be carried in the housing 202, by moving the second shielding member 207 in the vertical direction to an arbitrary position.

Figure 34:
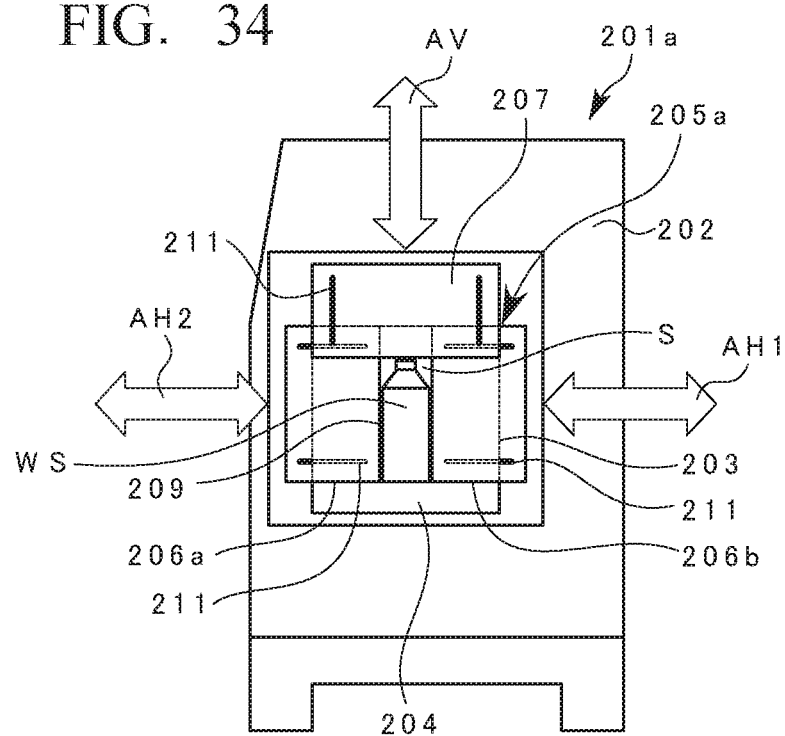
FIG. 34 is a diagram of the X-ray inspection device in FIG. 33A viewed from the direction parallel to the conveyance direction of the inspection object, in which a passage part of the shielding gate is set in correspondence with a first inspection object.
Figure 35:
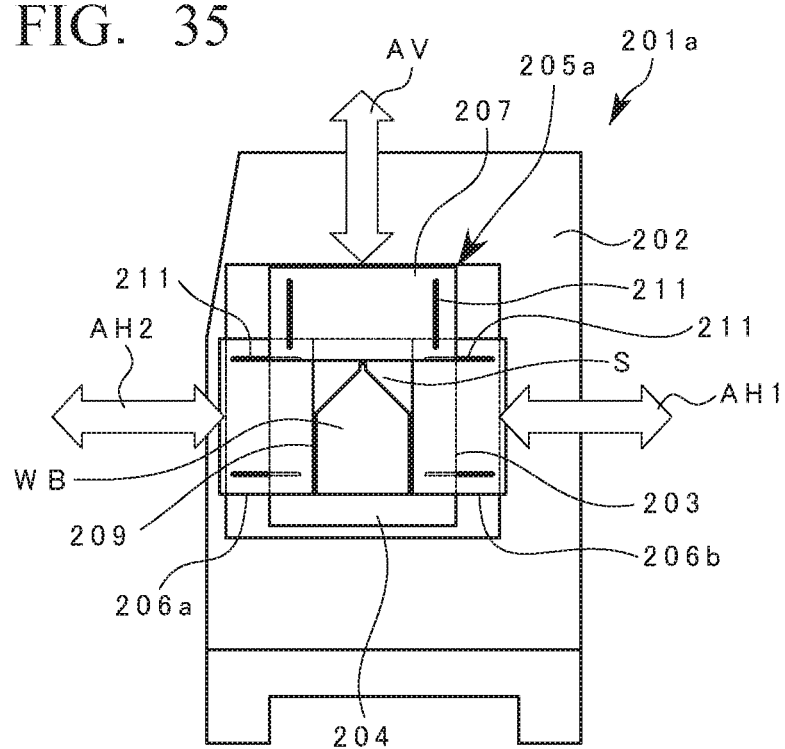
FIG. 35 is a diagram of the X-ray inspection device in FIG. 33A viewed from a direction in parallel to the conveyance direction of the inspection object, in which a passage part of the shielding gate is set in correspondence with a second inspection object.

As shown in FIGS. 33A and 33B, the shielding members forming the shielding gate 205a are respectively reciprocally moved with a linear actuator 210 as shown in FIGS. 33A and 33B (in FIGS. 34 and 35, the actuator 210 is omitted). The bases of the respective actuators 210 are attached to both right and left edges and the upper edge of the opening 203 of the housing 202, and the moving part are attached to the respective shielding members 206a, 206b and 207. Further, as shown in FIGS. 34 and 35, the shielding members 206a, 206b and 207 are respectively provided with a guide structure 211, such as a guide boss and a guide pin engaged with the guide boss, to stabilize the operation upon movement with the actuator 210.

Next, the operation of the shielding gate 205a will be described with reference to FIGS. 34 and 35.

FIGS. 34 and 35 are diagrams of the X-ray inspection device 201a viewed from a direction parallel to the conveyance directions A1 and A2 of the inspection object W. FIG. 34 shows a state where the passage part 209 of the shielding gate 205a is set in correspondence with a small bottle WS as a first inspection object W having comparatively small height and width. FIG. 35 shows a state where the passage part 209 of the shielding gate 205a is set in correspondence with a large bottle BW as a second inspection object W having a height and width greater than those of the small bottle WS.

As shown in FIG. 34, when the small bottle WS is handled as an inspection object, the first shielding members 206a and 206b are moved in the directions of arrows AH1 and AH2 to set a comparatively small interval, and the second shielding member 207 is moved in the direction of an arrow AV to a comparatively low position. On the other hand, as shown in FIG. 35, when the large bottle WB is handled as an inspection object, the first shielding members 206a and 206b are moved in the directions of the arrows AH1 and AH2 to set a comparatively wide interval, and the second shielding member 207 is moved in the direction of the arrow AV to a comparatively high position.

The shape, the measurements and the like of the inspection object W, carried in the X-ray inspection device 201a, can be previously obtained based on information acquired from the production line. Accordingly, it is possible to set the measurements and the shape of the passage part 209 of the shielding gate 205a with a shape corresponding to the outer shape of the inspection object W by providing necessary information on the inspection object W to the X-ray inspection device 201a at arbitrary time and moving the shielding members 206a, 206b and 207 with the actuators 210 to necessary positions. The gap between the passage part 209 of the shielding gate 205a and the inspection object W is sufficient to pass the inspection object W without catching and pushing the inspection object W down. However, the gap is sufficiently narrow regarding X-ray leakage. Accordingly, during a period in which the inspection object W is passed through the passage part 209, the inspection object W itself effectively shields the X-ray. When the carry-in of the inspection object W is continuous and the interval between the carried-in inspection objects W is sufficiently short, X-ray leakage does not substantially occur, and advantageous X-ray shielding is attained.

When an inspection object W having a predetermined outer shape is to be subjected to X-ray inspection in the middle of inspection of another inspection object W having a different shape, it is possible to change the shape of the passage part 209 of the shielding gate 205a in correspondence with the outer shape of the new inspection object W by moving the plural shielding members 206a, 206b and 207 in necessary directions by necessary measurements under the automatic control based on information obtained from the production line or the like. Accordingly, it is possible to perform inspection on the new inspection object W without delay. That is, whatever shape the carried-in inspection object W has, it is possible to immediately ensure a necessary X-ray shielding function and start or continue inspection work. As described above, it is not necessary to previously prepare plural types of shielding members having openings in shapes corresponding to outer shapes of the inspection objects W, and it is not necessary to attach the shielding member to the housing 202 again.

Further, when a limited number of types of inspection objects W are subjected to inspection with the X-ray inspection device 201a, it is convenient to previously register shape data of these inspection objects W in a memory of the control unit and use the data upon control. That is, when the type of inspection object W to be inspected is designated by an operator's input operation or with an external signal, the control unit reads data corresponding to the types of the designated inspection object W from the memory. Then the control unit drives the actuators 210 based on the read data to set the shape of the passage part 209 of the shielding gate 205a in correspondence with the inspection object W.

FIGS. 34 and 35 show a state where the inspection object W (the small bottle WS and the large bottle WB) is placed approximately at the center of the carry-in conveyer 220 in the width direction and is conveyed. Accordingly, the center position of the gap between the pair of first shielding members 206a and 206b approximately corresponds to the center of the carry-in conveyer 220 in the width direction. However, according to the present embodiment, even when the inspection object W is not placed approximately at the center of the carry-in conveyer 220 in the width direction and the position of the carry-in conveyer 220 in the width direction is deviated while the inspection object is carried in, it is possible to perform inspection on the inspection object W by slightly changing the configuration. In such case, the position information of the inspection object W in the width direction of the carry-in conveyer 220 is obtained each time from a prior-stage device or the like, and the actuators 210 are arbitrarily driven until the inspection object W arrives at the shielding gate 205a, to arbitrarily set the width of the passage part 209 of the shielding gate 205a, and to set the center position of the passage part 209 in the width direction in correspondence with the position of the inspection object W in the width direction.

Note that when the center position of the passage part 209 in the width direction is set in a position deviated from the center position of the carry-in conveyer 220 in the width direction in this manner, it is necessary to appropriately set an arbitrary measurement of the pair of right and left shielding members 206a and 206b in the width direction in correspondence with a deviation amount to be set, such that the area of the opening 203 except the passage part 209 is always covered with the pair of shielding members 206a and 206b in whatever position the center of the gap between the shielding members 206a and 206b in the width direction is located.

Note that in the embodiment 3-1, the shielding members 206a, 206b and 207 are moved with the actuators 210; however, they may be manually moved. That is, when the shielding members 206a, 206b and 207 are movably provided in arbitrary positions, the shielding members 206a, 206b and 207 are manually moved to arbitrary positions, to form the passage part 209 corresponding to the outer shape of the inspection object W.

Embodiment 3-2

The X-ray inspection device according to the embodiment 3-2 of the present invention will be described with reference to FIGS. 36 and 37.

An X-ray inspection device 201b has the same basic configuration as that of the X-ray inspection device according to the embodiment 3-1. In the embodiment 3-2, constituent elements identical or equivalent to those described in the embodiment 3-1 will have the same reference numerals in FIGS. 36 and 37, and in the specification, the description of the embodiment 3-1 will be invoked. A shielding gate 205b having the shielding members 206a, 206b and 207, and the actuators 210 and the like, has the same configuration as that of the shielding gate according to the embodiment 3-1. However, the setting positions and setting structure are different from those in the embodiment 3-1. In the embodiment 3-1, the shielding gate 205a is provided at the two openings 203 as the carry-in port and the carry-out port of the housing 202, i.e., the entrance and the exit of the shielded space S. In the embodiment 3-2, the shielding gate 205b is provided in plural positions, at an interval from each other, inside the shielded space S i.e. on the inside from the openings 203 as the entrance and the exit of the shielded space S. Further, in the figures, reference numeral 212 denotes a frame provided for installation of the shielding gate 205b inside the shielded space S.

The positions of the two shielding gates 205b installed in the shielded space S will be more particularly described. As shown in FIG. 37, assuming that the length L of the shielded space S regarding a conveyance direction A of the inspection object W (lateral direction in the figure) is 1, a relative value of the length from the opening 203 as the carry-in port to the shielding gate 205b on the carry-in port side is 0.34. The interval between the shielding gate 205b on the carry-in port side and the shielding gate 205b on the carry-out port side is 0.32. The length from the shielding gate 205b on the carry-out port side to the opening 203 as the carry-out port is 0.34. This is merely an example, but it is preferable that the interval between the two shielding gates 205b when the relative value of the length is 0.32 is set with as small a value as possible, in consideration of the conveyance speed of the conveyer 204, the conveyance interval of the inspection object W, the time necessary for X-ray irradiation inspection and the like, within an acceptable range, in the point of view of X-ray shielding to the outside.

Figure 36:
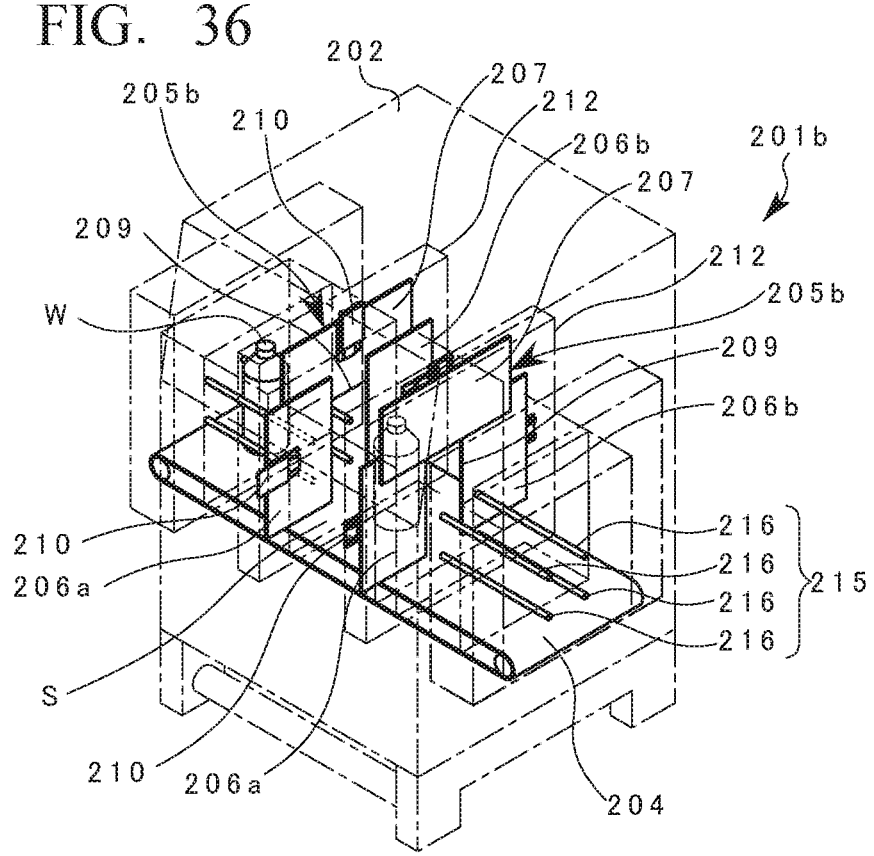
FIG. 36 is a perspective view showing an internal structure of the X-ray inspection device according to an embodiment 3-2 of the present invention.
Figure 37:
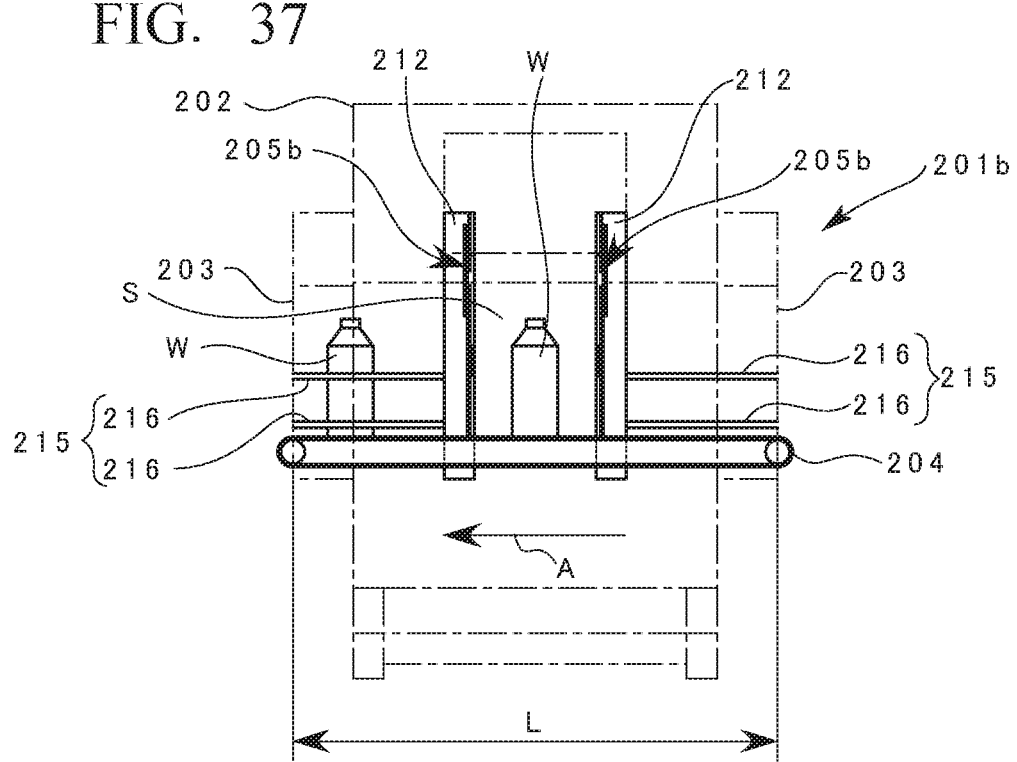
FIG. 37 is a perspective view showing the internal structure of the X-ray inspection device in FIG. 36, viewed from a horizontal direction orthogonal to the conveyance direction of the inspection object.

Further, as shown in FIGS. 36 and 37, in the present embodiment, a guide unit 215 to guide the inspection object W conveyed with the conveyer 204 is provided in the shielded space S. The guide unit 215 is provided in a carry-in region upstream of the shielding gate 205b on the carry-in port side and in a carry-out region downstream of the shielding gate 205b on the carry-out port side, regarding the conveyance direction of the conveyer 204. The guide unit 215 has bar members 216 provided in upper and lower positions on the both right and left sides of the inspection object W, i.e., in four positions, in the respective regions. The bar members 216 are connected to the frame 212 of the shielding gate 205b to be position-adjusted with a driving mechanism (not shown). That is, the upper and lower positions of the bar members 216 are arbitrarily set in correspondence with the height and the shape of the inspection object W. Further, the right and left positions of the bar members 216 are adjusted in correspondence with the width and the shape of the inspection object W, so as to accept the inspection object W carried in at the center of the carry-in conveyer 220 in the width direction, and guide the inspection object W while maintain the position of the inspection object W on the conveyer 204. In this manner, the positions of the bar members 216 of the guide unit 215 are arbitrarily set in correspondence with the outer shape measurements of the inspection object W conveyed in the shielded space S. The bar members 216 slidably come into contact with appropriate four positions of the surface of the inspection object W, to guide the inspection object W while preventing the inspection object W conveyed with the conveyer 204 from falling.

In the present embodiment, the shielding gate 205b is provided in the shielded space S inside the housing 202. Accordingly, when the shape of the passage part 209 is manually set by moving the shielding members 206a, 206b and 207, it is not possible to perform the operation without difficulty. However, the shielding members 206a, 206b and 207 are moved with the actuators 210 as in the case of the embodiment 3-1, and such problem does not occur.

Embodiment 3-3

The X-ray inspection device according to an embodiment 3-3 of the present invention will be described with reference to FIGS. 38 to 40.

An X-ray inspection device 201c has the same basic configuration as that of the X-ray inspection device according to the embodiment 3-1. In the embodiment 3-3, constituent elements identical or equivalent to those described in the embodiment 3-1 will have the same reference numerals in FIGS. 38 to 40, and in the specification, the description of the embodiment 3-1 will be invoked. A shielding gate 205c has the shielding members 206a, 206b and 207, and the actuators 210 and the like, corresponding to those of the shielding gate according to the embodiment 3-1. The difference from the embodiment 3-1 is that the shielding gate 205c further has third shielding members 208a and 208b in addition to the first shielding members 206a and 206b and the second shielding member 207. Further, regarding the first embodiment and the embodiment 3-2, as described above, it is possible to conceive a modification applicable to a situation where the inspection object W is provided and conveyed in an arbitrary position of the carry-in conveyer 220 in the width direction. The present embodiment will be described on the premise that the inspection object W is positioned at the center of the carry-in conveyer 220 in the width direction.

Figure 38:
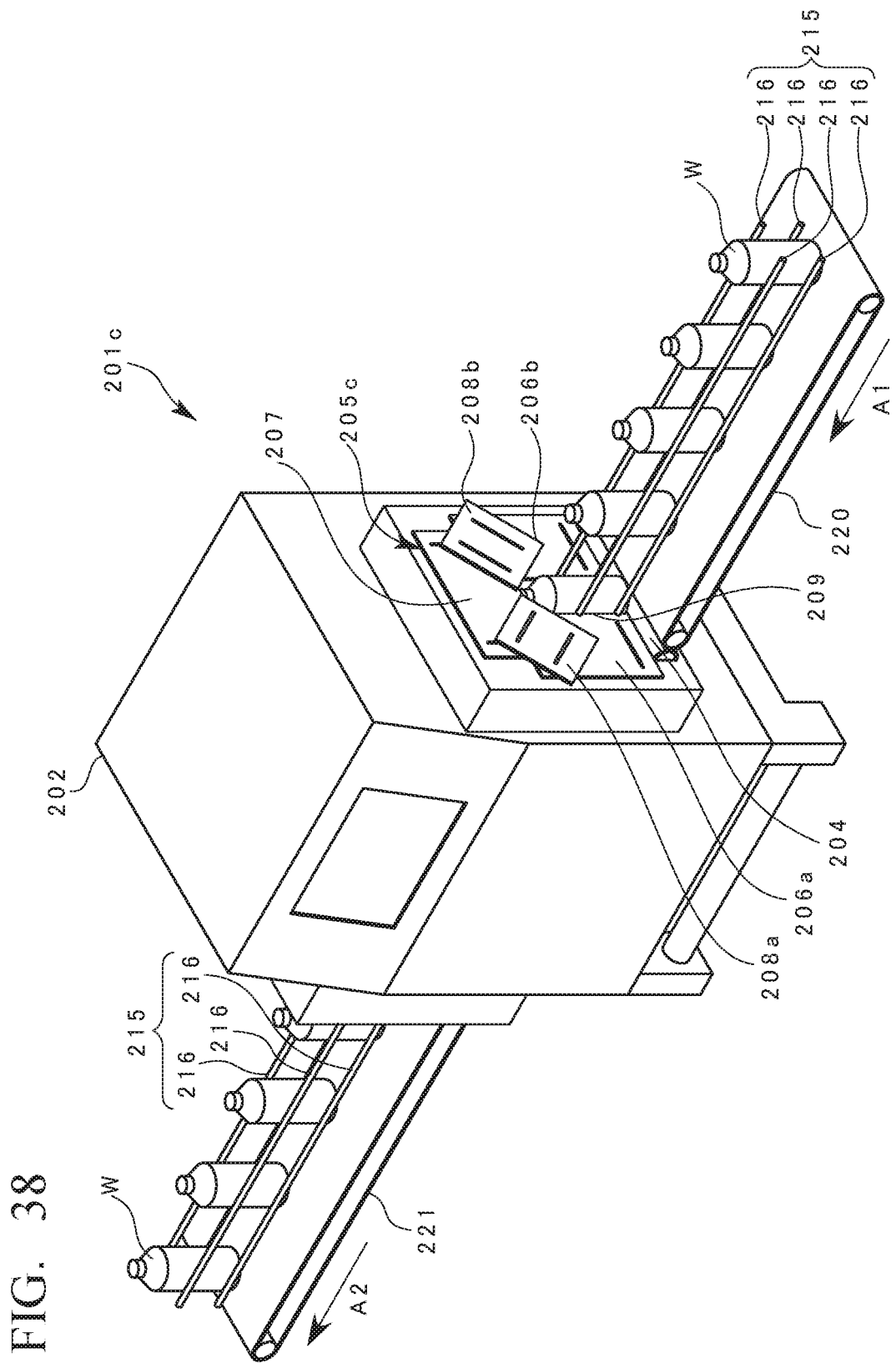
FIG. 38 is a perspective view of the X-ray inspection device according to an embodiment 3-3 of the present invention.
Figure 39:
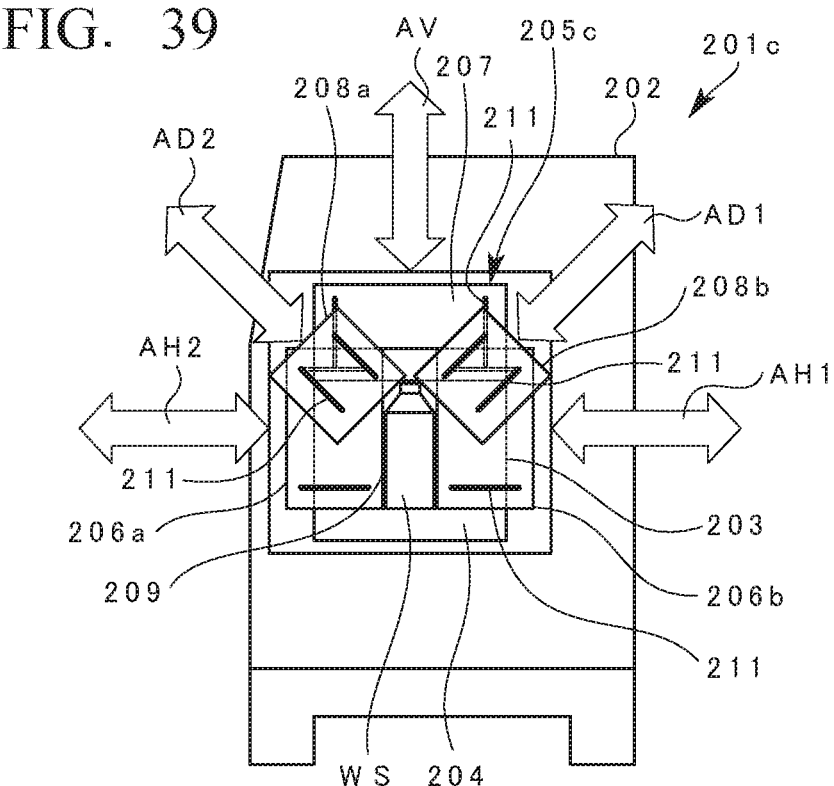
FIG. 39 is a diagram of the X-ray inspection device in FIG. 38, viewed from a direction parallel to the conveyance direction of the inspection object, in which the passage part of the shielding gate is set in correspondence with the first inspection object.
Figure 40:
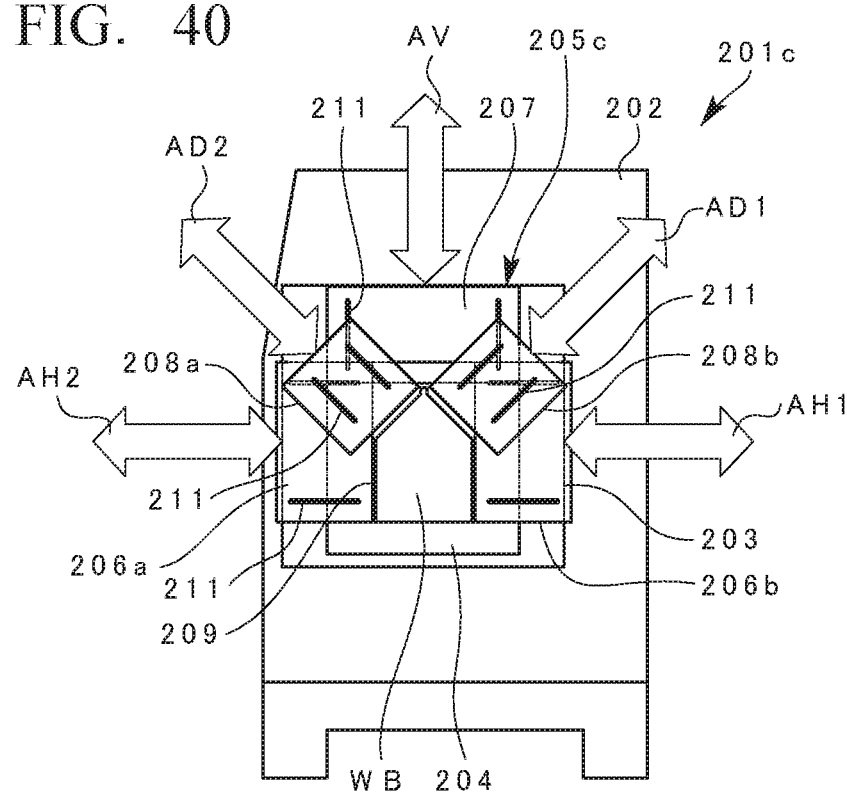
FIG. 40 is a diagram of the X-ray inspection device in FIG. 38, viewed from a direction parallel to the conveyance direction of the inspection object, in which the passage part of the shielding gate is set in correspondence with the second inspection object.

As shown in FIGS. 38 to 40, the shielding gate 205c further has the pair of third shielding members 208a and 208b movable in diagonal directions for setting tilted corners in the passage part 209. In the conveyance direction A1 of the inspection object W, regarding the passage part 209, the third shielding members 208a and 208b are positioned on the outside from the second shielding member 207. That is, the respective surfaces of the third shielding members 208a and 208b and the second shielding member 207 are parallel to each other, and the third shielding members 208a and 208b are in contact with the outside surface of the second shielding member 207 regarding the passage part 209. Further, considering that the first shielding members 206a and 206b are moved in the horizontal direction and the second shielding member 207 is moved in the vertical direction, the pair of third shielding members 208a and 208b is movable respectively in two directions respectively at 45° as intermediate angles between the horizontal direction and the vertical direction (directions indicated with arrows AD1 and AD2 in FIGS. 39 and 40 to be described later). The third shielding members 208a and 208b have a rectangular plate shape, moved in directions parallel to respective one pair of opposite sides of the third shielding members 208a and 208b and vertical to the other pair of opposite sides, as in the case of the first and second shielding members. Accordingly, the center of the shielding gate 205c according to the present embodiment in the width of the passage part corresponds to the center of the conveyer 204 in the width direction. With this configuration, as mentioned above, the present embodiment is described on the premise that the inspection object W is positioned at the center of the carry-in conveyer 220 and conveyed.

The pair of first shielding members 206a and 206b is moved, as functionally indicated with the arrows AH1 and AH2 particularly in FIG. 39, in directions opposite to each other, as symmetrical manners, between the center position of the conveyer 204 in the width direction and the respective outside positions. Accordingly, regardless of the interval between the pair of first shielding members 206a and 206b, the center of the interval between the pair of first shielding members 206a and 206b corresponds to the center of the conveyer 204 in the width direction. With this configuration, when the pair of first shielding members 206a and 206b are moved in the lateral direction, it is possible to set the width of the passage part 209, as a gap between the pair of first shielding members 206a and 206b, in correspondence with the width of the inspection object W to be carried in the housing 202. Further, since the center of the gap between the pair of first shielding members 206a and 206b corresponds to the center of the conveyer 204 in the width direction, the inspection object W positioned and conveyed at the center of the carry-in conveyer 220 in the width direction is passed through the gap without being caught with the gap regarding the measurement in the width direction.

As shown in FIG. 38, regarding the conveyance direction of the inspection object W, the carry-in conveyer 220, functionally indicated with the arrow A1 in FIG. 33A, is provided on the upstream side of the S-ray inspection device 201c. Further, similarly, the carry-out conveyer 221, functionally indicated with the arrow A2 in FIG. 33A, is provided on the downstream side of the X-ray inspection device 201c. These conveyers 220 and 221 are provided with the guide unit 215 which is approximately the same as that shown in FIGS. 36 and 37 and described with reference to these figures.

Regarding the guide unit 215, the same reference numerals as those in FIGS. 36 and 37 are used, and the description in the embodiment 3-1 is invoked. Further, the respective bar members 216 of the guide unit 215 are attached to a frame or the like of a peripheral device (not shown). The positions of the bar members 216 are manually or automatically adjusted in correspondence with the outer shape and measurements of the inspection object W. Accordingly, the inspection object W, positioned at the center of the conveyers 220 and 221 in the width direction respectively, is conveyed in a stable state. Even when the passage part 209 of the shielding gate 205c has a narrow shape along the outer shape of the inspection object W, as in the present embodiment, the inspection object W is not caught with the narrow passage part 209. Thus smooth carry-in and carry-out are performed.

Next, the operation of the shielding gate 205c will be described with respect to FIGS. 39 and 40.

FIGS. 39 and 40 are diagrams of the X-ray inspection device 201c, viewed from a direction parallel to the conveyance direction A (A1 and A2) of the inspection object W. FIG. 39 shows a state where the passage part 209 of the shielding gate 205c is set in correspondence with the above-described small bottle WS. Further, FIG. 40 shows a state where the passage part 209 of the shielding gate 205c is set in correspondence with the above-described large bottle WB.

As shown in FIG. 39, when the small bottle WS is handled as an inspection object, the positions of the first shielding members 206a and 206b and the second shielding member 207 are the same as those in the embodiment 3-1 (see FIG. 34). The third shielding members 208a and 208b are moved in the respective directions of the arrows AD1 and AD2, to positions approximately along the diagonal lines of the shoulders of the small bottle WS. Further, as shown in FIG. 40, when the large bottle WB is handled as an inspection object, the positions of the first shielding members 206a and 206b and the second shielding member 207 are the same as those in the embodiment 3-1 (see FIG. 35). The third shielding members 208a and 208b are moved in the respective directions of the arrow AD1 and AD2, to positions approximately along the diagonal lines of the shoulders of the large bottle WB. In the examples shown in FIGS. 39 and 40, the positions of the third shielding members 208a and 208b are approximately the same although the shapes of the bottles are different. However, it is preferable to adjust the positions of the third shielding members 208a and 208b in correspondence with the shape of the bottle, especially the shapes, the lengths and the like of the diagonal lines of the shoulders, to possibly minimize the gap between the inspection object W and the third shielding members 208a and 208b.

According to the present embodiment, it is possible to approximately match the shape of the passage part 209 of the shielding gate 205c to the outer shape of the inspection object W. Further, it is possible to set the gap between the inspection object W and the shielding members 206a and 206b, 207, and 208a and 208b to a smaller gap than that in the embodiment 3-1. Accordingly, the X-ray shielding performance in the shielded space S with respect to the outside is further improved.

Embodiment 3-4

The X-ray inspection device according to an embodiment 3-4 of the present invention will be described with reference to FIG. 41.

An X-ray inspection device 201d has the same basic configuration as that of the X-ray inspection device according to the embodiment 3-1. In the embodiment 3-4, constituent elements identical or equivalent to those described in the embodiment 3-1 will have the same reference numerals in FIG. 41, and in the specification, the description of the embodiment 3-1 will be invoked. A shielding gate 205d having the shielding members and the actuators 210 has the same basic configuration as that of the shielding gate according to the embodiment 3-1. However, the particular configuration of the shielding gate is different from that in the embodiment 3-1.

Figure 41:
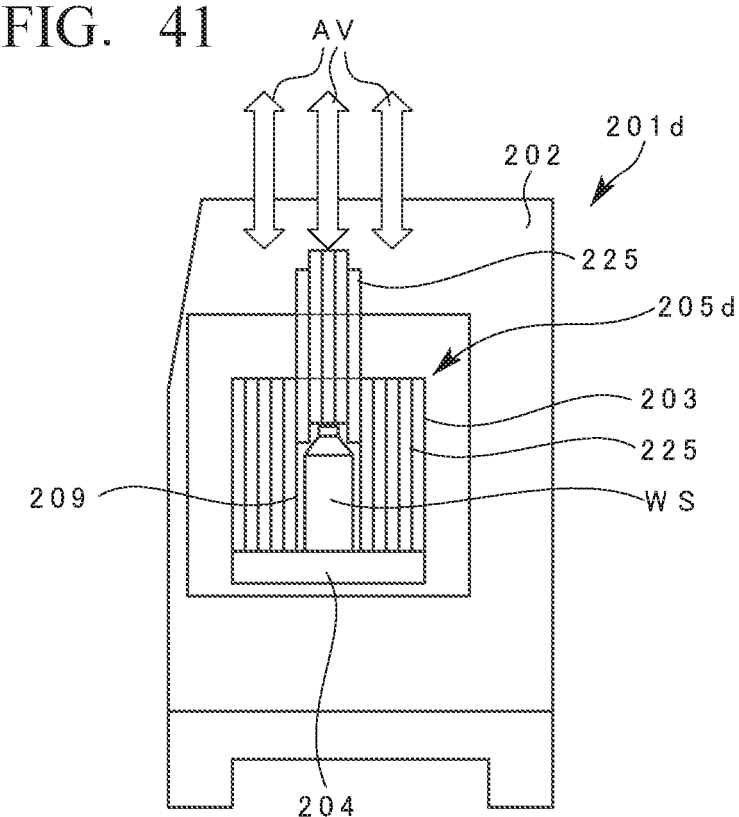
FIG. 41 is a diagram of the X-ray inspection device according to an embodiment 3-4 of the present invention, viewed from a direction parallel to the conveyance direction of the inspection object, in which the passage part of the shielding gate is set in correspondence with the first inspection object.

As shown in FIG. 41, the shielding gate 205d according to the present embodiment has a large number of strip-shaped (or long bar plate-shaped) shielding members 225. In the figure, fifteen shielding members 225, with their lengthwise direction aligned with the vertical direction, are arrayed so as to cover the opening 203 of the housing 202. As comprehensively indicated with plural arrows AV in FIG. 41, the respective shielding members 225 are respectively moved in the vertical direction and are set to arbitrary positions in the vertical direction. Although the detailed illustration and explanation are omitted, the respective shielding members 225 are guided in the vertical direction, and moved up and down with a driving unit (not shown).

As shown in FIG. 41, according to the present embodiment, it is possible to form the shape of the passage part 209 along the outer shape of the inspection object W (the small bottle WS in the figure) by adjusting and setting the positions of the respective shielding members 225 in correspondence with the height, the width and the shape of the inspection object W carried in with the carry-in conveyer 220. It is therefore possible to further reduce the gap between the inspection object W and the shielding members 225 in comparison with the embodiment 3-3. Accordingly, the X-ray shielding performance in the shielded space S to the outside is further improved.

Further, in the present embodiment, even when the inspection object W is not positioned at the center of the carry-in conveyer 220 in the width direction, it is possible to determine the position of the passage part 209 in correspondence with the position of the inspection object W on the conveyer 204. That is, even when the position of the carried-in inspection object W is unstable regarding the width direction of the carry-in conveyer 220, it is possible to adjust the position of the passage part 209, in addition to the shape of the passage part 209, to the position of the inspection object W, in correspondence with the position of each inspection object W on the carry-in conveyer 220. Accordingly, it is possible to omit the labor of position adjustment of the inspection object W such as positioning of the inspection object W at the center of the conveyer 204 in the width direction on the upstream side of the X-ray inspection device 201d.

Embodiment 3-5

The X-ray inspection device according to an embodiment 3-5 of the present invention will be described with reference to FIG. 42.

An X-ray inspection device 201e has the same basic configuration as that of the X-ray inspection device according to the embodiment 3-4. However, a shielding gate 205e has a different configuration from that in the embodiment 3-4. In the present embodiment, a pair of right and left shielding members 226, with their lengthwise direction aligned with the width direction of the conveyer 204, is arrayed in the horizontal direction, so as to cover the opening 203 of the housing 202. The respective shielding members 226 are moved respectively in the lateral direction, as comprehensively indicated with the plural arrows AH1 and AH2 in FIG. 42, to arbitrary positions in the lateral direction.

Figure 42:
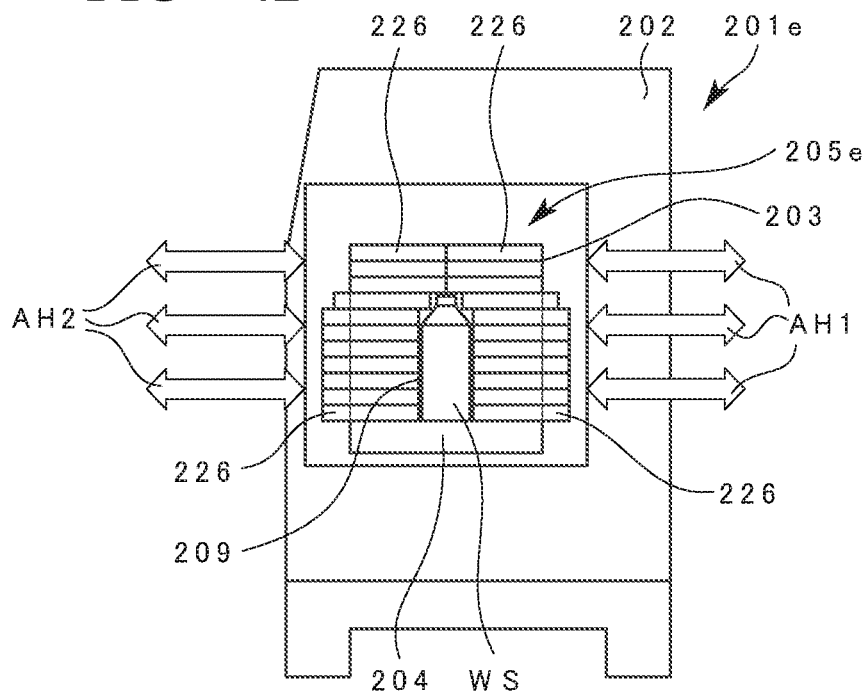
FIG. 42 is a diagram of the X-ray inspection device according to an embodiment 3-5 of the present invention, viewed from a direction parallel to the conveyance direction of the inspection object, in which the passage part of the shielding gate is set in correspondence with the first inspection object.
Figure 43:
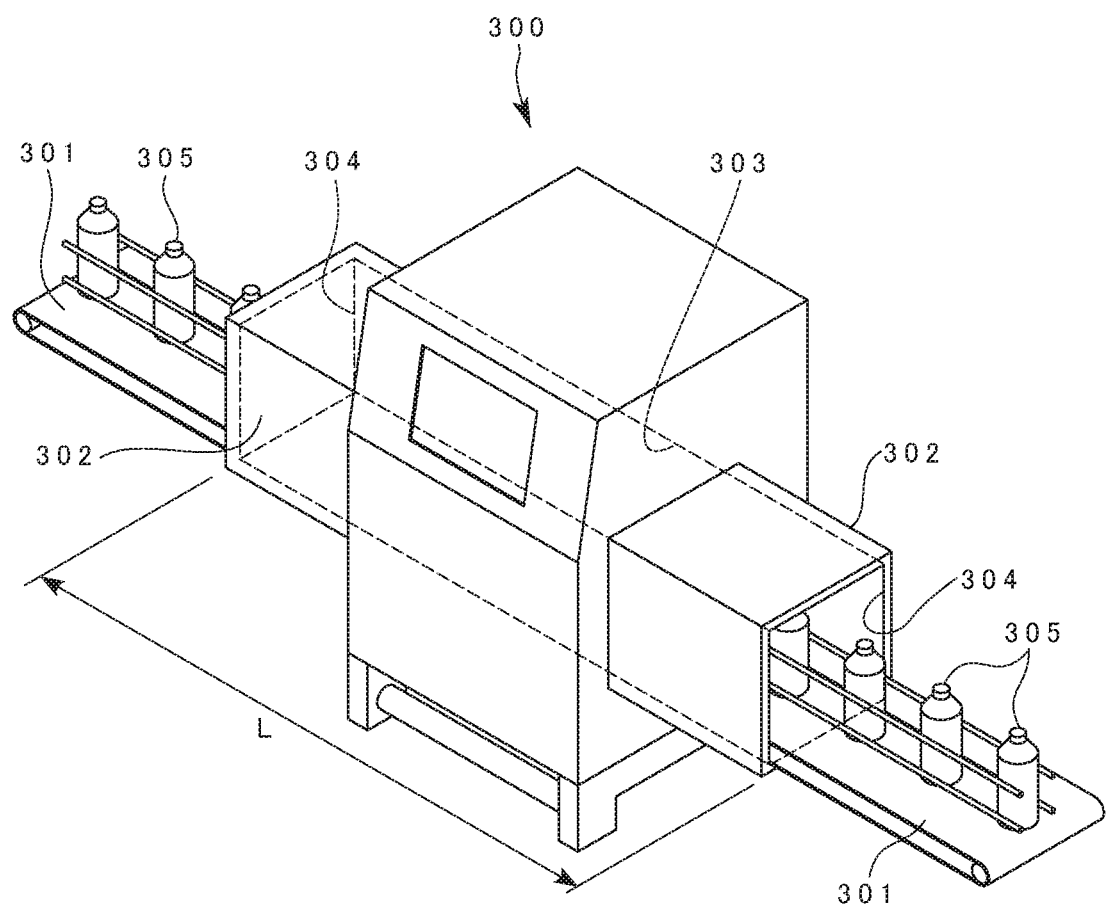
FIG. 43 is a perspective view of the conventional X-ray inspection device having the tunnel-shaped extension cover.

As shown in FIG. 42, according to the present embodiment, it is possible to set the shape of the passage part 209 along the outer shape of the inspection object W (the small bottle WS in the figure) by adjusting and setting the positions of the respective shielding members 226 in correspondence with the height, the width and the shape of the inspection object W carried in with the carry-in conveyer 220. It is therefore possible to attain the same advantage as that attained in the embodiment 3-4. Further, even when the inspection object W is not positioned at the center of the carry-in conveyer 220 in the width direction, it is possible to determine the position of the passage part 209 in correspondence with the position of the inspection object W on the conveyer 204. In this point, it is possible to attain the same advantage as that attained in the embodiment 3-4.

The primary reference numerals in the third embodiment are as follows.

201a, 201b, 201c, 201d, and 201e . . . X-ray inspection device
202 . . . housing
203 . . . opening of the housing
205a, 205b, 205c, 205d, and 205e . . . shielding gate
206a and 206b . . . first shielding member
207 . . . second shielding member
208a and 208b . . . third shielding member
209 . . . opening of the shielding gate
210 . . . actuator
225 . . . shielding member
226 . . . shielding member
W . . . inspection object
WS . . . small bottle as the inspection object
WB . . . large bottle as the inspection object
S . . . shielded space

What is claimed is:

1. An X-ray inspection device for performing inspection by irradiating an X-ray on an inspection object conveyed in an X-ray shielded space, comprising:
  a shielding gate including a passage aperture in the shielding gate, a shape of the passage aperture being changeable in correspondence with an outer shape of the inspection object to be passed through, and
  the shielding gate is guidably connected to the device so that the shielding gate and the passage aperture are movable along a guided direction into and out of a shielding position, the shielding position being an only shielding position of the shielding gate.

2. The X-ray inspection device according to claim 1, wherein the shielding gate having the passage aperture corresponding to the shape of the inspection object is retractably provided in the shielding position inside the shielded space.

3. The X-ray inspection device according to claim 1,
  wherein the shielding gate is formed with a plurality of the shielding gates accommodated in an accommodation position outside the shielded space, and each of the plurality of the shielding gates has passage apertures in different shapes respectively corresponding to the inspection objects in plural types of shapes,
  wherein the plurality of shielding gates are respectively movable from the accommodation position to the shielding position inside the shielded space.

4. The X-ray inspection device according to claim 1, wherein the shielding gate is formed with a plurality of shields movable to arbitrarily set the shape of the passage aperture in correspondence with the outer shape of the inspection object, and the shields are moved so as to change the shape of the passage aperture.

5. The X-ray inspection device according to claim 4, wherein the shields include:
- at least one pair of first shields movable in a lateral direction to set a width of the passage aperture in correspondence with a width of the inspection object; and
- a second shield movable in a vertical direction to set a height of the passage aperture in correspondence with a height of the inspection object.

6. The X-ray inspection device according to claim 5, wherein the shields further include a third shield movable in a diagonal direction to set a tilted corner in the passage aperture.

7. An X-ray inspection device for performing inspection by irradiating an X-ray on an inspection object conveyed in an X-ray shielded space, comprising:
- a shielding gate having a passage part a shape of which is changeable in correspondence with an outer shape of the inspection object to be passed through,
- the shielding gate having the passage part corresponding to the shape of the inspection object is retractably provided in a shielding position inside the shielded space,
- wherein the shielding gate has an identification part to which identification information corresponding to the shape of the passage part is added; and
- the device further comprises an identification information acquisition reader that acquires the identification information from the shielding gate in the shielding position.

8. An X-ray inspection device for performing inspection by irradiating an X-ray on an inspection object conveyed in an X-ray shielded space, comprising:
- a shielding gate having a passage part a shape of which is changeable in correspondence with an outer shape of the inspection object to be passed through,
- wherein the shielding gate is formed with a plurality of types of the shielding gates having passage parts in different shapes respectively corresponding to a plurality of outer shapes of the inspection objects to be passed, and one of the plurality of types of shielding gates is selected in correspondence with a particular type of inspection object, and removably attached to a shielding position so as to suppress X-ray leakage from the shielded space,
- wherein the plural types of shielding gates, each linked to a corresponding one of a plurality of types of inspection objects, respectively have a gate engagement part unique to the respective shielding gates to match the shape of the inspection object to the shape of the passage part, and wherein, the device further comprising:
- a main body engagement part, provided in a vicinity of the shielding position, set in a state corresponding to a particular type of the inspection object selected from the plural types of inspection objects, that becomes engageable only with respect to the gate engagement part of the shielding gate having the passage part corresponding to the inspection object; and
- an interlock that detects attachment of the shielding gate to the shielding position, and unless the shielding gate is attached to the shielding position based on engagement between the gate engagement part and the main body engagement part, prohibits irradiation of the X-ray.

9. The X-ray inspection device according to claim 8, wherein the gate engagement part is a hole, and the main body engagement part is a projection engaged with the hole.

10. The X-ray inspection device according to claim 9, wherein the projection is an operation knob operated for selection of the particular type of the inspection object.

11. The X-ray inspection device according to claim 10, wherein the projection is provided in a plurality of positions, and the hole is provided, in correspondence with the projections, in a plurality of positions of the shielding gate.

12. The X-ray inspection device according to claim 11, wherein the plurality of projections are arrayed adjacently to each other.

13. The X-ray inspection device according to claim 9, wherein the projection is provided in a plurality of positions, and the hole is provided, in correspondence with the projections, in a plurality of positions of the shielding gate.

14. The X-ray inspection device according to claim 13, wherein the plurality of projections are arrayed adjacently to each other.

15. The X-ray inspection device according to claim 8, further comprising:
- a driving actuator that operates by operation for selection of the particular type of inspection object from the plurality of types of inspection objects,
- wherein, by the operation of the driving actuator, the main body engagement part is set in a state engageable with the gate engagement part of the shielding gate corresponding to the particular type of inspection object.

* * * * *